(12) United States Patent
Johnson et al.

(10) Patent No.: US 9,960,956 B1
(45) Date of Patent: May 1, 2018

(54) NETWORK MONITORING METHOD USING PHANTOM NODES

(71) Applicant: The United States of America, as represented by the Secretary of the Navy, Washington, DC (US)

(72) Inventors: Jamie Lynn Johnson, Mission Viejo, CA (US); Thomas Parker, Monterey, CA (US); Murali Tummala, Monterey, CA (US); John C. McEachen, Carmel, CA (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 310 days.

(21) Appl. No.: 14/852,734

(22) Filed: Sep. 14, 2015

Related U.S. Application Data

(60) Provisional application No. 62/064,361, filed on Oct. 15, 2014.

(51) Int. Cl.
| | | |
|---|---|---|
| *H04L 12/24* | (2006.01) | |
| *H04L 12/703* | (2013.01) | |
| *H04L 12/939* | (2013.01) | |
| *H04L 12/801* | (2013.01) | |
| *H04L 12/803* | (2013.01) | |

(52) U.S. Cl.
CPC .......... *H04L 41/0659* (2013.01); *H04L 45/28* (2013.01); *H04L 47/11* (2013.01); *H04L 47/125* (2013.01); *H04L 49/557* (2013.01)

(58) Field of Classification Search
CPC ....... H04L 41/12; H04L 41/14; H04L 41/145; H04L 45/123; H04L 45/586; H04L 45/64; H04L 45/74

USPC .......................................................... 709/224
See application file for complete search history.

(56) References Cited

U.S. PATENT DOCUMENTS

| | | | | |
|---|---|---|---|---|
| 6,879,257 B2* | 4/2005 | Hisano | ................. | G08B 13/181 340/539.21 |
| 7,587,453 B2* | 9/2009 | Bhrara | ................. | G06F 9/5027 709/204 |
| 8,065,568 B2* | 11/2011 | Watanabe | ............. | H04L 41/064 702/187 |

(Continued)

OTHER PUBLICATIONS

Johnson, Jamie Lynn, "Software Defined Network Monitoring Scheme Using Spectral Graph Theory and Phantom Nodes," Naval Postgraduate School, Thesis, Sep. 2014, pp. 1-115.

*Primary Examiner* — Edward Kim
(74) *Attorney, Agent, or Firm* — Naval Postgraduate School; Lisa A. Norris; James B. Potts

(57) ABSTRACT

Determining flow rules in a software defined network (SDN) of a plurality of forwarding devices includes determining, by a controller device, a network adjacency matrix of the SDN, wherein the network adjacency matrix represents a topology of the SDN; placing, by the controller device, a phantom node in the network adjacency matrix, wherein the phantom node does not physically exist within the topology of the SDN and the phantom node is attached to a first node with maximum degree in the network adjacency matrix to create a phantom adjacency matrix, wherein the first node corresponds to a first forwarding device in the SDN; and determining, by the controller device, an adverse condition in the SDN using the phantom node, wherein the controller device is separate from the plurality of forwarding devices.

21 Claims, 32 Drawing Sheets

(56) References Cited

U.S. PATENT DOCUMENTS

| | | | |
|---|---|---|---|
| 8,271,412 B2* | 9/2012 | Johnson | H04L 41/12 706/46 |
| 2003/0041095 A1* | 2/2003 | Konda | G06F 17/30569 709/201 |
| 2006/0242288 A1* | 10/2006 | Masurkar | G06F 11/0709 709/223 |
| 2007/0156889 A1* | 7/2007 | Bhrara | G06F 9/5027 709/224 |
| 2008/0144515 A1* | 6/2008 | Ouellette | H04J 3/0679 370/242 |
| 2009/0024549 A1* | 1/2009 | Johnson | H04L 43/00 706/46 |
| 2009/0167520 A1* | 7/2009 | Watanabe | H04L 41/064 340/507 |
| 2010/0325412 A1* | 12/2010 | Norrman | G06F 21/577 713/100 |
| 2012/0182863 A1* | 7/2012 | Ouellette | H04J 3/0679 370/221 |
| 2013/0262661 A1* | 10/2013 | Malboubi | H04L 41/142 709/224 |
| 2014/0010109 A1* | 1/2014 | Himura | H04L 41/12 370/254 |

\* cited by examiner

NETWORK MONITORING METHOD USING PHANTOM NODES

CROSS-REFERENCE TO RELATED APPLICATIONS

This application claims priority to U.S. Provisional Patent Application No. 62/064,361 filed on Oct. 15, 2014, the complete disclosure of which, in its entirety, is herein incorporated by reference.

BACKGROUND

Technical Field

The embodiments herein relate to communication network, and more particularly to flow control in communication networks.

Description of the Related Art

Communication networks continue to grow in size and complexity at an alarming rate. A recent development for communication networks is the emergence of software-defined networking (SDN). A SDN is designed to have a programmable controller that provides flow level routing instruction to the network forwarding elements. This design separates the control plane from the data plane causing switches to rely on the centralized controller for control-plane functionalities. The controller provides these functionalities to the switches through an open interface called the OpenFlow® interface.

OpenFlow® is the current standard for the southbound interface in a SDN. It was proposed for the purpose of creating a way to run networking. The Open Networking Foundation (ONF) was formed with the mission of promoting SDN with open standards. The introduction of the OpenFlow® standard is the defining accomplishment of this organization. The ONF encourages equipment vendors to include OpenFlow® on network switches for deployment in SDN.

SUMMARY

In view of the foregoing, an embodiment herein provides a method for determining flow rules in a software defined network (SDN) of a plurality of forwarding devices, the method comprises determining, by a controller device, a network adjacency matrix of the SDN, wherein the network adjacency matrix represents a topology of the SDN; placing, by the controller device, a phantom node in the network adjacency matrix, wherein the phantom node does not physically exist within the topology of the SDN and the phantom node is attached to a first node with maximum degree in the network adjacency matrix to create a phantom adjacency matrix, wherein the first node corresponds to a first forwarding device in the SDN; and determining, by the controller device, an adverse condition in the SDN using the phantom node, wherein the controller device is separate from the plurality of forwarding devices.

The adverse condition may be any of a network congestion state, a failed link, and a failed forwarding device in the SDN. The network congestion state may be due to a denial of service (DoS) attack in the SDN. The controller device may perform load balancing in response to the congestion state, isolate the failed link in response to failure of the failed link, and isolate the failed forwarding device in response to failure of the forwarding device. The method may further comprise setting, by the controller device, a congestion threshold corresponding to the phantom node; identifying, by the controller device using the phantom network adjacency matrix, an underutilized node, wherein the underutilized node corresponds to an underutilized forwarding device in the SDN, and wherein a first traffic utilization of the underutilized forwarding device is below the congestion threshold; identifying, by the controller device using the phantom network adjacency matrix, the network congestion state in a congested node, wherein the congested node corresponds to a congested forwarding device in the SDN, and wherein a second traffic utilization of the congested forwarding device is above the congestion threshold; and determining, by the controller device, the flow rules in the SDN to route the second traffic from the congested forwarding device to the underutilized forwarding device, to mitigate the network congestion state.

The method may further comprise determining, by the controller device, after determining the adverse condition in the SDN, a new network adjacency matrix of the SDN; placing, by the controller device, after determining the adverse condition in the SDN, a new phantom node in the new network adjacency matrix; and computing, by the controller device, after determining the adverse condition in the SDN, a plurality of eigenvectors of the new phantom network adjacency matrix of the SDN. The method may further comprise identifying, by the controller device, a second node that has a largest magnitude in a largest eigenvector of the plurality of eigenvectors, wherein the second node corresponds to a second forwarding device in the SDN; attaching, by the controller device, the new phantom node to the second node to create a new phantom adjacency matrix, when the second node is different from the first node; identifying, by the controller device, a third node that has a second largest magnitude in the largest eigenvector, when the second node is the same as the first node, wherein the third node corresponds to a third forwarding device in the SDN; attaching, by the controller device, the new phantom node to the third node to create a new phantom adjacency matrix, when the second node is the same the first node; and using, by the controller device, the new phantom adjacency matrix to determine a new adverse condition in the SDN.

Another embodiment provides a non-transitory program storage device readable by computer, tangibly embodying a program of instructions executable by the computer to perform a method for determining flow rules in a software defined network (SDN) of a plurality of forwarding devices, the method comprises determining, by a controller device, a network adjacency matrix of the SDN, wherein the network adjacency matrix represents a topology of the SDN; placing, by the controller device, a phantom node in the network adjacency matrix, wherein the phantom node does not physically exist within the topology of the SDN and the phantom node is attached to a first node with maximum degree in the network adjacency matrix to create a phantom network adjacency matrix, wherein the first node corresponds to a first forwarding device in the SDN; and determining, by the controller device, an adverse condition in the SDN using the phantom node, wherein the controller device is separate from the plurality of forwarding devices.

The adverse condition may be any of a network congestion state, a failed link, and a failed forwarding device in the SDN. The network congestion state may be due to a denial of service (DoS) attack in the SDN. The controller device may perform load balancing in response to the congestion state, isolate the failed link in response to failure of the failed link, and isolate the failed forwarding device in response to failure of the forwarding device. The program storage device, wherein the method may further comprise setting, by the controller device, a congestion threshold corresponding to the phantom node; identifying, by the controller device using the phantom network adjacency matrix, an underutilized node, wherein the underutilized node corresponds to an underutilized forwarding device in the SDN, and wherein a first traffic utilization of the underutilized forwarding device is below the congestion threshold; identifying, by the controller device using the phantom network adjacency matrix, the network congestion state in a congested node, wherein the congested node corresponds to a congested forwarding device in the SDN, and wherein a second traffic utilization of the congested forwarding device is above the congestion threshold; and determining, by the controller device, the flow rules in the SDN to route the second traffic from the congested forwarding device to the underutilized forwarding device, to mitigate the network congestion state.

The program storage device, wherein the method may further comprise determining, by the controller device, after determining the adverse condition in the SDN, a new network adjacency matrix of the SDN; placing, by the controller device, after determining the adverse condition in the SDN, a new phantom node in the new network adjacency matrix; and computing, by the controller device, after determining the adverse condition in the SDN, a plurality of eigenvectors of the new network adjacency matrix of the SDN. The program storage device, wherein the method may further comprise identifying, by the controller device, a second node that has a largest magnitude in a largest eigenvector of the plurality of eigenvectors, wherein the second node corresponds to a second forwarding device in the SDN; attaching, by the controller device, the new phantom node to the second node to create a new phantom adjacency matrix, when the second node is different from the first node; identifying, by the controller device, a third node that has a second largest magnitude in the largest eigenvector, when the second node is the same as the first node, wherein the third node corresponds to a third forwarding device in the SDN; attaching, by the controller device, the new phantom node to the third node to create a new phantom adjacency matrix, when the second node is the same the first node; and using, by the controller device, the new phantom adjacency matrix to determine a new adverse condition in the SDN.

Another embodiment provides a system for determining flow rules in a software defined network (SDN), the system comprises a plurality of forwarding devices in the SDN; a controller device configured to determine a network adjacency matrix of the SDN, wherein the network adjacency matrix represents a topology of the SDN; place a phantom node in the network adjacency matrix, wherein the phantom node does not physically exist within the topology of the SDN and the phantom node is attached to a first node with maximum degree in the network adjacency matrix to create a phantom adjacency matrix, wherein the first node corresponds to a first forwarding device in the SDN; and determine an adverse condition in the SDN using the phantom node, wherein the controller device is separate from the plurality of forwarding devices.

The adverse condition may be any of a network congestion state, a failed link, and a failed forwarding device in the SDN. The controller device may be further configured to perform load balancing in response to the congestion state; isolate the failed link in response to failure of the failed link; and isolate the failed forwarding device in response to failure of the forwarding device. The controller device may be further configured to set a congestion threshold corresponding to the phantom node; identify, using the phantom network adjacency matrix, an underutilized node, wherein the underutilized node corresponds to an underutilized forwarding device in the SDN, and wherein a first traffic utilization of the underutilized forwarding device is below the congestion threshold; identify, using the phantom network adjacency matrix, the network congestion state in a congested node, wherein the congested node corresponds to a congested forwarding device in the SDN, and wherein a second traffic utilization of the congested forwarding device is above the congestion threshold; and determine the flow rules in the SDN to route the second traffic from the congested forwarding device to the underutilized forwarding device, to mitigate the network congestion state.

The controller may be further configured to determine, after determining the adverse condition in the SDN, a new network adjacency matrix of the SDN; place, after determining the adverse condition in the SDN, a new phantom node in the new network adjacency matrix; and compute, after determining the adverse condition in the SDN, a plurality of eigenvectors of the new network adjacency matrix of the SDN. The controller device may be further configured to identify a second node that has a largest magnitude in a largest eigenvector of the plurality of eigenvectors, wherein the second node corresponds to a second forwarding device in the SDN; attach the new phantom node to the second node to create a new phantom adjacency matrix, when the second node is different from the first node; identify a third node that has a second largest magnitude in the largest eigenvector, when the second node is the same as the first node, wherein the third node corresponds to a third forwarding device in the SDN; attach the new phantom node to the third node to create a new phantom adjacency matrix, when the second node is the same the first node; and use the new phantom adjacency matrix to determine a new adverse condition in the SDN.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
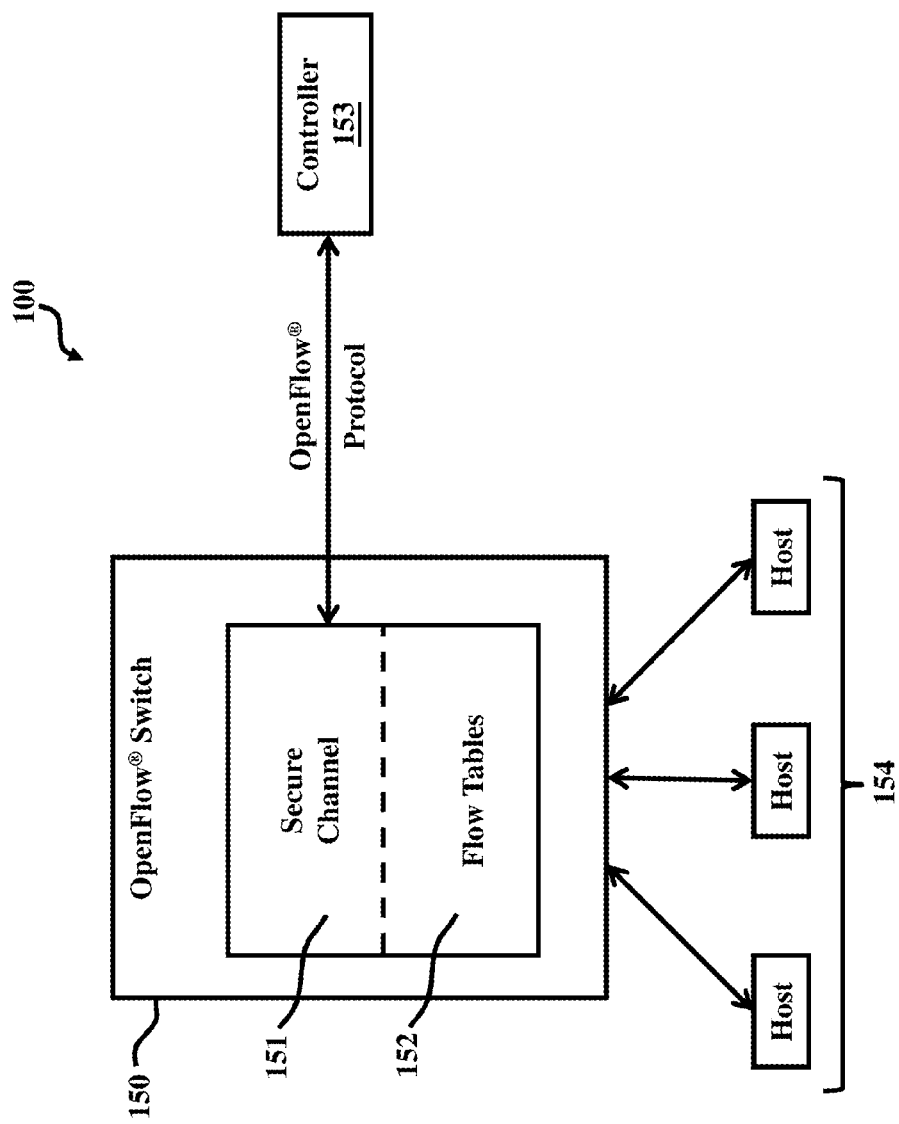
FIG. 1 is a schematic diagram illustrating a software defined network according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a network monitoring method using phantom nodes. Referring now to the drawings, and more particularly to FIGS. 1 through 32, where similar reference characters denote corresponding features for their specific figure, or may denote corresponding features consistently throughout the figures, there are shown preferred embodiments.

FIG. 1 is a schematic diagram illustrating an SDN 100 according to an embodiment. In an embodiment, an OpenFlow® switch 150 includes a secure channel 151 and flow tables 152. In an embodiment, the secure channel 151 may be used by the OpenFlow® switch 150 to securely communicate with a controller 153. The OpenFlow® switch 150 may be configured to also communicate with multiple hosts 154. OpenFlow® exploits a common set of routing functions that exist within most network forwarding elements, also referred to herein as network forwarding devices. It allows the controller 153 (referred to herein also as controller device, or control plane) to program flow tables in different vendor's forwarding devices for the purpose of network routing. The SDN 100 contains the controller 153, and OpenFlow® switch, and three hosts. The OpenFlow® protocol allows the controller to communicate to the switch via a secure channel in order to update flow tables. This allows the programmable controller 153 to act as the network's operating system.

SDNs are poised to become a dominant networking design for communication networks. OpenFlow® allows complexity to be removed from network routers and switches; only the controller requires complexity since it manages the switches. This means large, complex networks may be implemented at a fraction of the cost. It also means that robust and effective software needs to be developed and implemented on the controller to accomplish desired network tasks and functions.

Considering the rapid growth of interest in SDN in such areas as data centers, cloud computing, and academia, it is desirable to have a network management system that ensures network availability. An embodiment describes a SDN network monitoring scheme that allows a controller to provide network management functions. In an embodiment, the scheme is designed to be implemented as an application that accesses data from the control plane of the network.

For complete and effective network management, the controller may run both monitoring functions and routing functions. An embodiment describes the controller's monitoring functions.

An embodiment uses graph theory techniques and introduces the concept of phantom nodes to produce outputs that can be used by the controller to both proactively and reactively update flow rules.

While the OpenFlow® interface is important to collecting statistical information on the network, an embodiment uses monitoring system that uses the northbound interface, the application programming interface (API) as described in OpenFlow® switch specifications.

Graph theory may be used to model a network and may be applied to various networking problems including network robustness and connectivity optimization. Specifically, algebraic connectivity, the second smallest eigenvalue $\lambda_2$, may be used as a way to determine network robustness. An algebraic connectivity may be used to determine connectivity optimization. Additional graph theory analysis concepts, such as centrality and eigenspectrum, may be used.

An embodiment may use graph theory analysis for the purpose of monitoring a dynamic network. An embodiment describes physical application and meaning to the proven mathematical foundations of nodal centrality metrics formed by eigenvalues and eigenvectors. A monitoring scheme embodiment utilizes graph theory tools and mathematical concepts to monitor the dual basis for the purpose of identifying changes in nodal connectivity and congestion threshold crossings. An embodiment uses a phantom node to establish a congestion threshold in the dual basis has not previously been reported in literature. An embodiment describes a method to estimate a node's congestion using a phantom node and nodal degrees.

Software Defined Networks

SDNs provide a new and innovative method to simplify network hardware by logically centralizing the routing functions of a network at the SDN controller. This means the routing methods and protocols are removed from the network switches and placed on the SDN controller. The controller acts as the network's operating system by providing routing and packet forwarding instructions to all the simplified switches under its control. This master-slave construct is accomplished through the design of the SDN stack and the route generation process.

Architecture

Figure 2:
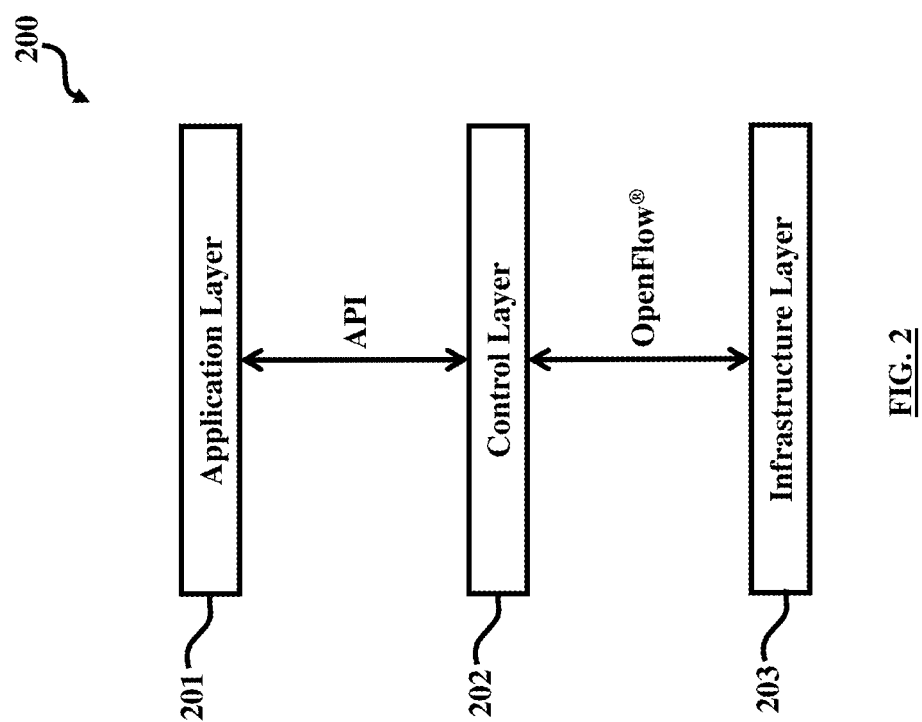
FIG. 2 is a schematic diagram illustrating layers in a software defined network according to an embodiment herein.

FIG. 2 is a diagram illustrating three layers 200 of an SDN separating the control plane from the data plane. At the base, the infrastructure layer 203 contains the physical topology of the network. This layer is the data plane and is composed of the forwarding devices or switches. The middle layer 202 is the control layer; the control layer is the control plane of the network. The top layer 201 is the application layer where different applications can be implemented to interface with the control plane.

The three layers of the SDN stack are able to communicate and exchange data via interfaces. The northbound interface is between the application layer and control layer; the API provides data exchange for the northbound interface. This interface has not been standardized; ONF currently has a working group exploring this interface. As the standardized southbound interface, OpenFlow® provides data exchange between the control later and the infrastructure layer. It allows the controller to update routing tables in the switches, which provides routing functions for the network. Switch specifications have been presented by ONF to ensure the proper function of the routing process across different vendor's forwarding devices.

Routing

Figure 3:
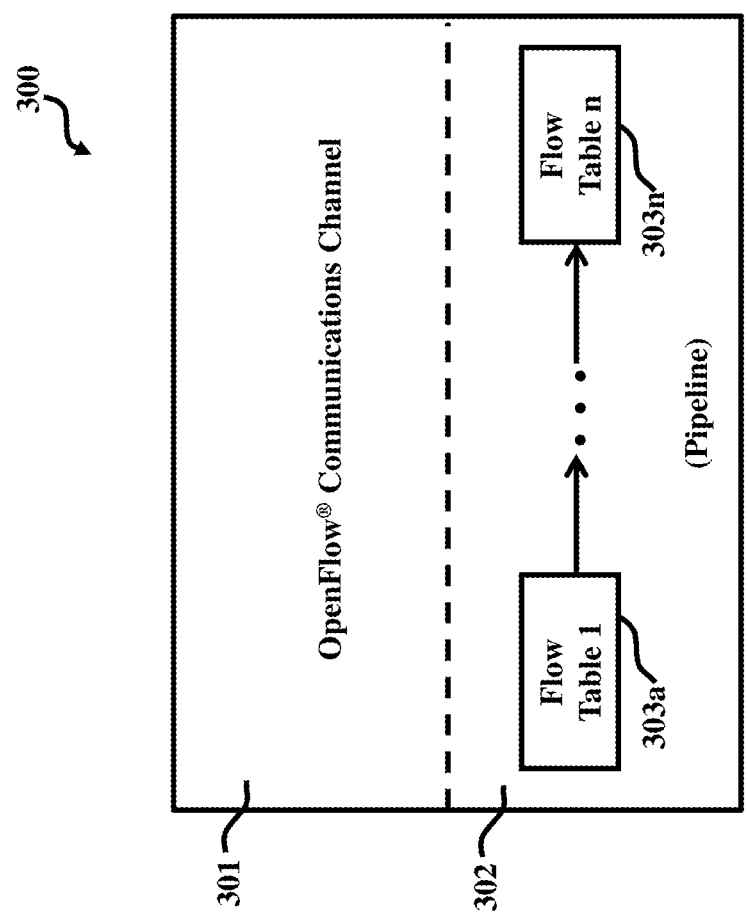
FIG. 3 is a schematic diagram illustrating a switch in a software defined network according to an embodiment herein.

FIG. 3 is a schematic diagram illustrating components of an OpenFlow® switch 300, according to an embodiment. For the purposes of routing, the OpenFlow® protocol may be used to exchange information between the control plane and the data plane in order to program routing tables in the switches. The switch 300 contains multiple flow tables 303a, . . . 303n, and a secure communications channel 301. The flow tables 303a, . . . 303n may contain flow entries, which provide the switch 300 with packet routing information. The controller is able to exchange data via the secure channel for the purpose of changing the flow entries within the flow tables 303a, . . . 303n. This ability provides proactive and reactive programmable routing to the network. The switch 300 then uses the flow tables 303a, . . . 303n to match flow rules for the purpose of routing incoming packets.

Packet Matching

A switch 300 uses the programmed flow tables to match incoming packets to flow entries, or flow rules, for the purpose of packet forwarding. If multiple flow tables 303a, . . . 303n exist in a switch 300, the flow tables 303a, . . . 303n are organized according to priority. A switch 300 processes an incoming packet and attempts to match the packet to a flow rule in one of the tables in priority order. This process is known as the pipeline process 302.

Figure 4:
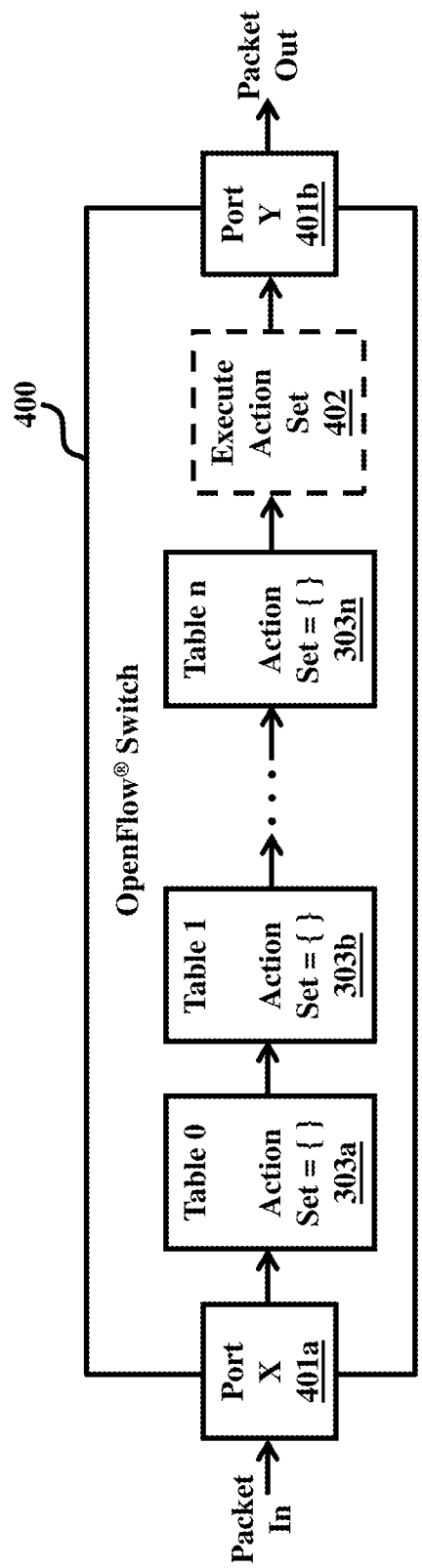
FIG. 4 is a schematic diagram illustrating a switch in a software defined network according to an embodiment herein.

FIG. 4, with respect to FIG. 3, is a schematic diagram illustrating a pipeline of tables in an OpenFlow® switch 400. The switch 400 may receive an incoming packet and then attempts to match that packet to a flow rule within a flow table of the plurality of flow tables 303a, . . . 303n. The tables are searched in priority order; "Table 0" has the most priority, and "Table n" has the least priority. Within the flow table, the ingress port 401a, metadata, and packet header data are used to match a packet to a flow rule. If the switch 400 finds a match, it performs the action associated to the flow rule. Some actions direct the switch 400 to a different flow table for another action, but again table priority is taken into account. When the switch 400 finds a match that has an action that does not direct the switch 400 to a different flow table, the pipeline matching process stops and the switch 400 then executes that action set 402 by forwarding the packet to an egress port 401b. If a match is not found, the switch 400 either asks the controller to provide a flow rule or drops the packet depending on switch configurations.

Flow Entries

The switch 400 uses a flow entry in the pipeline process to match a packet to a specific action set; however, the flow entries contain additional information set by the controller and used by the switch to manage the entries. The different fields contained within a flow entry of a flow table are displayed in Table 1. The match field contains the entry port, packet headers, and optional metadata and is used by the switch to determine an action set. The priority field is used to match flow entry precedence. The counter field is used to update specified counters. The counters can be used by the controller to determine the amount of traffic moving across the switches. The controller uses the instructions field to change action sets or modify pipeline processing. The timeout field contains the time to live (TTL) information for the specific flow entry. If the TTL expires, the flow entry is removed from the flow table. Lastly, the cookie field is used by the controller for filtering and management processes. Each of these fields provides a unique set of data that aids in the flow rule generation process.

TABLE 1

Main components of a flow entry in a flow table.

| Match Fields | Priority | Counters | Instructions | Timeouts | Cookie |
| --- | --- | --- | --- | --- | --- |

Polling the Switch

For routing management, the controller requires information from the switch 400 to better understand traffic loads throughout the network. The read-state message provides the controller with the ability to collect the statistical information from the switch 400 that is stored within the counters field of the flow tables. The controller sends the read-state message via the secure channel using OpenFlow® protocols, and the switch 400 is required to respond with information regarding statistics, capabilities, and configurations. The required and optional counters that are found on OpenFlow® switches are displayed in Table 2. The information stored in the counters field is sent to the controller during statistical polling. Since the counters are configurable by the controller, the required counters can be set to collect information needed for determining current network states.

TABLE 2

List of counters.

| Counter | Bits | |
|---|---|---|
| Per Flow Table | | |
| Reference count (active entries) | 32 | Required |
| Packet Lookups | 64 | Optional |
| Packet Matches | 64 | Optional |
| Per Flow Entry | | |
| Received Packets | 64 | Optional |
| Received Bytes | 64 | Optional |
| Duration (seconds) | 32 | Required |
| Duration (nanoseconds) | 32 | Optional |
| Per Port | | |
| Received Packets | 64 | Required |
| Transmitted Packets | 64 | Required |
| Received Bytes | 64 | Optional |
| Transmitted Bytes | 64 | Optional |
| Receive Drops | 64 | Optional |
| Transmit Drops | 64 | Optional |
| Receive Errors | 64 | Optional |
| Transmit Errors | 64 | Optional |
| Receive Frame Alignment Errors | 64 | Optional |
| Receive Overrun Errors | 64 | Optional |
| Receive CRC Errors | 64 | Optional |
| Collisions | 64 | Optional |
| Duration (seconds) | 32 | Required |
| Duration (nanoseconds) | 32 | Optional |
| Per Queue | | |
| Transmit Packets | 64 | Required |
| Transmit Bytes | 64 | Optional |
| Transmit Overrun Errors | 64 | Optional |
| Duration (seconds) | 32 | Required |
| Duration (nanoseconds) | 32 | Optional |
| Per Group | | |
| Reference Count (flow entries) | 32 | Optional |
| Packet Count | 64 | Optional |
| Byte Count | 64 | Optional |
| Duration (seconds) | 32 | Required |
| Duration (nanoseconds) | 32 | Optional |
| Per Group Bucket | | |
| Packet Count | 64 | Optional |
| Byte Count | 64 | Optional |
| Per Meter | | |
| Flow Count | 32 | Optional |
| Input Packet Count | 64 | Optional |
| Input Byte Count | 64 | Optional |
| Duration (seconds) | 32 | Required |
| Duration (nanoseconds) | 32 | Optional |
| Per Meter Band | | |
| In Band Packet Count | 64 | Optional |
| In Band Byte Count | 64 | Optional |

The architecture and routing process may allow the SDN to separate the data plane from the controller plane. This means networks costs can be decreased by using inexpensive switches in conjunction with a programmable controller. The programmable controller, however, must then be capable of identifying and handling different network conditions, specifically congestion and attack, in order to update flow rules in the flow tables for the purposes of network management.

Network Congestion and Attacks

Network congestion and network attack are the two conditions that should be monitored in a SDN to provide effective network management. Congestion occurs when a node is overwhelmed by the number of packets that must be processed. Each node and network has a packet-handling capacity and, in general, congestion is defined by a node or network that reaches 80 percent of its packet-handling capacity. When a packet arrives at a switch, it is examined for match data. That data is then used to match a flow rule and determine an action. Based on the action, the packet is then sent to the appropriate output buffer. When multiple packets arrive at a switch, the packets are queued in memory until they can be processed. If the rate of packet arrival exceeds the rate of packet processing and packet transmission, the queue size grows and delay is experienced. At approximately 80 percent queue utilization, the queue length and delay begin to grow at extreme rates. If a congestion control mechanism is not implemented, the queue eventually overflows and the node fails because it cannot keep up with network traffic.

An attack is different from congestion because it is malicious in nature, but the result of a denial of service (DoS) attack is congestion. In a DoS attack, the goal is to prevent or deny access to a specific service or node. The most common type of DoS attack is a "flood" attack. The attacker overloads the node with packets until the node's queue becomes overwhelmed and the legitimate packets either experience large delays or are dropped due to a lack of space in the memory.

Congestion and attack are two network conditions that require action by the controller within a SDN. Both reduce or eliminate communication paths between nodes and therefore, the controller must proactively and reactively update flow rules to combat these network conditions.

Graph Analysis

Graph theory may provide a way to represent a network. To model a network's topology, the network may be defined as a graph, the hardware device is defined as a node, and the communication path between the devices is defined as a link. Hardware devices may include controller device or forwarding device. Hardware devices and nodes are used interchangeably herein. Communication paths and links are used interchangeably herein.

For a graph G there exists a set of nodes N and a set of links L. All links are assigned weights W to represent a measurable quantity like utilization U or capacity available $C_A$. There are two types of graphs: complete graphs and incomplete graphs. In a complete graph $K_n$, a link exists between every set of nodes. If a link does not exist between every set of nodes, the graph is considered incomplete.

To model a network as a graph, the topological information is used to create the adjacency matrix A, the degree matrix D, and the Laplacian matrix Q. The n×n adjacency matrix contains n nodes and is used to describe the network topology. Each element, $e_{ij}$, within A is determined by $$A(i, j) = \begin{cases} w_{ij} & \text{if } e_{ij} \in L \\ 0 & \text{otherwise} \end{cases} \quad (1)$$

where $w_q$ is the link weight between the $i^{th}$ and $j^{th}$ node. The n× n degree matrix is used to determine the degree, $d_{ij}$, or number of links, for each node, and is defined as $$D(i,j) = \begin{cases} \sum_{j=1}^{n} w_{ij} & \text{if } i = j \\ 0 & \text{otherwise} \end{cases} \quad (2)$$

The Laplacian matrix is then defined as $$Q = D - A \quad (3)$$

or $$Q = \begin{cases} -w_{ij} & \text{if } e_{ij} \in L \\ \sum_{j=1}^{n} w_{ij} & \text{if } i = j \\ 0 & \text{otherwise} \end{cases} \quad (4)$$

The adjacency matrix, degree matrix, and Laplacian matrix represent undirected graphs. This means direction is not included or indicated by a link; a link simply specifies that a connection or communication path exists between two nodes. Directed graphs can be represented using the incidence matrix, B, but this concept is not explored in this thesis. For the purposes of this thesis, flow modeling is not necessary for spectral analysis.

Spectral Graph Analysis

Spectral graph theory, a field within graph theory, uses graph characteristics to provide spectral analysis. The eigenvalues and eigenvectors of the adjacency and Laplacian matrices are examined to derive graph characteristics. The eigenvalues and eigenvectors of the Laplacian matrix are defined as the solution to $$Qv = \lambda v \quad (5)$$

or $$(Q - \lambda I)v = 0 \quad (6)$$

where $\lambda$ is an eigenvalue solution and $v$ is an eigenvector solution. Since Q is a square matrix, n eigenvalue and eigenvector solutions exist. Each eigenvector solution $v_i$ is tied directly to the eigenvalue solution $\lambda_i$, where i is the eigenindex for the range of eigenvalues and eigenvectors. Additionally, each $v_i$ has n elements, which are defined as $v_i^l$, where l is the $l^{th}$ element of the $i^{th}$ eigenvector. The n eigenvalue and eigenvector solutions form the diagonal eigenvalue matrix $\Lambda$, and the eigenvector matrix V, respectively. The relationship between these two matrices is $$Q = V \Lambda V^T \quad (7)$$

where $\Lambda$ is a diagonal matrix containing the n eigenvalue solutions, and V is a n×n matrix containing the n column eigenvector solutions. The eigenspace described by $\Lambda$ and V provides graph characteristics that can be analyzed to determine information, such as robustness, connectivity optimization, and centrality.

Overall, graph theory and spectral graph theory provide tools to model and analyze networks for the purposes of determining states or conditions. Each row of the A is directly tied to a specific node, and network conditions experienced by that node are accounted for in the link weights of A. Both D and Q are calculated from A which means that the rows in each of these vectors is directly tied to a specific node as well. This means V and $\Lambda$ are also effected by changing link weights. As a result, graph theory analysis provides tools that can be exploited for network analysis and network management.

SDNs may be designed to have a logically centralized operating system that controls and manages network conditions by setting flow rules within flow tables. The centralized controller, therefore, may have a method to analyze and identify network conditions. Graph analysis may be used as a tool for providing network management capabilities to a SDN controller.

Network Monitoring Methodology

Within the SDN framework, the centralized controller is responsible for determining and updating flow rules that dictate how packets are routed in the network. The controller collects statistical data on the current state of the network to develop and update these flow rules. This process allows the controller to provide adaptive traffic flow management for the entire network. In order for this process to work, the controller should be able to monitor the network's state with the goal of identifying, locating, and resolving congestion.

An embodiment uses dual basis analysis. The dual basis includes the concepts of the eigencentrality basis and the nodal basis. These provide tools and concepts used in an embodiment. An embodiment describes phantom nodes. Phantom nodes provide the controller with a measurable tool to determine network conditions. An embodiment uses phantom nodes and eigenanalysis to determine network connectivity and congestion. An embodiment uses variables that allow the monitoring scheme to be tailored for specific network requirements.

Dual Basis

Eigenvalues and eigenvectors may reveal a wealth of information about network states and node interactions that can be used to monitor and manage a network. The dual basis provides two perspectives on the link between eigenvalues and eigenvectors. Using these links, a controller device can gain detailed knowledge of network connectivity and congestion in order to update flow rules. Controller device and controller are used interchangeably herein.

Orthogonality

A controller must be able to understand nodal interactions and behavior to perform effective network management. The dual basis allows a controller to perform a detailed analysis of these interactions and behavior at a given instant and over time. One characteristic of the Laplacian matrix is that it always forms a dual basis. The dual basis is important in network analysis and management because it produces two orthogonal bases that provide information on how much influence an individual node has on a particular eigenvalue, and what influence an individual node has across the entire range of eigenvalues. By analyzing the changes in both bases over time, a node's connectivity and centrality can be determined and tracked continuously.

Given an orthonormal matrix of eigenvectors V, the dual basis is defined as $$V^T V = I \quad (8)$$

where I is the identity matrix. Using the right eigenvector, a transformation of (7) can occur by rearranging $$QV = V\Lambda(V^T V) = V\Lambda \quad (9)$$

Conversely, using the left eigenvector, a transformation of (7) can occur by rearranging $$V^T Q = (V^T V)\Lambda V^T = \Lambda V^T \quad (10)$$

The right eigenvector transformation and left eigenvector transformation produces two orthogonal bases, which can be defined as $$QV = z_1 \quad (11)$$

$$V^T Q = z_2 \quad (12)$$

where $z_1$ is the eigencentrality space and $z_2$ is the nodal space.

Together, these two spaces define two distinct perspectives of network strength and connectivity. The eigencentrality basis describes the amount of influence each node has on a single eigenvalue. The nodal basis, on the other hand, describes a single node's influence across all eigenvalues. An embodiment uses eigencentrality and nodal basis together for monitoring a SDN.

Eigencentrality Basis and Nodal Basis

The eigencentrality basis and nodal basis may form a holistic representation of nodal behavior and nodal interactions within a network. The eigencentrality basis characterizes network centrality while the nodal basis characterizes nodal influence. Both of these characteristics provide connectivity metrics that measure a node's health and strength within a network.

Network Centrality

Figure 5:
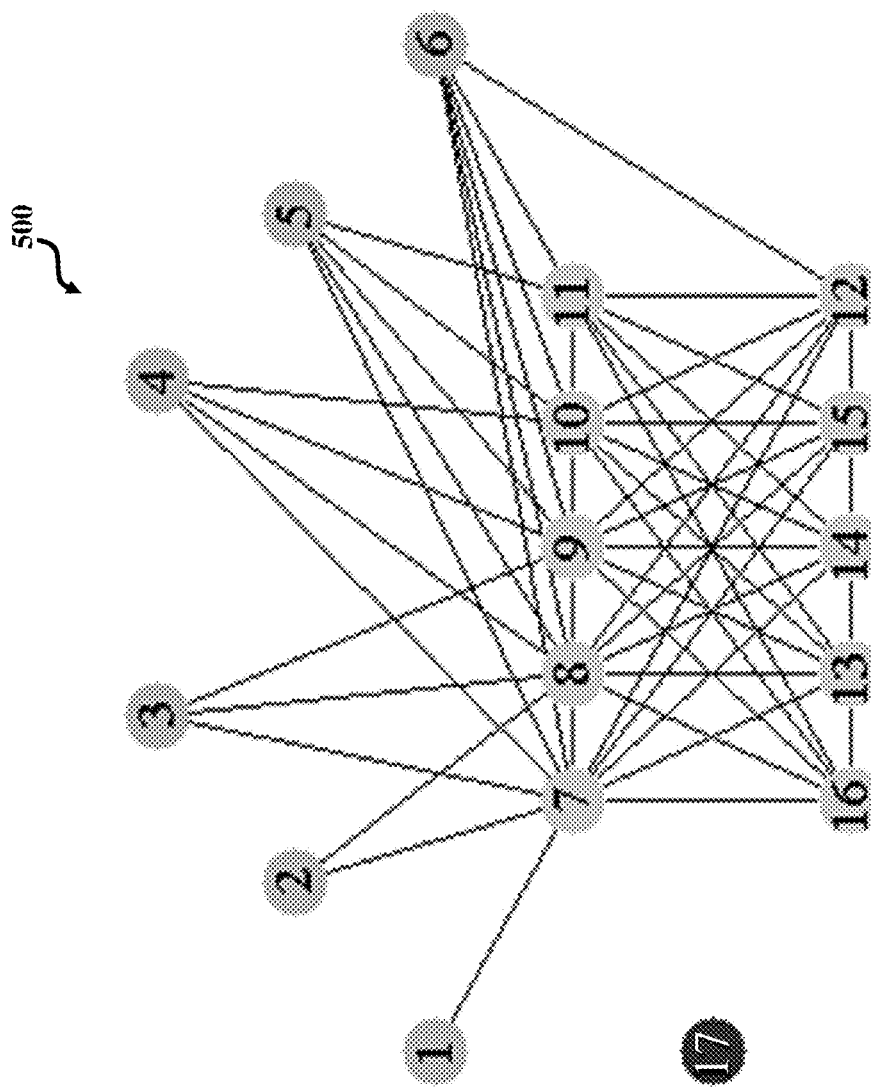
FIG. 5 is a schematic diagram illustrating a software defined network according to an exemplary embodiment herein.

FIG. 5 is a schematic diagram illustrating a SDN 500, according to an exemplary embodiment herein. SDN 500 includes 17 node network with 10 core network nodes 7, . . . 16, six access network nodes 1, . . . 6, and one disconnected node 17. SDN 500 is used herein to demonstrate the network centrality characteristic formed by the eigencentrality basis. The 10 core network nodes represent a core network while the six access network nodes represent access networks. The 17×17 Laplacian matrix of the network is used to solve (7) for the set of 17 eigenvector and eigenvalue solutions. Since node 17 is disconnected and two zero eigenvalues exist.

Figure 6:
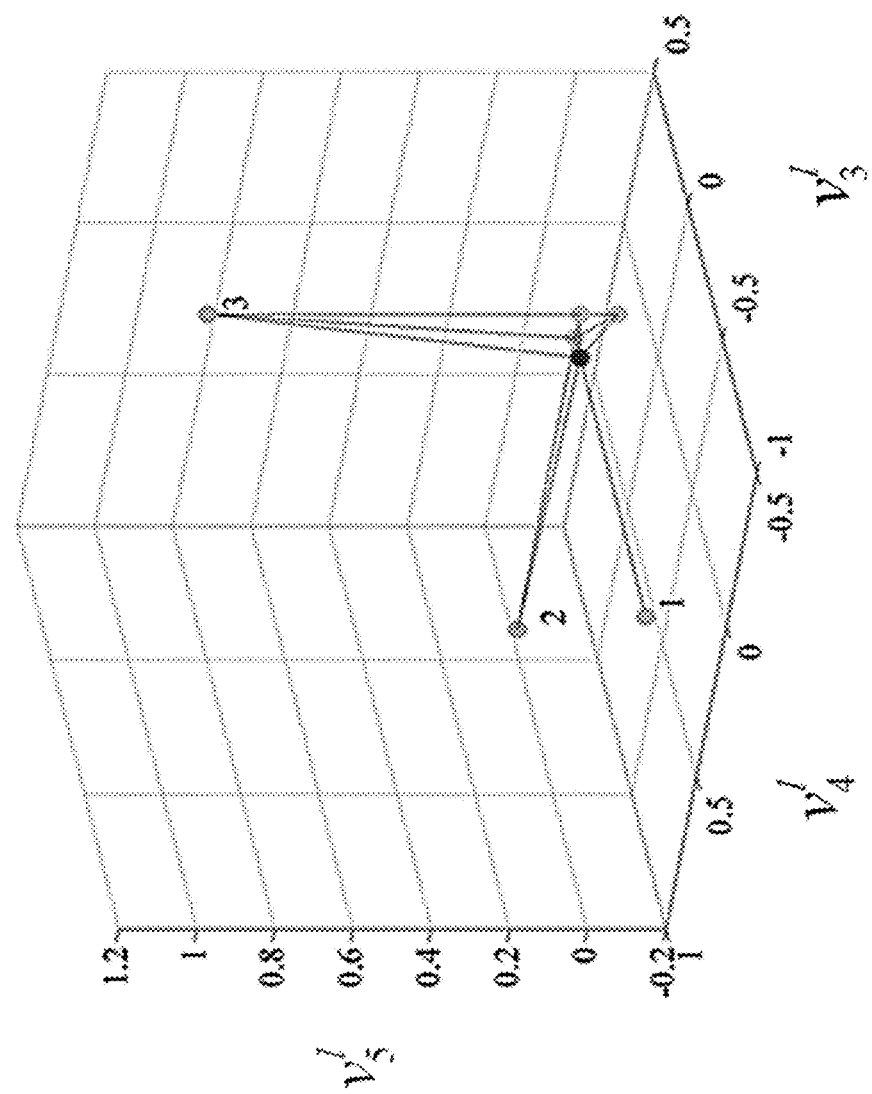
FIG. 6 is a graph illustrating simulation results, according to an exemplary embodiment herein.

FIG. 6, with reference to FIG. 5, is a graph illustrating the eigencentrality basis for SDN 500. FIG. 6 is graphed using the three 17×1 eigenvectors associated to the three smallest nonzero eigenvalue solutions. The $l^{th}$ element of $v_i^l$ is tied to the $l^{th}$ row of the adjacency matrix, which in turn is associated to a specific node. Therefore, each plotted ($v_3^l$, $v_4^l$, $v_5^l$) coordinate represents a specific node within the network. The links are also shown between the nodes.

The graphed results in FIG. 6 provide a good visual representation of the connectedness as described by the eigencentrality basis. Nodes two, three and four are plotted away from the center of the graph while the remaining nodes are plotted in the center. This separation indicates the centrality of each node; nodes that are plotted in the center of the graph are more important and have more impact on network connectivity. Since the more central nodes have a larger degree, this also provides a way to distinguish strong nodes from weak nodes. Weak nodes are more likely to be adversely affected by network conditions such as congestion, while stronger nodes have more links to combat congestion. Overall, the eigencentrality basis provides information on the connectedness, strength, and centrality of nodes in the network.

Nodal Influence

The 17 node SDN 500 displayed in FIG. 5 is also used to demonstrate the nodal influence characteristic formed by the nodal basis. The nodal basis represents the influence that a particular node has on each eigenvalue solution. Substituting $v_i$ for V, (7) is solved for $$Q(i,i) = v_{i1}\lambda_1 + v_{i2}\lambda_2 + v_{i3}\lambda_3 + \ldots + v_{in}\lambda_n \quad (13)$$

where $v_{ij}$ is the $i^{th}$ element in the $j^{th}$ eigenvector. Since $Q(i,i)$ is equal to the degree of the $i^{th}$ node in the adjacency matrix, $v_{i1}\lambda_1 + v_{i2}\lambda_2 + v_{i3}\lambda_3 + \ldots + v_{in}\lambda_n$ represents the amount of influence the node has on each eigenvalue solution. Therefore, the nodal basis is plotted using the set of (i, $v_i^l$) coordinates for a specific node l.

Figure 7:
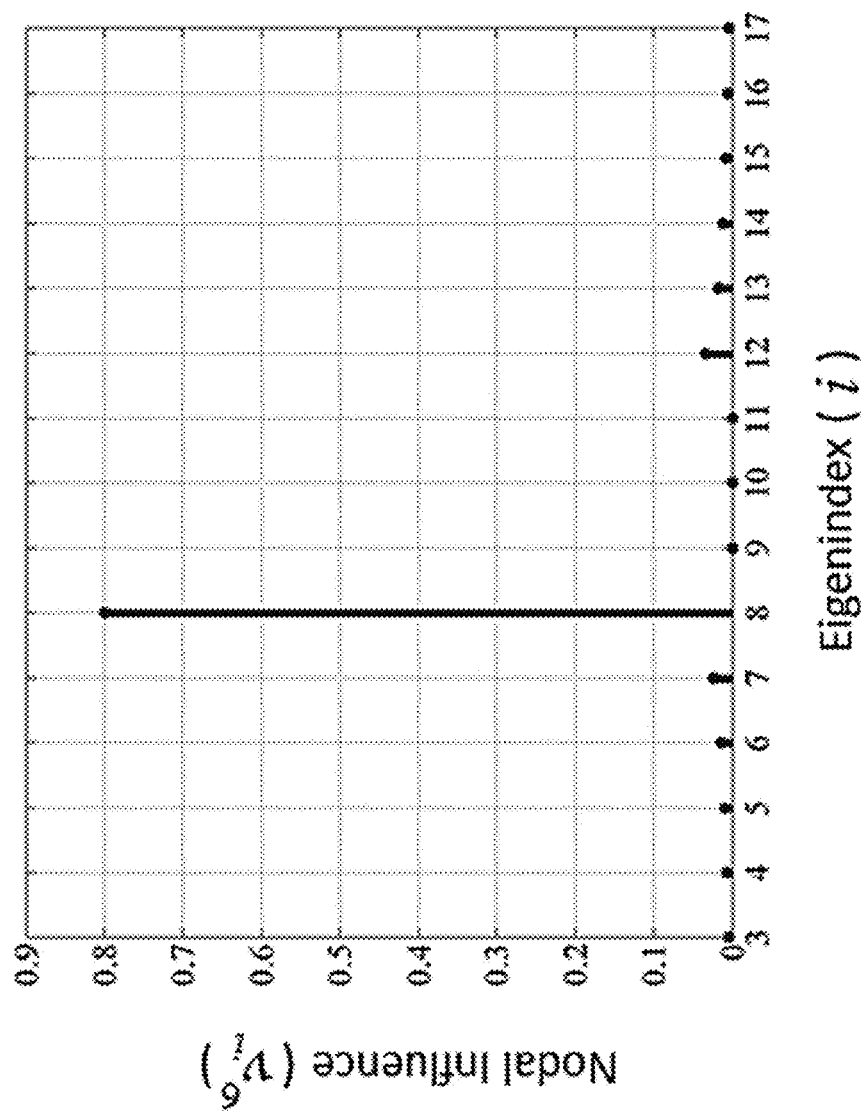
FIG. 7 is a graph illustrating simulation results, according to an exemplary embodiment herein.

FIG. 7, with reference to FIGS. 5 and 6, is a graph illustrating nodal basis. Node six's nodal basis is plotted in FIG. 7 using $v_i^6$ for all 17 eigenvectors. Node six has a large nodal influence on the eighth eigenvalue and small nodal influences on the remaining eigenvalues. Since larger eigenvalues are associated to more connectedness and smaller eigenvalues are associated to less connectedness, nine nodes are more connected than node six; nine nodes have larger nodal influence on eigenvalues nine through seventeen. This perspective decouples nodes in the network to allow for analysis of the behavior and health of individual nodes. The decoupling allows the controller to analyze a specific node's change in influence and connectivity over time.

An embodiment uses the eigencentrality basis and the nodal basis, together, as tools for network analysis and control. They show that connectivity and node health can be determined from the eigenvectors and eigenvalues. Therefore, a controller can gain insight into a network's state if it is programmed to track and analyze the changes in the eigenvalue and eigenvector matrices. This basic concept is utilized in conjunction with phantom nodes to provide the controller with a method of identifying adverse network conditions.

Phantom Nodes

An embodiment utilizes graph theory matrices in a dynamic manner to compare changes in the eigenspectrum over time. To implement graph theory analysis in a dynamic network, an embodiment uses phantom nodes.

A phantom node is defined as a node that appears within the adjacency matrix that does not physically exist within the network topology. The phantom node is a capacity-static node with a link weight that is set by the network administrator during network initialization. The link weight causes the phantom node have the largest nodal influence of a particular eigenvalue within the eigenindex; the largest nodal influence within an eigenvector is defined as $v_i^{j\ max}$ where $j_{max}$ is the largest element of the eigenvector. The phantom node can be placed to have control over any eigenvalue by selecting the appropriate link weight.

Once positioned in the eigenspectrum, the phantom node establishes a connectivity or congestion threshold that other nodes can be compared to. A node that has $v_i^{j\ max}$ for an eigenvalue smaller than the phantom node is less connected or weaker than the phantom node since smaller eigenvalues are associated to less connectedness. In a dynamic setting, the controller identifies shifts in nodal influence to determine nodes that are congested, underutilized, or attacked.

Monitoring Methodology

In an embodiment, the SDN controller uses a method that monitors the network's state, analyzes connectivity and congestion, and takes action to resolve congestion and connectivity problems. An embodiment describes a SDN monitoring scheme that allows a controller to manage a network by identifying and locating congestion, network connectivity issues, link failures, and nodal failures due to attack or hardware malfunction.

Figure 8:
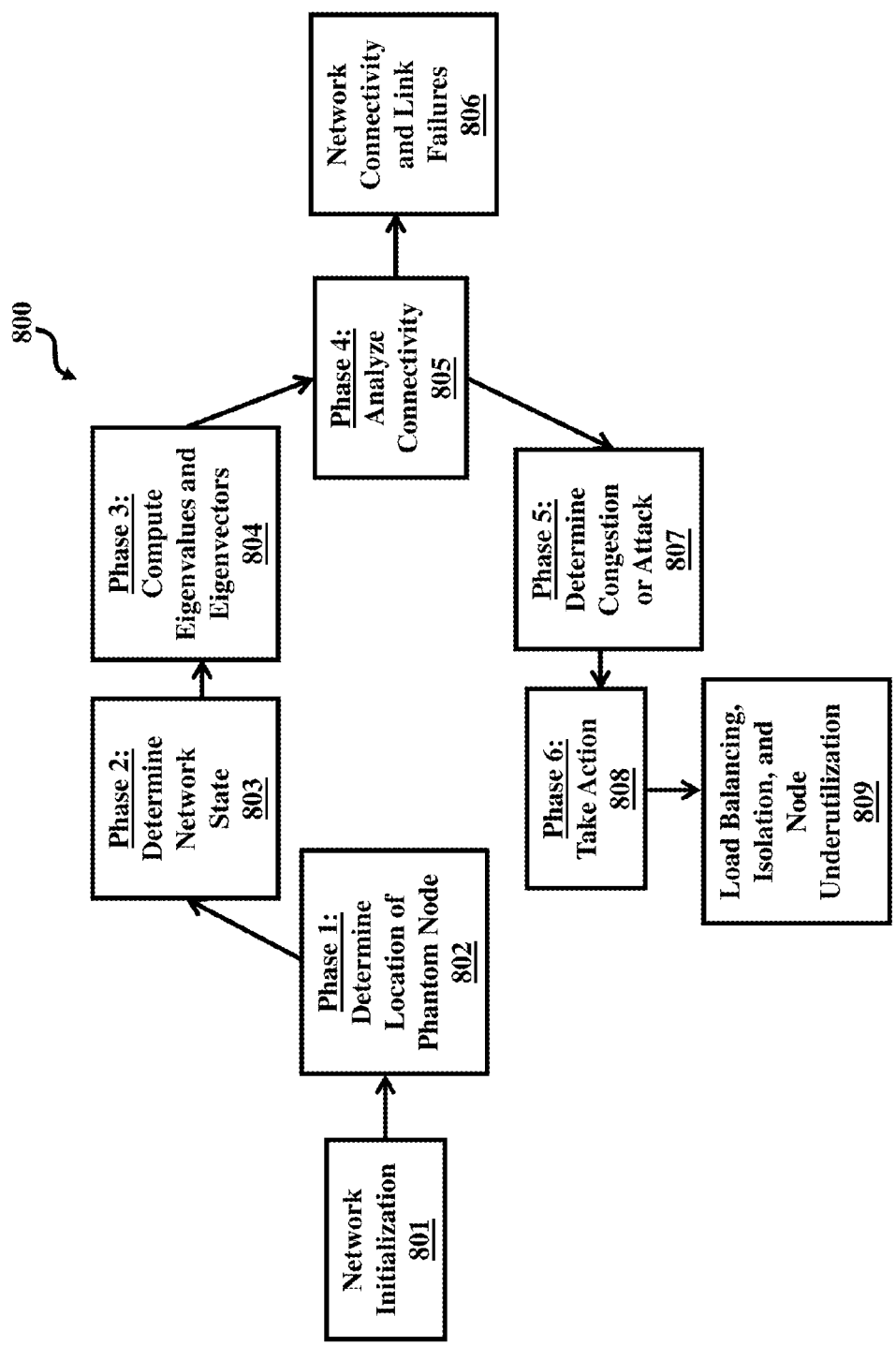
FIG. 8 is a flow diagram illustrating a method according to an embodiment herein.

FIG. 8 is a flow diagram illustrating a method 800 for network monitoring according to an embodiment. In an embodiment, at step 801, method 800 performs network initialization. At step 802, method 800 determines location of phantom nodes. At step 803, method 800 determines network state. At step 804, method 800 computes eigenvalues and eigenvectors corresponding to the adjacency matrix of the network. At step 805, method 800 analyzes connectivity of the network. At step 806, method 800 evaluates network connectivity and discovers any link failures in the network. At step 807, method 800 determines congestion or an attack in the network. At step 808, method 800 takes a proper action to address any adverse condition in the network. At step 809, method 800 determines to perform any of load balancing, isolation of a node or a link, and redirecting traffic to an underutilized node in the network.

The method's loop is set in motion upon completion of network initialization at step 801. During network initialization step 801, the network administrator may set up the network and defines the threshold and parameter values that will be discussed later in this chapter. Once in motion, the method cycles through the six phases producing outputs, which are used to determine routing decisions.

Determine Location of Phantom Node

At step 802, phase 1 of method 800 may give instruction to the controller on the placement of the phantom node within the network. An embodiment uses the placement of the phantom node for monitoring the SDN because adverse network conditions cannot be accurately detected for the node attached to the phantom node. The phantom node changes the degree of the node that it is attached to in the adjacency which affects the number and order of the eigenvalues and eigenvectors, and the values within the eigenvalue and eigenvector matrices. This degree change causes the node to appear stronger and more connected and the controller is provided with inaccurate information regarding the node's state.

In an embodiment, the controller device attaches the phantom node to a strong node in the network because a strong node is less likely to be overcome by congestion in the time it takes to complete one cycle of the monitoring loop. In other words, this node is the least likely node to become overly congested in the network and does not need to be monitored as closely. Additionally, the location of the phantom node needs to change each time the controller performs Phase 1 to ensure node congestion, over-utilization, or failure will not go undetected by the SDN controller.

Figure 9:
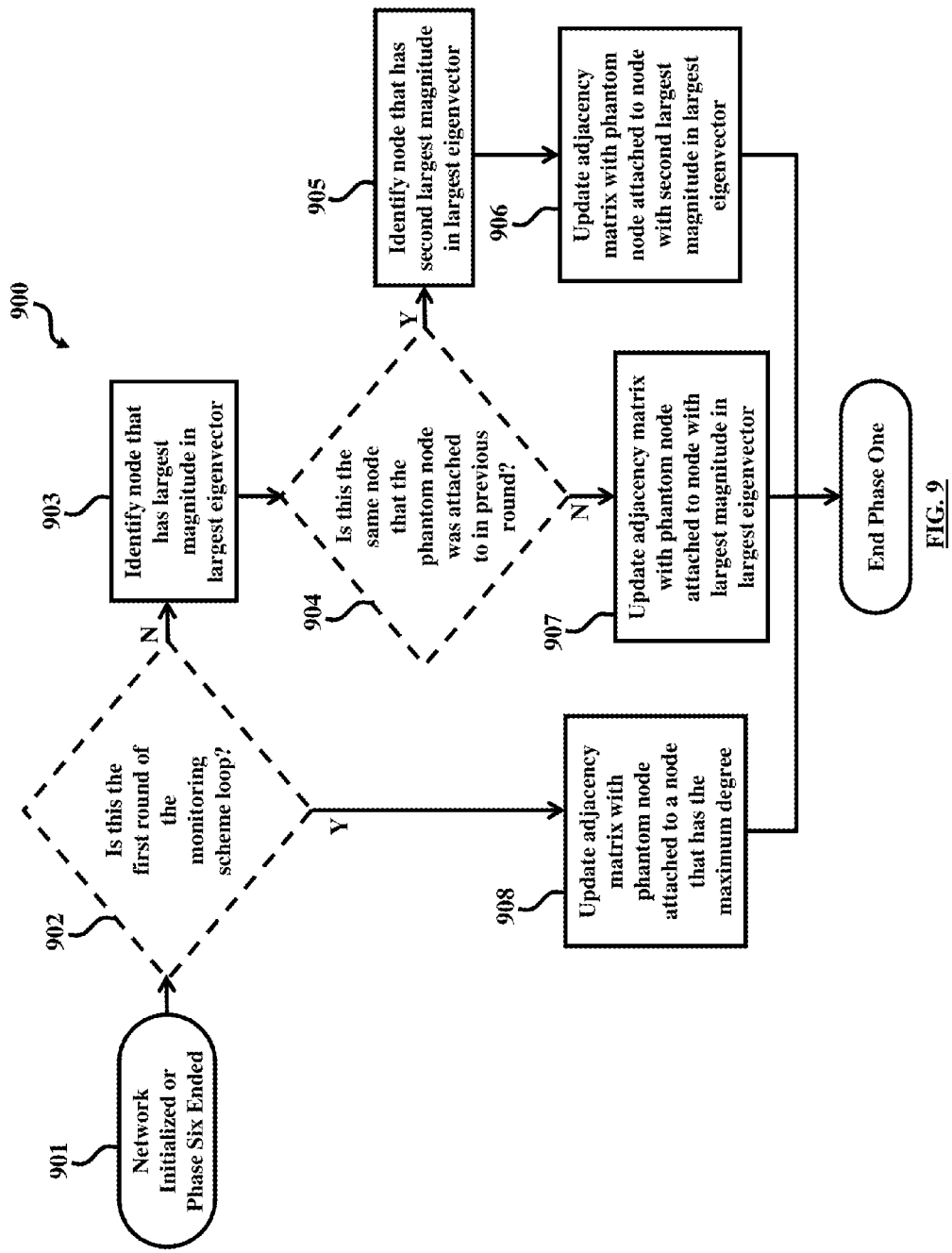
FIG. 9 is a flow diagram illustrating a method according to an embodiment herein.

FIG. 9 is a flow diagram illustrating a method 900 for determining a location of the phantom node, according to an embodiment. In an embodiment, at step 901, method 900 starts when network is initialized or phase 6 of method 800 is ended in steps 808 and 809. At step 902, method 900 determines whether it is in the first round of the monitoring method 800. If it is in the first round of the monitoring method, at step 908, method 900 updates adjacency matrix with phantom node attached to a node that has the maximum degree and method 900 ends. If, at step 902, method 900 determines that it is not in the first round of the monitoring scheme, at step 903, method 900 identifies a node that has the largest magnitude in the largest eigenvector. At step 904, method 900 determines whether the node from step 903 is the same node the phantom node was attached to in the previous round. If yes, at step 905, method 900 identifies node that has second largest magnitude in largest eigenvector. At step 906, method 900 updates adjacency matrix with phantom node attached to a node with the second largest magnitude in the largest eigenvector, and method 900 ends.

If at step 904, method 900 determines that the node from step 903 is not the same node that the phantom node was attached to in the previous round, at step 907, method 900 updates adjacency matrix with phantom node attached to a node with the largest magnitude in the largest eigenvector, and method 900 ends.

If network initialization just finished (step 901), the phantom node is attached to the node with the maximum degree, $D_{max}$, since it is the strongest node in a static network. Otherwise, the phantom node is attached to the node that has $v_n^{j\ max}$ since it is the most connected node within the dual basis, and furthest away from the congestion threshold established by the phantom node.

Once the phantom node is placed, or relocated, the controller has finished this phase and is ready to move onto Phase 2. At this point, the network is ready to collect network information to begin analysis of the strength and connectedness of all nodes in the network.

Determine Network State

Referring to FIG. 8, the purpose of Phase 2 at step 803 is to produce an adjacency matrix that can be used in future phases to compute additional matrices and analyze network connectivity. This requires a link weight metric and minimum link weight threshold to be defined because the state of a link is defined by its link weight.

In an embodiment, $C_A$ is used as the measurable metric for link weights. $C_A$ is the fraction of the bandwidth or throughput that is available at any given time and ranges between zero and one. Therefore, the link weight $w_{ij}$ between the $i^{th}$ and $j^{th}$ node is defined as $$w_{ij}=C_A=1-u_{ij} \tag{14}$$

where $u_{ij}$ is the link utilization or throughput between node i and node j. In general the link utilization is defined as $$u_{ij} = \frac{x(t)_{measured}}{x_{maximum}} \tag{15}$$

where $x(t)_{measured}$ is the measured utilized bandwidth or throughput as a function of time, and $x_{maximum}$ is the fixed maximum bandwidth or available throughput for that link. In an embodiment, the controller device has a mechanism to measure bandwidth or throughput for each individual link to determine $x(t)_{measured}$. The mechanism for measuring link bandwidths or throughputs is outside the scope of this thesis, but several link measurement techniques, including a passive measurement technique, have been proposed in literature for SDN.

In an embodiment, in addition to a link metric, a minimum link weight threshold is also defined and implemented in the adjacency matrix for connectivity analysis in Phase 4 of method 800 in FIG. 8.

Figure 10:
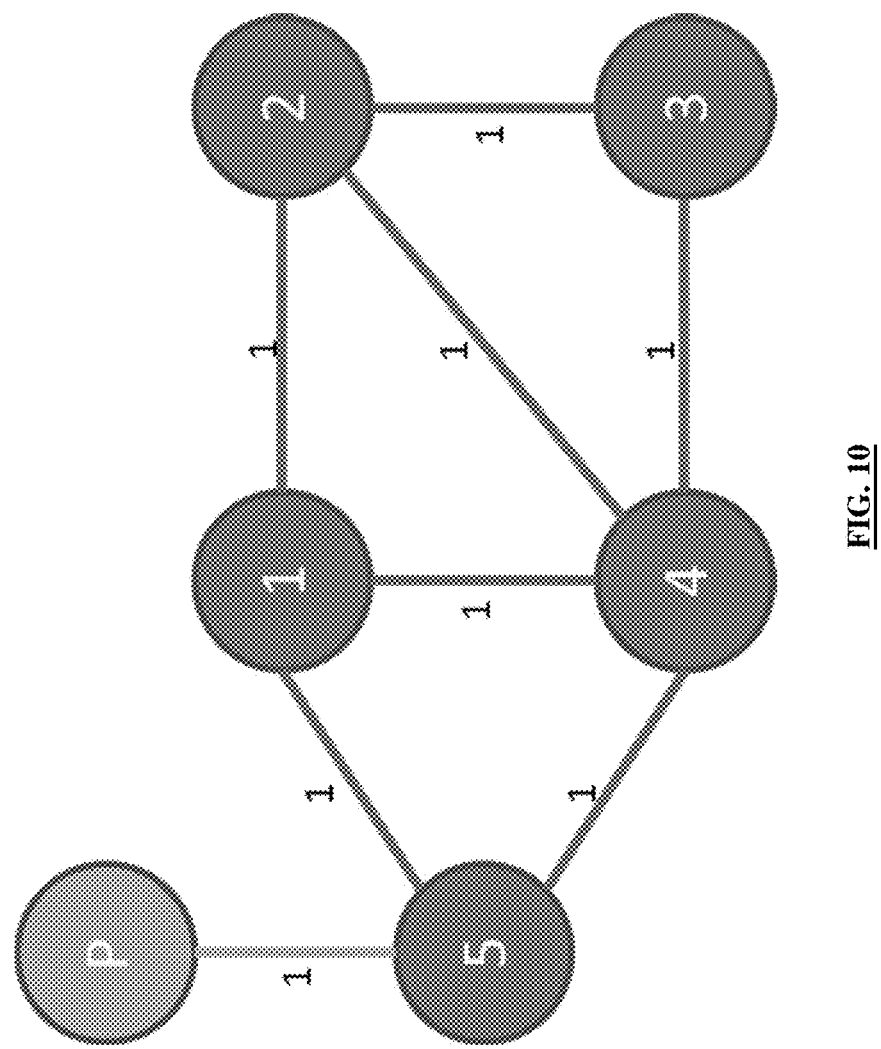
FIG. 10 is a schematic diagram illustrating a software defined network according to an exemplary embodiment herein.

FIG. 10 is a schematic illustrating a network with one phantom node and all link weights equal to one, according to an exemplary embodiment. The network shown in FIG. 10 is used to demonstrate the purpose and value of this threshold. If all of node two's link weights drop to 0.0001, the eigenvalues are {0, 0.004, 0.6973, 1.3820, 3.6181, 4.3028}. Node two becomes disconnected from the network since it does not have enough $C_A$ to communicate, but the presence of only one zero eigenvalue tells the controller that there are no disconnected components. This dilemma is resolved if a minimum capacity available, $C_{A\ min}$, threshold is set for $w_{ij}$ during network initialization. $C_{A\ min}$ is then used to determine whether a node should be considered connected; if $w_{ij} \leq C_{A\ min}$ then the controller sets that link to zero in the adjacency matrix.

Once the controller updates all link metrics, the adjacency matrix is complete. All additional information needed for connectivity and congestion analysis can be calculated in Phase 3 of method 800 in FIG. 8, using this matrix.

Compute Eigenvectors and Eigenvalues

The purpose of Phase 3 of method 800 in FIG. 8, is to calculate eigenvalue and eigenvector matrices that can be used in future phases to analyze the network's connectivity and congestion. The matrices are calculated using (1-6). This calculation is more difficult for larger networks but is not outside the capabilities of a controller that has a modern processor. Still, the calculation may not produce an eigenvector matrix that is functional for network analysis depending on the method employed. Therefore, the eigenvector needs to be formatted after the calculations are complete.

In an embodiment, to format the eigenvector, negative magnitudes and zero eigenvalues are addressed. Negative magnitudes occur because the values in each eigenvector sum to zero. Following principle component analysis, each value must be squared in the eigenvector. This produces positive magnitudes in all entries of the eigenvector and further separates nodes that have high magnitudes from nodes that have low magnitudes.

A zero eigenvalue always exists at $\lambda_1$ in the solution set of the Laplacian matrix, but additional zero eigenvectors occur when nodes become disconnected. Depending on the eigendecomposition method implemented, the method may not calculate the same standard eigenvector for a zero eigenvalue solution. This problem stems from the calculation of eigenvalues and eigenvectors from (5). Given a zero eigenvalue (5) becomes $$Qv = 0 \quad (16)$$

Numerous solutions exist that satisfy (15); therefore, a standard format must be applied to the eigenvector solution.

The standard format applied to the eigenvector must address both the zero eigenvalue, which always exists, and the additional zero eigenvalue that indicates node disconnections. First, the eigenvalue matrix is analyzed for zero eigenvalues. The null space is formed by the eigenvectors associated to the zero eigenvalues, and the reachability space is formed by the remaining vectors. Next, the reachability space is investigated for rows of zero. If a row of all zeroes exist in the reachability space, that row of the null space is investigated to find the entry closest to one. The entry that is closest to one is set to one; the remaining values in that row of the null space are set to zero. Additionally, the remaining values of that vector are also set to zero. Once this process is completed for all zero rows in the reachability space, there is one vector remaining in the null space that is unformatted. This vector is associated to the zero eigenvalue that always exists and does not provide any information on disconnections. Therefore, all of the values of that eigenvector are set to zero.

The network shown in FIG. 10 is used to illustrate the standard formatting process. If node two's links are dropped, an additional zero eigenvalue occurs and the eigenvector matrix would need to be formatted into standard form. The resulting eigenvalue matrix is $$\Lambda = \begin{bmatrix} 0.0000 & 0.0000 & 0.0000 & 0.0000 & 0.0000 & 0.0000 \\ 0.0000 & 0.0000 & 0.0000 & 0.0000 & 0.0000 & 0.0000 \\ 0.0000 & 0.0000 & 0.6972 & 0.0000 & 0.0000 & 0.0000 \\ 0.0000 & 0.0000 & 0.0000 & 1.3820 & 0.0000 & 0.0000 \\ 0.0000 & 0.0000 & 0.0000 & 0.0000 & 3.6180 & 0.0000 \\ 0.0000 & 0.0000 & 0.0000 & 0.0000 & 0.0000 & 4.3028 \end{bmatrix} \quad (17)$$

and the resulting standard eigenvector matrix is $$V = \begin{bmatrix} 0.0000 & 0.0000 & 0.0000 & 0.6325 & 0.6325 & 0.0000 \\ 0.0000 & 1.0000 & 0.0000 & 0.0000 & 0.0000 & 0.0000 \\ 0.0000 & 0.0000 & 0.6768 & 0.5117 & 0.1954 & 0.2049 \\ 0.0000 & 0.0000 & 0.2049 & 0.1954 & 0.5117 & 0.6768 \\ 0.0000 & 0.0000 & 0.2049 & 0.1954 & 0.5117 & 0.6768 \\ 0.0000 & 0.0000 & 0.6768 & 0.5117 & 0.1954 & 0.2049 \end{bmatrix} \quad (18)$$

The second eigenvector of (17) has zero entries for every row except the second row, which is associated to node two. The second row also has zero entries across the entire range of eigenvectors except the previously set one in the second eigenvector. This standard eigenvector format allows for easy identification of the nodes in the null space and reachability space.

Once the eigenvectors are properly formatted, this phase of the monitoring loop is complete. At this point, the controller now has the adjacency matrix, the eigenvalue matrix and the eigenvector matrix. These three matrices provide the necessary information for the controller to begin network connectivity and congestion analysis.

Analyze Connectivity

The purpose of Phase 4 of method 800 in FIG. 8 is to produce network connectivity and link failure outputs that can be used by the controller to update and change flow rules. For network connectivity analysis algebraic connectivity is used as a gate for analysis using the null space and reachability space. The null space of the Laplacian is defined by the zero eigenvalues and represents the part of the network that cannot be reached. The reachability space is defined by the non-zero eigenvalues and represents that part of the network in which guaranteed communication paths exist between all nodes. Together, they provide information about network disconnections but do not provide information on link disconnections. Therefore, the link weights of the adjacency matrix are used for link connectivity analysis.

Network Connectivity

Algebraic connectivity identifies that a network is either connected or disconnected but does not provide additional information regarding the number of disconnected components or the location of the disconnected components. Therefore, an embodiment uses another method of determining network connectivity for producing outputs to the routing function.

Figure 11:
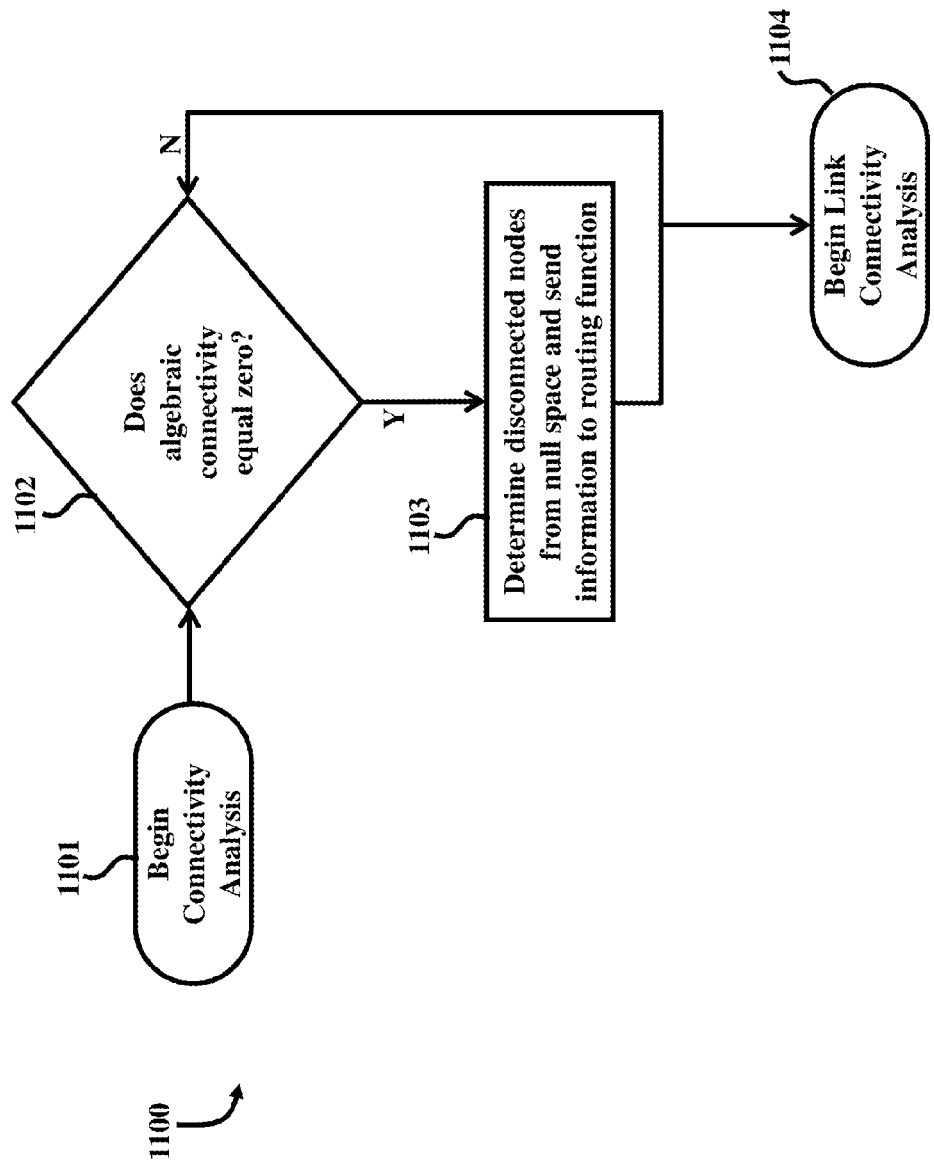
FIG. 11 is a flow diagram illustrating a method according to an embodiment herein.

FIG. 11 is a flow chart illustrating a method 1100 for determining network connectivity according to an embodiment. First, a connectivity analysis begins in step 1101 where the controller examines $\lambda_2$ to determine if the algebraic connectivity equals zero in step 1102. If $\lambda_2 > 0$, then the network is connected, and the controller moves on to analyzing link failures in step 1104. If $\lambda_2 = 0$, then in step 1103 the network is disconnected and the controller conducts an analysis of the null space and reachability space to gain additional information.

The positive, semidefinite characteristic of the Laplacian matrix means that at least one zero eigenvalue will always exist in the null space. The order of the eigenvalues is $$0 = \lambda_1 \leq \lambda_2 \leq \ldots \leq \lambda_{n-1} \leq \lambda_n \quad (19)$$

which means that the smallest eigenvalue, $\lambda_1$, will always be zero. The first eigenvector belongs to this first zero eigenvalue. Therefore, this zero eigenvalue and eigenvector does not indicate disconnectedness. The number of additional zero eigenvalues within the null space determines the number of nodes that are disconnected from the network. The controller analyzes the eigenvectors associated to the additional zero eigenvalues to identify the disconnected node. Since the matrix was formatted during Phase 3, the node associated to the row that has an entry of one is identified as the disconnected node.

From the analysis of algebraic connectivity and the null space, the controller knows which nodes are disconnected from the network. This information is one of the outputs of Phase 4 of method 800 in FIG. 8, and is used by the controller to update flow rules to restore connectivity in an embodiment.

Link Failures

While analysis of algebraic connectivity and the null space provide information about node failures, or disconnected components, they cannot be used to identify single link failures. Since link failures have little-to-no effect on algebraic connectivity, and the null space analyzes nodal connections, not link connections, another analysis method must be used to catch individual link failures. As previously stated, the adjacency matrix is composed of the link weights for all links in the network. The link weights are equal to the $C_A$ on the link. During Phase 2 of method 800 in FIG. 8, the controller set links equal to zero if the measured $C_A$ was less than or equal to $C_{min}$. Therefore, all zero entries in the adjacency table indicate link failures. The controller simply scans the adjacency matrix for zero entries to identify which links have failed. This information is the second output of phase four and provides the controller with information to restore link connectivity.

Once the controller completes network connectivity and link failure analysis, it sends any outputs produced to the route management part of the controller and moves on to the next phase. The route management part of the controller can use this information to make changes to flow rules in order to fix connectivity problems.

Identify and Locate Congestion or Attack

The processes of Phase 5 of method 800 in FIG. 8 can be broken down into three categories: identification of underutilized nodes, identification of congested nodes, and identification of attacked nodes. These identifications rely on a controller's ability to track a node's health. In a dynamic network, the health of a node changes over time as its link capacities are modified by traffic demands. The controller identifies the health of a node by its eigenspectrum location relative to the congestion threshold established by the phantom node. To track and determine the location of the node, relative to the phantom node, the controller analyzes the information provided by the dual basis, because it expresses the strength and connectedness of a node at a given instant in time.

Figure 12:
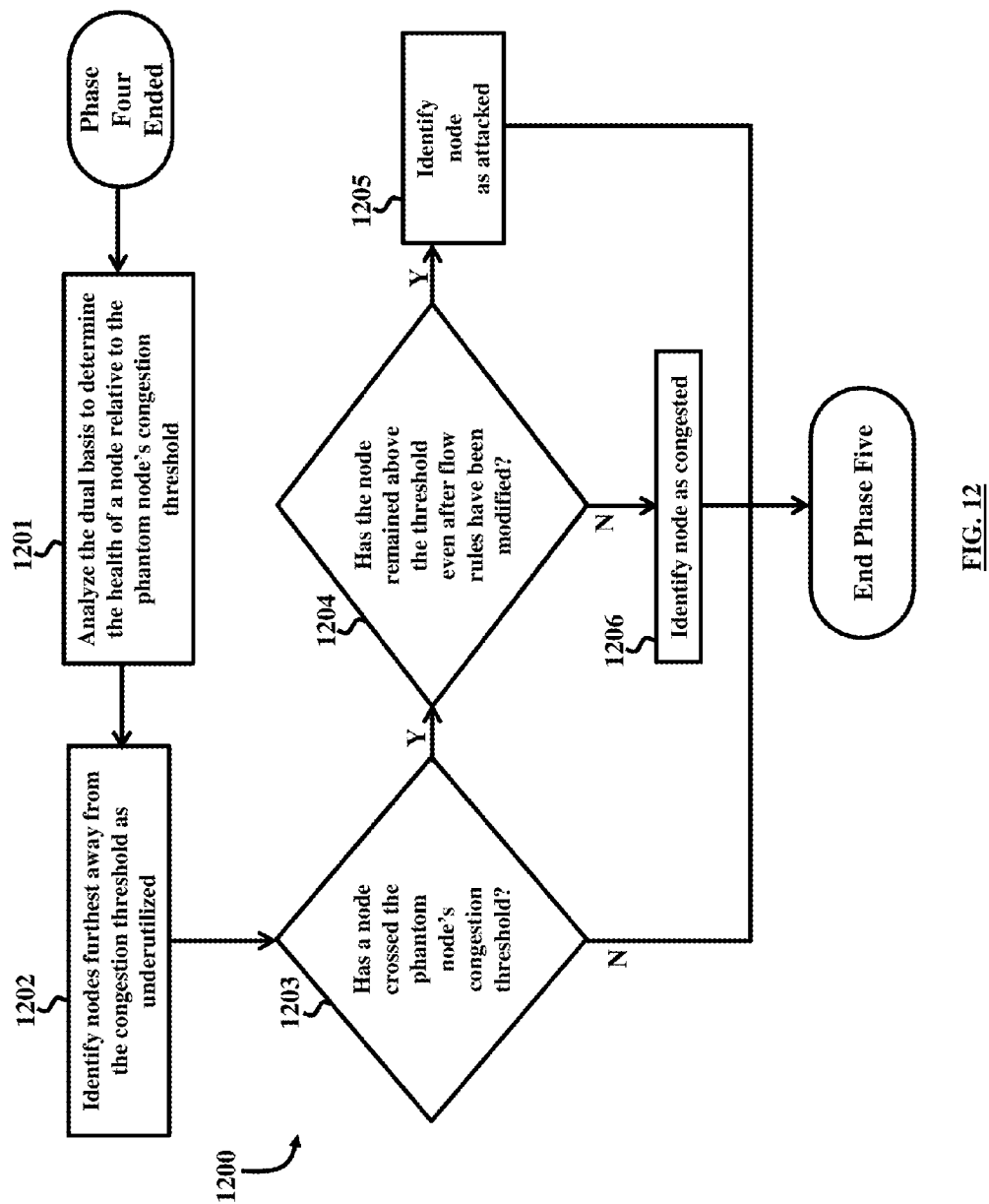
FIG. 12 is a flow diagram illustrating a method according to an embodiment herein.

Using the information provided by the dual basis, the controller is able to determine the strength of a node relative to the phantom node and then determine if it is underutilized, congested, or attacked. FIG. 12 is a flowchart illustrating a method 1200 for identifying the three types of nodes, according to an embodiment. The identification of these nodes is made possible by using the congestion threshold established by the phantom node. In step 1201, the dual basis is analyzed to determine the health of a node relative to the phantom node's congestion threshold. Next, in step 1202, nodes that are furthest away from the congestion are identified. Underutilized nodes are identified using the phantom's congestion threshold; a node that is much stronger and further away from the threshold are identified as underutilized, while a node that is weaker or above the threshold can be identified as either congested or attacked. Decision step 1203 determines whether a node has crossed the phantom node's congestion threshold. If yes, then decision step 1204 determines whether the node has remained above the threshold even after flow rules have been modified. If decision step 1203 results in No, then the process 1200 ends. If decision step 1204 results in Yes, then the node is identified as attacked in step 1205, and then the process 1200 ends. If the result of decision step 1204 is No, then the node is identified as congested in step 1206, and then the process 1200 ends. Attacked nodes are then distinguished from congested nodes by determining if the node remains above the threshold even after flow rules have been changed to mitigate congestion. Additionally, the identification of these three types of nodes is used in Phase 6 of method 800 in FIG. 8 to produce outputs to the routing function and to the intrusion detection system (IDS) of the controller.

Tracking Node Health and Connectedness

The controller can be programmed to determine and track a node's health using the dual basis if three key concepts are understood. First, smaller eigenvalues are associated to less connectedness while larger eigenvalues are associated to more connectedness. Second, each eigenvector is tied to a specific eigenvalue. Therefore, smaller eigenvectors are associated to less connectedness while larger eigenvectors are associated to more connectedness. Third, each row within the eigenvector matrix is associated to a specific node, and each node has a magnitude within each eigenvector. This magnitude indicates the amount of influence a particular node has on the associated eigenvalue. Therefore, the strength or connectedness of a node can be determined by analyzing the magnitudes within the eigenvectors and associating them to a particular eigenvalue.

For example, a random network has a node, A, that has $V_2^{j\ max}$ and is the primary influencer of $\lambda_2$. This means that A is the weakest or least connected node in the network. Conversely, the random network also has another node, B, that has $V_n^{j\ max}$; B is the primary influencer of $\lambda_n$. This means that B is the strongest or most connected node in the network. The controller can use the information in the eigencentrality basis and nodal basis to identify a node's health or strength and track changes over time.

In a dynamic network, the eigencentrality basis and nodal basis change over time due to network traffic. This occurs because the two bases are calculated from the adjacency matrix, which is populated with link weights that are equal to a link's $C_A$. As traffic is sent over a link, the link's $C_A$ changes, which in turn changes the two bases. This means that a node's magnitude in a given eigenvector can increase or decrease as the node's utilization decreases or increases, respectively, and a node's eigenspectrum can change across the range of eigenvalues.

Figure 13:
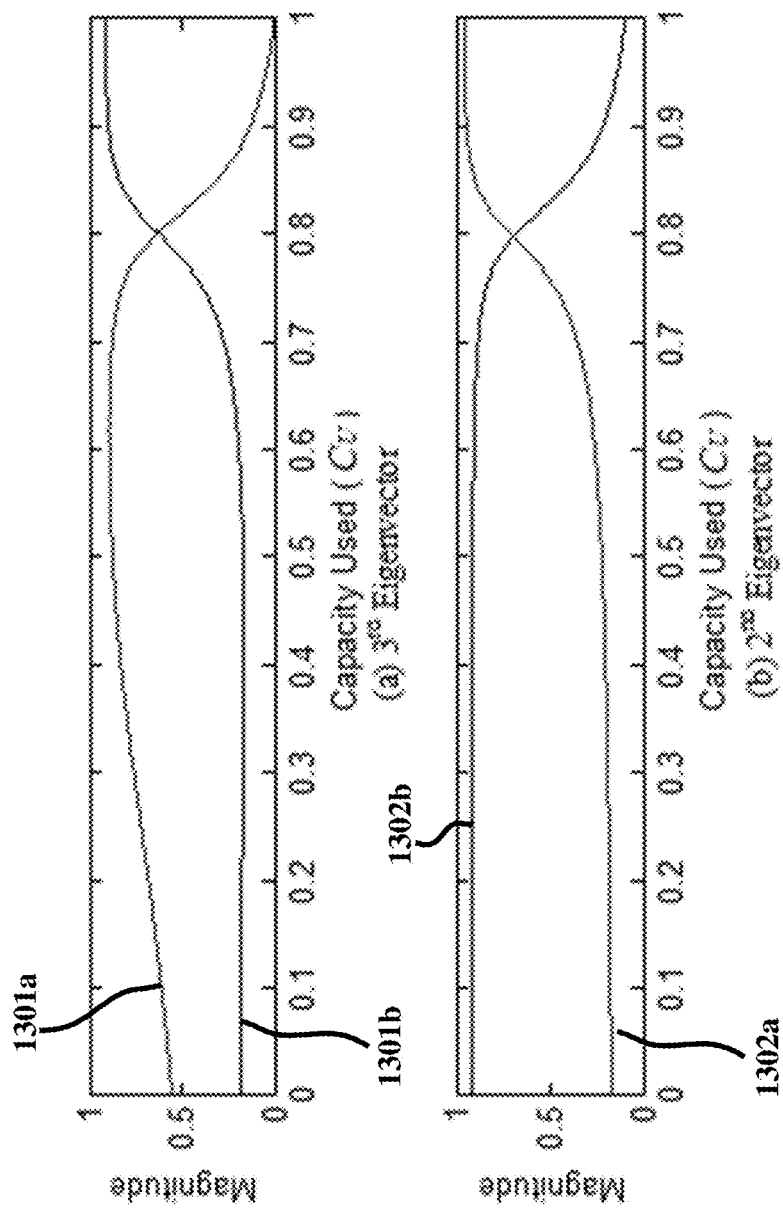
FIG. 13 is a graph illustrating simulation results, according to an exemplary embodiment herein.

FIG. 13 is a graph illustrating the eigenvector magnitudes of two random nodes in a random network over time as the capacity used, $C_U$, changes from one to zero, according to an exemplary embodiment. Lines 1301a and 1302a represent a node that initially has the largest influence of $\lambda_3$ and lines 1301b and 1302b represent a node that initially has the largest influence of $\lambda_2$. As node corresponding to lines 1301a and 1302a starts to experience an increase in $C_U$, then its magnitude in the third eigenvector starts to decrease, and its magnitude in the second eigenvector starts to increase. At the same time, the lines 1301b and 1302b corresponding to the node's magnitude starts to decrease in the second eigenvector and increase in the third eigenvector as it starts to become stronger and more connected than the corresponding node corresponding to lines 1301a and 1302a. At 0.8 seconds, a shift in eigenvalue influence occurs and the corresponding node to the lines 1301*b* and 1302*b* takes over as primary influencer of $\lambda_3$ and the corresponding node to lines 1301*a* and 1302*a* takes over as primary influencer of $\lambda_2$. These shifts in eigenvector magnitude and eigenvalue influence can be analyzed and tracked by the controller.

A shift in a node's influence of an eigenvalues indicates that a node has become weaker or stronger, depending on the direction of the shift, than another node in the network. A controller can determine and track the changes in a node's health and connectedness based on of these shifts. This ability allows the controller to implement the phantom reference node concept and compare a node's health and connectedness to the capacity-static phantom node.

Reference Node

The reference node concept is used by the controller to identify and locate congestion within a network. The controller uses a phantom node to establish a congestion threshold. A shift in eigenvalue influence between a phantom node and another node is viewed as the node crossing the congestion threshold. This allows the controller to easily identify and locate congested nodes.

The parameters to establish the congestion threshold using a phantom node will be discussed later in this chapter, but for the purposes of this discussion, a common implementation of the phantom node will be used. This implementation sets the phantom node as the least connected node in the network; the phantom node has $V_2^{j\ max}$ and is the primary influencer of $\lambda_2$. In this position, the phantom node is the weakest node in the network and acts as a threshold for the remaining nodes in the network. If congestion forces a node to become weaker than the phantom node, that node will take over primary influence of $\lambda_2$ and have $V_2^{j\ max}$. The phantom node then gets shifted to primary influencer of $\lambda_3$ which means it has $V_3^{j\ max}$. If an additional node becomes weaker than the phantom node, another shift in eigenvalue influence will occur. Conversely, the opposite shift can occur if the node grows stronger or becomes less congested.

Figure 14:
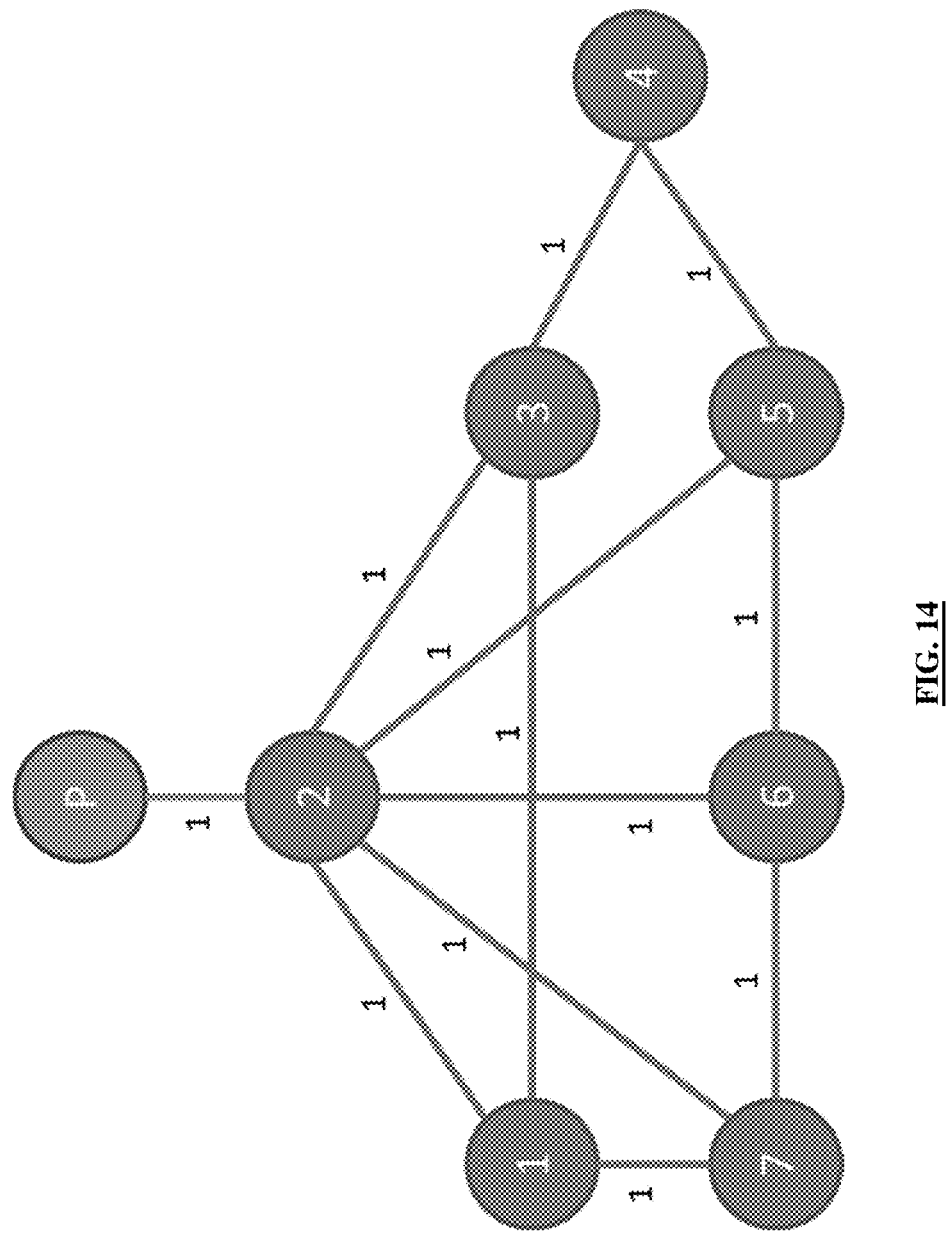
FIG. 14 is a schematic diagram illustrating a software defined network according to an exemplary embodiment herein.

Using this concept, a node is identified as congested if it has primary influence over an eigenvalue that is smaller than the one being influenced by the phantom node. FIG. 14 is a schematic diagram illustrating a random network with a single phantom node, according to an embodiment. All $w_{ij}$ are initially equal to one. In this state, the phantom node is the least connected node in the network, and therefore has $V_2^{j\ max}$. Node four is the next least connected node in the network and therefore has the largest magnitude in the third eigenvector, $V_3^{j\ max}$. If the links attached to node four gradually experience high utilization, possibly due to node five continuously sending packets to node three through node four, the associated links weights decrease accordingly. When the two links attached to node four become weaker, or less connected, than the one link attached to the phantom node, node four takes over as the primary influencer of $\lambda_2$. This means that node four's two links, combined, are weaker than the phantom node's one link. At that point, a shift occurs causing node four to takeover $V_2^{j\ max}$ and the phantom node to have $V_3^{j\ max}$. This shift caused node four to cross the congestion threshold established by the phantom node in the dual basis. In other words, the eigenvalue being influenced by node four is now smaller than the eigenvalue being influenced by the phantom node. This shift in eigenvalue influence lets the controller know that node four is experiencing congestion beyond the threshold level and the controller identifies node four as congested.

The reference node concept ties the phantom node to a specific eigenvalue within the eigenspectrum, which means it can be used as a threshold for the connectivity of other nodes. Additionally, the phantom node can then be used as a reference to distinguish strong, underutilized nodes, nodes that have primary influence over eigenvalues furthest away from the phantom node's eigenvalue, from weak, utilized nodes, nodes that have primary influence over eigenvalues nearest to the phantom node's eigenvalue. When a node crosses the phantom node threshold, the controller is able to not only identify the node that is experiencing the congestion, but is also able to identify underutilized nodes that may be used to help mitigate the congestion. This information gives the controller all the information it needs to then take action to resolve congestion problems.

Distinguishing Attack from Congestion

The reference node concept can also be useful in distinguishing between congestion and attack. A nodal attack can be identified by the controller as a node that has crossed the congestion threshold and continues to remain there even after flow rules have been adapted to mitigate the congestion. Since congestion is neither intelligent nor malicious in nature, the controller expects to see improvement in the strength and connectedness of a node as flow rules are changed to mitigate the congestion. The assumption made here is that the attack is carried out by an intelligent malicious user. This means that the attacker adjusts the flow of malicious packets as the controller changes flow rules in order to continue targeting a specific node. As a result, the controller would not see a node's health or connectedness improve if it changed the network's flow rules.

Both a nodal attack and hardware failure would cause a node to remain above the congestion threshold level, but a hardware failure is easily distinguished by the controller. SDN use echo request and echo response messages to ensure the liveliness of all the nodes. These messages act as a heartbeat for the individual nodes. If the controller experiences an echo request timeout, it knows that it has lost connection to the node, which would occur with a hardware failure.

A second possible way to identify an attack, before it completely takes down a node, is by the rate of consecutive shifts towards the phantom node threshold. This method is not evaluated in this thesis but is assumed to be imprecise. This assumption is made because the method would require the attack to occur at a rate dissimilar to normal congestion, the controller to poll the network or update the adjacency matrix at a frequency that would detect the rate of change, and the remaining network to maintain a consistent state.

Overall, the reference node code concept allows the controller to identify and locate nodes that are congested, underutilized, or attacked. This information is then used by the controller in Phase 6 of method 800 in FIG. 8 to produce outputs that help resolve connectivity problems resulting from congestion or an attack.

Take Action

The purpose of Phase 6 of method 800 in FIG. 8 is to produce underutilization, load balancing, and isolation outputs that can be used by the controller to update and change flow rules. These outputs contain information regarding nodal congestion and nodal attack within the network. To produces these outputs, the controller is provided three options during this phase. The controller chooses between these three options by analyzing the information produced during Phase 5 of method 800 in FIG. 8. The purpose of these three options is to produce outputs that contain the required information for the routing function of the controller to minimize network congestion.

First, the controller is given the option to take no action. The controller uses this option if no nodes were below the congestion threshold in the previous phase. In other words, if a node was not identified by the controller as congested, the controller would take no action. A controller that selects this option does not produce any isolation or load balancing outputs, but does produce an underutilization output. The underutilization output provides an update on underutilized nodes in the network. It is important to note that the controller should always produce an underutilization output, even if a different option is chosen.

Second, the controller is given the option to load balance. The controller uses this option if a node was below the phantom node threshold in the previous phases and identified as a congested node. If this option is chosen, the load balancing output would be produced. This output contains the address of the congested node, and a request to perform load balancing to decrease the traffic being sent to that node. The routing portion of the controller can then change flow rules to decease traffic across all of the identified node's links, or can analyze the current adjacency table to determine specific links that require attention.

In an embodiment, the controller is given the option to isolate. The controller uses this option if a node was identified in the previous phase as being attacked. If this option is chosen, the isolation output would be produced and sent to the controller's IDS. The IDS used by the controller is outside the scope of this thesis, but the controller must have a packet parsing system, such as Snort, because the output identifies the node that has been attacked and requests that the node's traffic be analyzed to isolate illegitimate traffic from legitimate traffic. The isolation output acts as a tipper to the IDS to conduct further analysis and pass information to the routing function in order to isolate the source of the malicious traffic. It is important to note that the controller should also notify the network administrator regarding which node is under attack if this option is selected, and the source of the attack when determined by the IDS.

In an embodiment, the outputs from Phase 6 provide the controller device with the necessary information to change flow rules for the purpose of restoring connectivity or isolating an attack. Once the controller produces the outputs, it returns to Phase 1 of the proposed scheme and repeats the monitoring process.

In an embodiment, the six phases together provide the controller with a simple method to identify and locate network disconnectedness, link failures, congestion, underutilization, and attack. This information may be required for the controller to update flow rules and effectively manage a SDN, but the outputs that produce this information are dependent upon the phantom node variables. Therefore, phantom node variables need to be determined by the network administrator to ensure the monitoring scheme produces appropriate outputs.

Tailoring the Monitoring Methodology

The monitoring scheme uses a phantom node to establish a threshold for congestion. This threshold is crucial for identifying and locating nodal congestion and attack in a network. Up to this point, the discussion and explanation of phantom nodes has focused on using a single phantom node that has $V_2^{j\ max}$ and a link weight equal to one. While this is the simplest implementation of the phantom node concept, it is not the only implementation that can be used. Other implementations can be produced by manipulating the two parameters or variables associated to phantom nodes. These two variables are link weight and the number of phantom nodes.

During network initialization, the network administrator needs to set the parameters of the phantom node that produce the desired congestion threshold, or thresholds, for the network. An embodiment describes these two phantom node parameters and how they can be used to tailor the proposed monitoring scheme. The phantom node's link weight is used to determine the level of congestion allowed in the network since the link weight determines the congestion threshold value. Algebraic connectivity boundaries provide a tool that can be used to estimate the congestion threshold value for a chosen link weight. The number of phantom nodes is used to produce multiple congestion thresholds in a network. This may be necessary for networks that have a large difference between the minimum defree, $D_{min}$, and $D_{max}$ nodes. Together, the two phantom node variables allow the network administrator to design a monitoring scheme that is tailored to the needs of a particular network.

Link Weight

A phantom node's link weight determines the congestion threshold level, which in turn determines the amount of allowed congestion for the nodes in the network. The link weight is a variable that affects the amount of $C_U$ allowed on a node before it crosses the phantom node threshold and is identified as congested. For a given threshold, this amount of $C_U$ can vary across the nodes in the network because it is dependent on the degree of a node. Therefore, it is important for the network administrator to determine the range of allowed $C_U$ for a given link weight value. This ensures an acceptable congestion threshold is set within the network. Algebraic connectivity boundaries provide the foundation for the development of a tool that can be used to determine these ranges.

While algebraic connectivity has been considered by most scholars as a purely topological measure of network robustness, it will be shown here that algebraic connectivity boundaries can be used to provide an estimate of a nodes' capacity when it has $V_2^{j\ max}$. This information is then used to create a tool to estimate a node's capacity at the threshold set by a specific phantom node link weight value. This tool provides network administrators with a way to determine and set a congestion threshold that is acceptable for their network.

Algebraic Connectivity Boundaries

Algebraic connectivity is traditionally used as a metric for measuring a network's connectedness or robustness, but the information gained from establishing boundaries on algebraic connectivity makes it a useful tool for estimating congestion. The boundaries on algebraic connectivity provide an estimate for a node's capacity when it takes over as the primary influencer of $\lambda_2$. This is valuable information since one implementation of the proposed monitoring scheme will sets the phantom node as the primary influencer of $\lambda_2$.

In a dynamic network, algebraic connectivity can be measured across the range of $C_U$; $C_U$ has a range of [0 1]. In this range, an algebraic connectivity operating envelope is produced by the equations for the upper bound, lower bound, and right bound of $\lambda_2$. The equations for the upper bound and right bound intersect at some $C_U$, and this intersection indicates a switch in the node that has primary influence of $\lambda_2$. This means that a node's $C_U$ can be estimated when it takes over as primary influencer of $\lambda_2$.

To determine the equation for the upper bound of algebraic connectivity, a relationship between algebraic connectivity, node connectivity and the minimum degree node must be established. For an incomplete graph, $$k_N \leq k_L \leq D_{min} \quad (20)$$

and $$\lambda_2 \le k_N, \quad (21)$$

which means $$\lambda_2 \le D_{min}. \quad (22)$$

For a complete graph $$k_N = k_L = D_{min} \quad (23)$$

and $$\lambda_2 \le k_N, \quad (24)$$

which means $$\lambda_2 \le D_{min}. \quad (25)$$

A complete graph will always have a higher algebraic connectivity than an incomplete graph since $D_{min}$ is larger. The equation for algebraic connectivity of a complete graph can therefore be used as an upper bound for algebraic connectivity of incomplete graphs. This means the equation of the upper bound, $y_{upper}$, of algebraic connectivity is $$y_{upper} = D_{min} \quad (26)$$

To determine the equation for the lower bound of algebraic connectivity, the characteristics of the Laplacian matrix must be analyzed. The Laplacian matrix is positive semidefinite which means all the eigenvalues are real and nonnegative. Algebraic connectivity will only be equal to zero if the network is disconnected. Therefore, algebraic connectivity will always be greater than or equal to zero, which means the equation of the lower bound, $y_{lower}$, is $$y_{lower} = 0 \quad (27)$$

To determine the equation for the right bound, the eigenvalues of the weighted Laplacian matrix of a complete graph must be analyzed. A complete graph provides maximum algebraic connectivity since $D_{min}$ is maximized. The link weights used in the weighted Laplacian are equal to $C_U$. Setting all link weights equal and solving for the eigenvalues, the characteristic equation is $$(-1)^n \lambda (\lambda - n + C_U)^{n-2} (\lambda - n + nC_U) = 0 \quad (28)$$

for a weighted graph. Using (27), the equation for algebraic connectivity is $$\lambda_2 = n(1 - C_U) \quad (29)$$

which can be rewritten as $$\lambda_2 = (D_{max} + 1)(1 - C_U) \quad (30)$$

since the total number of nodes is equal to one more than the maximum degree node in a complete graph. (28) and (29) cannot be used to determine algebraic connectivity for an incomplete graph, but can provide a right bound since $\lambda_2$ will always be larger for a complete graph. This means the equation of the right bound, $y_{right}$, of algebraic connectivity is $$y_{right} = (D_{max} + 1)(1 - C_U) \quad (31)$$

Figure 15:
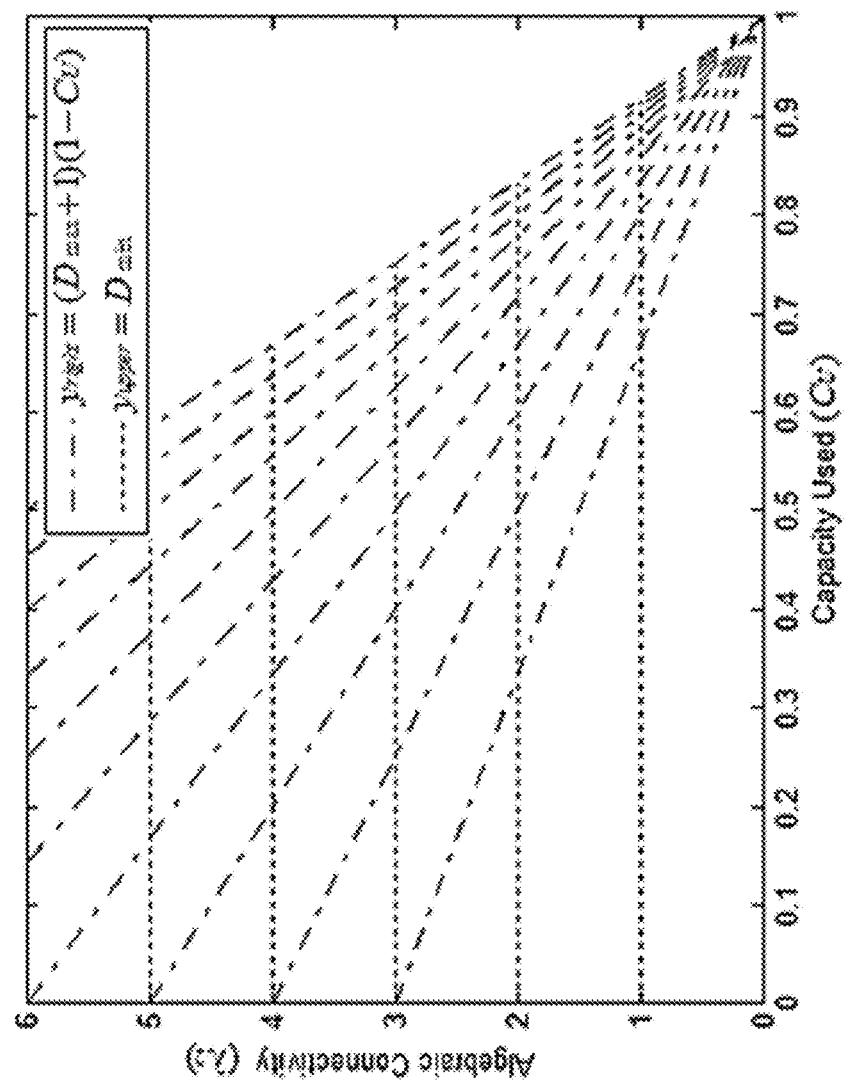
FIG. 15 is a graph illustrating simulation results, according to an exemplary embodiment herein.

FIG. 15 is a graph depicting various algebraic connectivity boundaries defined by (25), (26) and (30), according to an exemplary embodiment. The equations produce an operating envelope for network algebraic connectivity across the range of $C_U$. Given the $D_{max}$ and $D_{min}$, the algebraic connectivity boundaries are easily determined. Once determined, the intersection of (25) and (30), seen in FIG. 15, provides an estimate of a node's $C_U$ when it takes over as the primary influencer of algebraic connectivity. This can be determined for any degree node in the network, not just the maximum degree node, if $D_{max}$ is replaced by the degree of the node of interest, $D_{interest}$. For example, a network's least connected node has a degree of two, most connected node has a degree of six, and the node of interest has a degree of four. Substituting $D_{max}$ with $D_{interest}$, (25) and (30) produce $y_{right} = 5(1 - C_U)$ and $y_{upper} = 2$. The intersection of these two lines occurs at 0.6 $C_U$. This means that in a network with a $D_{min}$ equal to two, a four degree node will take over as primary influencer of algebraic connectivity at approximately 60 percent $C_U$.

The boundaries not only provide information on the operating space for algebraic connectivity, but also provide insight into when a node takes over as the weakest node in the network. Since the reference node concept uses this information to determine if the congestion threshold has been met, the intersection of the boundary equations can be used to produce a tool for network administrators to estimate the capacity range threshold for a chosen phantom node link weight.

Determining Link Weight Value

The phantom node's link weight value determines the $C_U$ allowed on a node before it is flagged by the controller as congested. A node is flagged when it is the primary influencer of an eigenvalue that is smaller than the eigenvalue being influenced by the phantom node. As previously stated, the phantom node will be the least connected node in the network and therefore, have primary influence over $\lambda_2$ in one implementation of the monitoring scheme. This means that the algebraic connectivity upper bound equation and right bound equations can be used to estimate node capacity at the congestion threshold.

In order to provide a tool to measure all nodes in the network, (25) and (30) must be adjusted. (30) must be modified to $$y_{right} = (D_{interest} + 1)(1 - C_U) \quad (32)$$

where $D_{interest}$ is the degree of the node being analyzed. This modification allows the network administrator to analyze all nodes in the network, not just the max degree node. In regards to (25), the phantom node will be the least connected node in most cases and therefore, will be the D min node in the network; however, it will be shown in Chapter IV that this tool can be used even when the phantom node is not $D_{min}$. Therefore, (25) must be modified to $$y_{upper} = w_{phantom} \quad (33)$$

where $w_{phantom}$ is the link weight value of the phantom node. This modification allows the network administrator to select any link weight value, integer or fraction, to produce a desired congestion threshold.

In order for a congestion threshold crossing to occur, a node's $C_U$ must reach a certain value. This value can be estimated for any node in the network by finding the $C_U$ value at the intersection of (31) and (32). Solving (31) and (32) for $C_U$ at the point of intersection, $C_{U\ intersect}$, the equation $$C_{U\ intersect} = 1 - \frac{D_{phantom}}{(D_{interest} + 1)} \quad (34)$$

is produced. This equation solves for a node's $C_U$ at the instant it crosses the congestion threshold. It can be used by the network administrator to estimate a node's $C_U$ level at the congestion threshold for a particular phantom node link weight.

Figure 16:
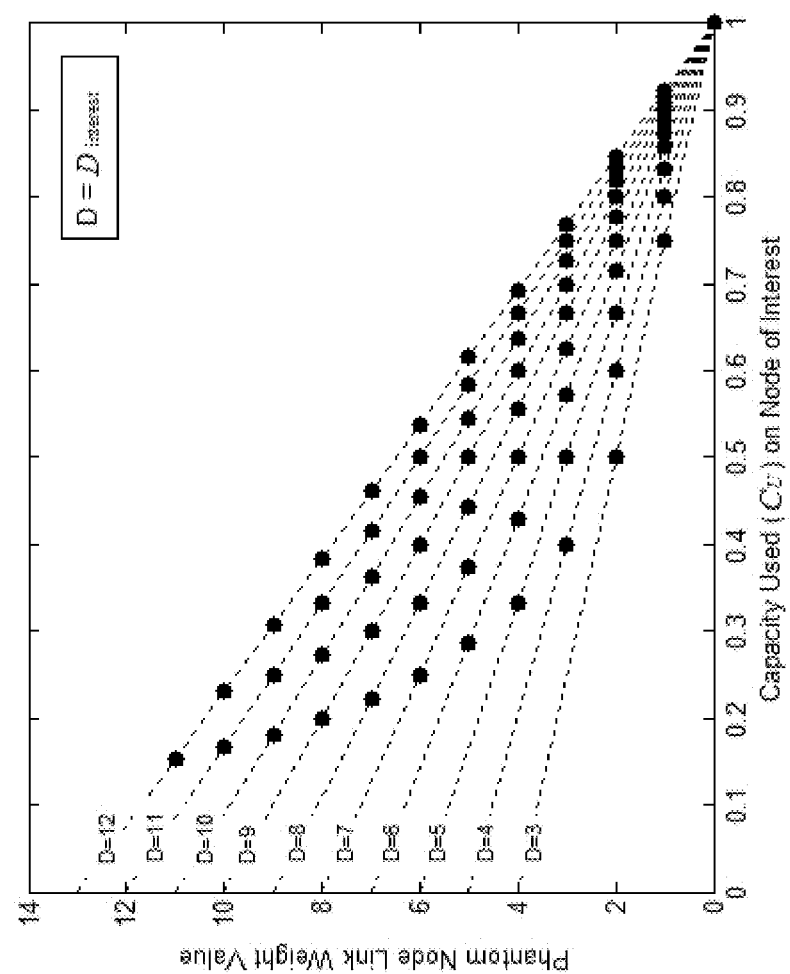
FIG. 16 is a graph illustrating simulation results, according to an exemplary embodiment herein.

FIG. 16 is a graph illustrating a plot of intersection points from (33) using integer link weight values for the phantom node, according to an exemplary embodiment. Using the plotted points in FIG. 16, the range of $C_U$ values produced by nodes in a network can be estimated. For example, a random network has node degrees of three, four, five, and six. The network administrator sets the phantom node link weight equal to two. The lower value of the $C_U$ range will be determined by the three degree node and the upper value will be determined by the six degree node. Starting with the three degree node, the network administrator first finds the line marked as D=3, and then finds the plotted dot on this line for a phantom node link weight of two. The plotted dot occurs at 0.5 $C_U$. Next, $C_U$ for the six degree node is determined. Following the same process, the plotted dot on D=6 corresponding to a phantom link weight of two occurs at approximately 0.71 $C_U$. This range, [0.5 0.71], provides an estimate of the $C_U$ values that will trigger a threshold crossing in the monitoring scheme. In other words, if a phantom link weight value of two is chosen for the random network described above, a threshold crossing will most likely occur around the range of 50 percent to 71 percent $C_U$.

The example and FIG. 16 both use integer values for the phantom node's link weight. The link weight is not limited, however, to an integer value. The only limitation on the link weight value is that it must be greater than zero. If a non-integer value is chosen, the process in determining the range of $C_U$ that triggers a threshold crossing is still the same. Simply find the $C_U$ value using (33). If the value is greater than one, the node will not cross the congestion threshold until it fails; therefore, the controller will not detect congestion on the node until it has failed.

The $C_{U\ intersect}$ equation gives network administrators the ability to customize the congestion threshold range used in the proposed monitoring scheme. Depending on the type of network and its requirements, more or less $C_U$ may be allowed or desired on a node before being flagged as congested. A larger allowed $C_U$ means that the controller will be less active because threshold crossings will be infrequent; however, threshold crossings then only occur when the node is close to failure. On the other hand, a smaller allowed $C_U$ means that the controller will be more active because threshold crossings will occur more frequently; but the crossings will occur long before node failure. The $C_U$ values at the monitoring scheme's congestion threshold are directly tied to the phantom node's link weight value. Therefore, a link weight value must be selected that is appropriate for the network.

Number of Phantom Nodes

The number of phantom nodes used provides an additional way to modify and tailor the monitoring scheme for a particular network by allowing multiple thresholds to exist in a network. Multiple thresholds are primarily used in networks that have a large difference between $D_{min}$ and $D_{max}$ values. In these types of networks, a single phantom node would produce a large $C_U$ range at the congestion threshold. This can be undesirable because small degree nodes may be identified as congested at a reasonable congestion level while larger degree nodes may not be identified as congested until they are near failure. The supplementation of an additional phantom node solves this problem by producing additional thresholds that are used for a subset of the network's nodes.

Figure 17:
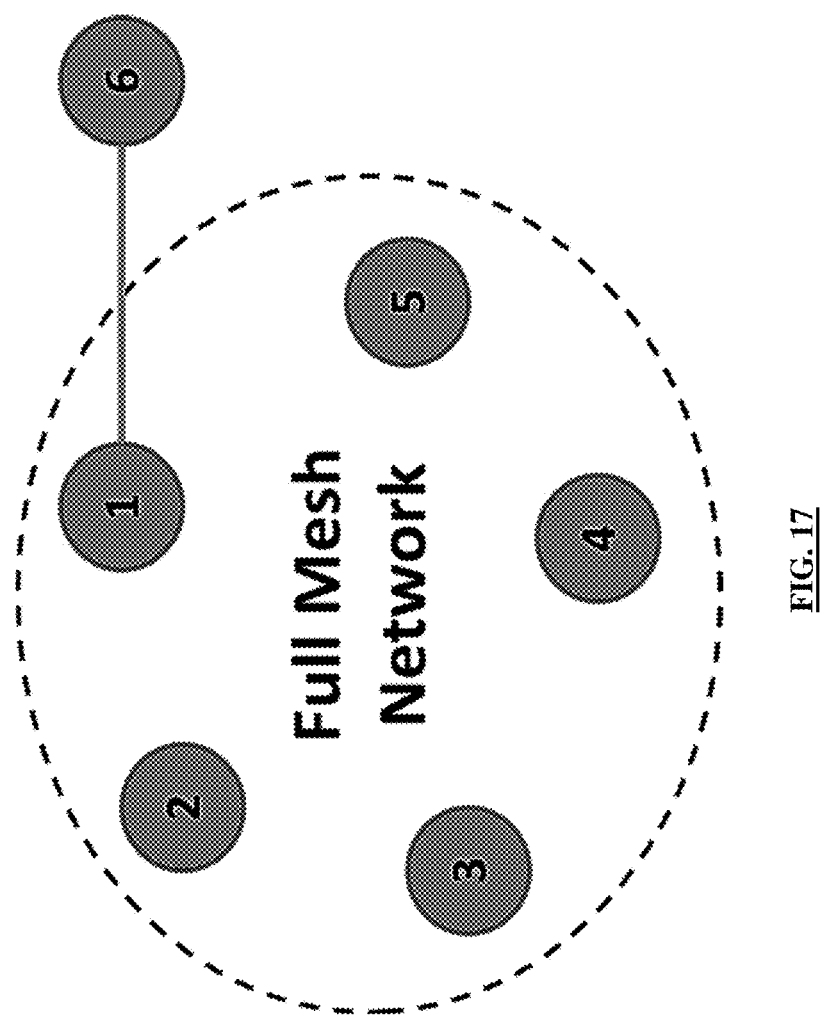
FIG. 17 is a schematic diagram illustrating a software defined network according to an exemplary embodiment herein.

FIG. 17 is a schematic diagram illustrating a full mesh network that has an additional single link node attached, according to an exemplary embodiment. If using only a single phantom node, the phantom node's link weight would have to be less than one in order for node six to have a phantom node threshold crossing. For simplicity, a link weight of 0.5 is selected. This means at approximately 75 percent $C_U$, node six would take over as primary influencer of $\lambda_2$ and be identified by the controller as congested. It also means that nodes two, three, four, and five would not be identified as congested until approximately 90 percent $C_U$, and node one would not be identified as congested until approximately 92 percent $C_U$. The allowed $C_U$ for node six seems reasonable, but the allowed $C_U$ for the remaining nodes may be considered too high. This problem can be remedied with the addition of a second phantom node.

When an additional phantom node is used, a link weight value must be selected that ensures that the phantom node is the primary influencer of an individual eigenvalue. Continuing the example, this means that the additional phantom node must have a link weight greater than one and less than four. This will ensure that the second phantom node is primary influencer of $\lambda_4$; the first phantom node will be primary influencer of $\lambda_2$, and node six will be primary influencer of $\lambda_3$. For simplicity, a link weight value of 1.5 is selected for the second phantom node. With this design, the first phantom node acts as a threshold for node six, and the second phantom node acts as a threshold for the remaining nodes. This means that node six will still be identified as congested at approximately 75 percent $C_U$, but nodes two, three, four, and five will now be identified as congested at 70 percent $C_U$. Additionally, node one will be identified as congested at 75 percent $C_U$. These allowable $C_U$ values may be more reasonable or desirable than the single phantom node design.

An additional phantom node, with a different link weight value, allows the network administrator to tailor the proposed monitoring scheme in order to produce desired congestion threshold levels for each node in the network. The phantom node variables allow the proposed monitoring scheme to be customized to the needs and requirements of a particular network.

An embodiment describes a network monitoring scheme that uses graph theory analysis and phantom nodes to produce outputs that are used by the controller to update flow rules and manage a network. The outputs identify disconnected, congested, underutilized, and attacked nodes by comparing the node's health and connectedness to the health and connectedness of the phantom node. In other words, a node's position within the eigencentrality basis relative to the phantom node provides the controller with enough information to determine the state of the node.

In an embodiment, the phantom node's position within the eigencentrality basis produces a congestion threshold. Nodes that are below the congestion threshold are underutilized and influence eigenvalues larger than the eigenvalue being influenced by the phantom node. Nodes that are above the congestion threshold are congested and influence eigenvalues smaller than the eigenvalue being influenced by the phantom node. The position of the congestion threshold is determined by the link weight value of the phantom node and the amount of congestion required for a node to cross the threshold can be estimated using (33), an equation derived from the algebraic connectivity boundary equations.

In an embodiment, multiple thresholds can be put into a network by adding additional phantom nodes to further tailor the monitoring scheme for specific network requirements. In an embodiment, graph analysis is used in the monitoring method, provides the centralized controller with a novel method to monitor and manage large, complex networks.

Simulations

An embodiment describes an SDN monitoring scheme that produced connectivity, congestion, underutilization, and attack outputs for network management. To produce these outputs, the method uses a phantom node to establish a congestion threshold, and eigenanalysis to track node and link capacities. It relies on the ability of the controller to track changes in node and link health and to distinguish between congestion and attack. It also relies on the ability of the phantom node to produce an accurate congestion threshold. These abilities are simulated herein to validate the functionality and accuracy of the proposed monitoring scheme.

The functions required in the monitoring scheme are simulated to demonstrate the effectiveness of the proposed graph analysis method for network monitoring. First, the methodologies are discussed for producing random networks, creating graph theory matrices, and implementing congestion. These methodologies are used in all simulations. Then, the connectivity simulations and results are discussed, including a disconnected network simulation and a link failure simulation. The disconnected network simulation shows that disconnected nodes are identifiable using algebraic connectivity and the null space. The link failure simulation, however, shows that algebraic connectivity and the null space cannot be used to identify link failures. Lastly, congestion, underutilization, and attack are investigated. The congestion simulations show that the dual basis tracks a node's health, a phantom node establishes a congestion threshold, the congestion threshold identifies congested, underutilized, and attacked nodes, and congestion is accurately estimated for a node that crosses the threshold using the equations formed from algebraic connectivity boundaries.

Methodology

Simulations herein show that, in an embodiment, the controller is able to use the graph matrices to track node health and identify disconnected, congested, underutilized and attacked nodes.

Simulations require the creation of a random network in the form of an adjacency matrix. The type of network implemented is not important because graph theory analysis is applicable to all network types. The code requires four inputs to produce the adjacency matrix: number of nodes, n, number of clusters or modules, c, overall probability of attachment, p, and proportion of links within modules, r. Using inputs of n=6, c=2, p=0.3, and r=0.3, the code creates $$A = \begin{bmatrix} 0 & 1 & 0 & 1 & 0 & 1 \\ 1 & 0 & 0 & 0 & 0 & 1 \\ 0 & 0 & 0 & 1 & 1 & 0 \\ 1 & 0 & 1 & 0 & 0 & 0 \\ 0 & 0 & 1 & 0 & 0 & 1 \\ 1 & 1 & 0 & 0 & 1 & 0 \end{bmatrix} \quad (35)$$

Figure 18:
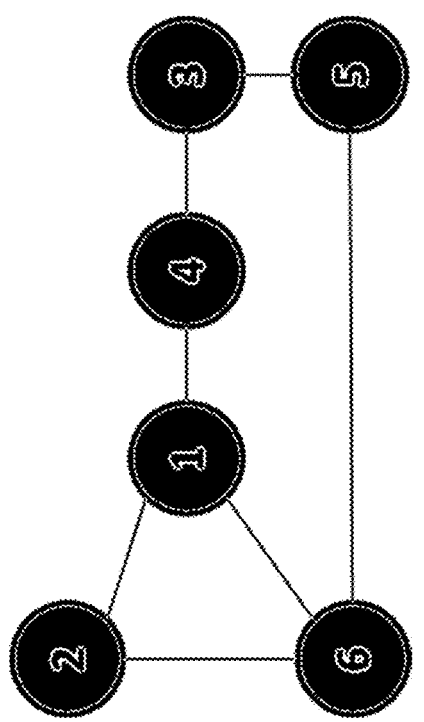
FIG. 18 is a schematic diagram illustrating a software defined network according to an exemplary embodiment herein.

The ones in (34) indicate a link between two nodes, while the zero indicates that a link does not exist. FIG. 18 is a schematic diagram illustrating a network topology of a random six node modular network with two modules, 0.3 overall probability of attachment, and 0.3 proportion of links within module, according to an exemplary embodiment. This information in (35) is used to create the network topology image displayed in FIG. 18. It is important to note that the same input values will produce a different random network every time the code runs. Further randomization is obtained through manipulation of the input values. Overall, the open source code produces the random adjacency matrix required in the simulations.

Second, all simulations require the creation of eigenvalue and eigenvector matrices for network analysis. All simulations square the eigenvector entries to fix the negative values, and all results are put into standard form using the procedure explained previously to produce a functional matrix for network analysis.

Lastly, all simulations require a method for varying link capacity to produce link failures or congestion to simulate a dynamic network. The entries in the adjacency matrix represent $C_A$ for an individual link. For the simulations, $C_A$ is bound between zero and one. A one represents a link that has 100 percent $C_A$, and a zero represents a fully utilized link with zero percent $C_A$. The adjacency matrix entries are manipulated during the simulations to produce varying levels of congestion and connectivity. It is important to note that the $C_A$ bounds do not apply to the phantom node entries in the adjacency matrix, and the value is never manipulated during a simulation. A phantom node's $C_A$ must be greater than zero and less than n to produce a functional congestion threshold, and it must remain fixed to ensure a set threshold.

The methodology presented provides a repeatable process that can be used across a large number of random networks. The process is used in each simulation to produce results that demonstrate the effectiveness of the graph theory analysis methods of the proposed network monitoring scheme.

Connectivity Results

The simulation results are presented for the disconnected node case and the link failure case to validate the connectivity analysis method used in the proposed monitoring scheme. The scheme uses algebraic connectivity and the null space to identify disconnected nodes but not failed links. The scheme instead uses link weight analysis to determine link failures. The disconnected node simulation demonstrates that disconnected nodes can be identified and located using algebraic connectivity and the null space, and the link failure simulation confirms that these cannot be used to identify link failures. The results from both these simulation validate the methods used in the proposed monitoring scheme to provide network connectivity analysis.

Disconnected Nodes Simulation

Algebraic connectivity and the null space provide all the required information to identify and locate a disconnected node, or nodes, within a network. To illustrate this concept, a network was simulated to experience three random node disconnections. This simulation was conducted 25 times to ensure the accuracy of the results. Since all of the results were similar, the results of only one run are used. This run used inputs of n=8, c=2, p=0.4, and r=0.35, which produced $$A = \begin{bmatrix} 0 & 1 & 0 & 1 & 1 & 1 & 0 & 1 \\ 1 & 0 & 0 & 1 & 1 & 0 & 1 & 0 \\ 0 & 0 & 0 & 0 & 1 & 0 & 0 & 1 \\ 1 & 1 & 0 & 0 & 0 & 1 & 0 & 1 \\ 1 & 1 & 1 & 0 & 0 & 1 & 0 & 0 \\ 1 & 0 & 0 & 1 & 1 & 0 & 0 & 0 \\ 0 & 1 & 0 & 0 & 0 & 0 & 0 & 1 \\ 1 & 0 & 1 & 1 & 0 & 0 & 1 & 0 \end{bmatrix} \quad (36)$$

Figure 19:
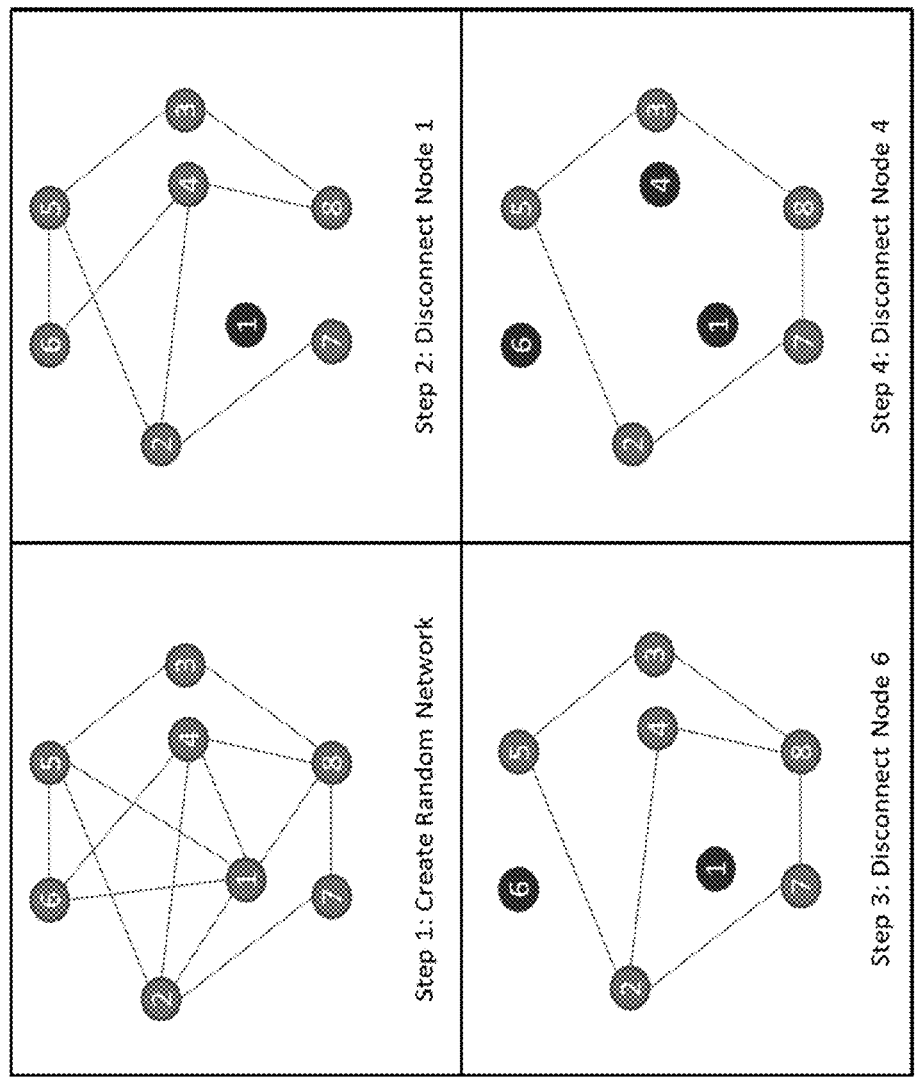
FIG. 19 is a schematic diagram illustrating a software defined network according to an exemplary embodiment herein.

The simulation used (35) as the initial adjacency matrix for node disconnections. FIG. 19 is a schematic diagram illustrating the iteration of disconnections in the network topology that occurred during using (35), according to an exemplary embodiment. In step one, (35) is used to compute the eigenvector and eigenvalue matrices. Then, node one is disconnected in step two and the matrices are recalculated based on the new adjacency matrix. This process is repeated in step three as node six is disconnected and in step four as node four is disconnected. This simulation produced a set of eigenvalue and eigenvector matrix outputs for each of the four steps. The eigenvector matrices were put into standard format for easier analysis.

The matrix outputs from step one show that algebraic connectivity and the null space correctly identifies a connected network. The eigenvalues produced by the are {0 1.6425 1.7828 3.4087 3.7256 4.9399 6.0376 6.4629} and the associated eigenvector matrix output, $V_1$, is $$V_1 = \begin{bmatrix} 0.0000 & 0.0072 & 0.0509 & 0.0083 & 0.0278 & 0.1392 & 0.1623 & 0.4794 \\ 0.0000 & 0.0312 & 0.0240 & 0.0810 & 0.3510 & 0.0074 & 0.1552 & 0.1551 \\ 0.0000 & 0.1787 & 0.5606 & 0.0008 & 0.0027 & 0.1005 & 0.0159 & 0.0157 \\ 0.0000 & 0.0011 & 0.0809 & 0.2360 & 0.0418 & 0.2079 & 0.2805 & 0.0268 \\ 0.0000 & 0.0064 & 0.0013 & 0.2888 & 0.0140 & 0.1789 & 0.3189 & 0.0066 \\ 0.0000 & 0.0766 & 0.2015 & 0.0092 & 0.4550 & 0.0307 & 0.0518 & 0.0501 \\ 0.0000 & 0.6274 & 0.0410 & 0.0431 & 0.1068 & 0.0062 & 0.0124 & 0.0381 \\ 0.0000 & 0.0114 & 0.0396 & 0.3329 & 0.0008 & 0.2591 & 0.0030 & 0.2282 \end{bmatrix} \quad (36)$$

Since algebraic connectivity is greater than zero and only one zero eigenvalue exists, the null space only contains one vector. The first vector in (36) represents the null space because it is the vector tied to the zero eigenvalue. The remaining seven vectors in (36) represent the reachability space. This information shows the network is connected.

The matrix outputs from step two show that algebraic connectivity and the null space correctly identifies a single disconnected node. The eigenvalues produced by the are {0 0 1.3249 1.5858 2.4608 3.0000 4.4142 5.2143} and the associated eigenvector matrix output, $V_2$, is $$V_2 = \begin{bmatrix} 1.0000 & 0.0000 & 0.0000 & 0.0000 & 0.0000 & 0.0000 & 0.0000 & 0.0000 \\ 0.0000 & 0.0000 & 0.0148 & 0.0788 & 0.1996 & 0.2500 & 0.0283 & 0.2856 \\ 0.0000 & 0.0000 & 0.0000 & 0.6306 & 0.0000 & 0.0000 & 0.2265 & 0.0000 \\ 0.0000 & 0.0000 & 0.0148 & 0.0788 & 0.2500 & 0.2500 & 0.0283 & 0.2856 \\ 0.0000 & 0.0000 & 0.0912 & 0.0270 & 0.0000 & 0.0000 & 0.3301 & 0.1355 \\ 0.0000 & 0.0000 & 0.3940 & 0.0788 & 0.2500 & 0.2500 & 0.0283 & 0.0788 \\ 0.0000 & 0.0000 & 0.3940 & 0.0788 & 0.2500 & 0.2500 & 0.0283 & 0.0788 \\ 0.0000 & 0.0000 & 0.0912 & 0.0270 & 0.0000 & 0.0000 & 0.3301 & 0.1355 \end{bmatrix} \quad (38)$$

This time, algebraic connectivity is equal to zero, which means at least one node is disconnected. Since only one additional zero eigenvalue exists, a single node is disconnected. It also means that first two vectors in (37) represent the null space, and the remaining six vectors represent the reachability space. Examining the null space, a one exists in the first row of the first eigenvector. Since row one is associated to node one, node one is responsible for the zero eigenvalue associated to the first eigenvector. In other words, node one is disconnected from the network.

The matrix outputs from step three show that algebraic connectivity and the null space correctly identifies two disconnected nodes. The eigenvalues produced by the are {0 0 0 1.2679 2.0000 2.0000 4.0000 4.7321} and the associated eigenvector matrix output, $V_3$, is $$V_3 = \begin{bmatrix} 0.0000 & 1.0000 & 0.0000 & 0.0000 & 0.0000 & 0.0000 & 0.0000 & 0.0000 \\ 0.0000 & 0.0000 & 0.0000 & 0.0223 & 0.2440 & 0.0060 & 0.2500 & 0.3110 \\ 0.0000 & 0.0000 & 0.0000 & 0.3110 & 0.2440 & 0.0060 & 0.2500 & 0.0223 \\ 0.0000 & 0.0000 & 0.0000 & 0.1667 & 0.0121 & 0.4879 & 0.0000 & 0.1667 \\ 0.0000 & 0.0000 & 0.0000 & 0.3110 & 0.2440 & 0.0060 & 0.2500 & 0.0223 \\ 1.0000 & 0.0000 & 0.0000 & 0.0000 & 0.0000 & 0.0000 & 0.0000 & 0.0000 \\ 0.0000 & 0.0000 & 0.0000 & 0.1667 & 0.0121 & 0.4879 & 0.0000 & 0.1667 \\ 0.0000 & 0.0000 & 0.0000 & 0.0223 & 0.2440 & 0.0060 & 0.2500 & 0.3110 \end{bmatrix} \quad (39)$$

Again, algebraic connectivity is equal to zero, which means at least one node is disconnected. This time two additional zero eigenvalues exist, which means two nodes are disconnected, and the first three vectors in (38) represent the null space. Both the first and second vector in the null space have entries equal to one. These entries occur in the sixth and first row of the first and second eigenvectors, respectively. This means node six is disconnected and responsible for the zero eigenvalue at $\lambda_1$, and node one is disconnected and responsible for the zero eigenvalue at $\lambda_2$. Again, the node disconnections are correctly determined using algebraic connectivity and the null space.

Lastly, the matrix outputs from step four show that algebraic connectivity and the null space correctly identify three disconnected nodes. The eigenvalues produced by the are {0 0 0 0 1.3820 1.3820 3.6180 3.6180} and the associated eigenvector matrix output, $V_4$, is $$V_4 = \begin{bmatrix} 0.0000 & 0.0000 & 0.0000 & 1.0000 & 0.0000 & 0.0000 & 0.0000 & 0.0000 \\ 0.0000 & 0.0000 & 0.0000 & 0.0000 & 0.2410 & 0.1590 & 0.3618 & 0.0382 \\ 0.0000 & 0.0000 & 0.0000 & 0.0000 & 0.0265 & 0.3735 & 0.1382 & 0.2618 \\ 0.0000 & 0.0000 & 1.0000 & 0.0000 & 0.0000 & 0.0000 & 0.0000 & 0.0000 \\ 0.0000 & 0.0000 & 0.0000 & 0.0000 & 0.2819 & 0.1181 & 0.3618 & 0.0382 \\ 0.0000 & 1.0000 & 0.0000 & 0.0000 & 0.0000 & 0.0000 & 0.0000 & 0.0000 \\ 0.0000 & 0.0000 & 0.0000 & 0.0000 & 0.0518 & 0.3482 & 0.1382 & 0.2618 \\ 0.0000 & 0.0000 & 0.0000 & 0.0000 & 0.3988 & 0.0012 & 0.0000 & 0.4000 \end{bmatrix} \quad (40)$$

Algebraic connectivity is equal to zero, again, but this time three additional zero eigenvalues exist; three nodes are disconnected from the network. This means the first four vectors in (39) represent the null space and the remaining four vectors represent the reachability space. Three of the vectors in the null space contain an entry equal to one; the second vector in the null space has a one in the sixth row, the third vector has a one in the fourth row, and the fourth vector has a one in the first row. This means nodes one, four and six are disconnected from the network and responsible for the three additional zero eigenvalues.

All twenty-five simulations produced similar results to those explained in this section. The results show that algebraic connectivity and the null space provide the necessary information to determine the number of location of disconnected nodes in a network through analysis of the eigenvalue and eigenvector matrices in standard form. These graph theory products, however, focus on connectivity at the nodal level, not the link level. This concept is the foundation for the second connectivity simulation.

Link Failure Simulation

A second, link connectivity simulation is required because the node disconnection simulation only focused on node connectivity. In a dynamic network, it is important to detect link connectivity problems as well. The proposed network monitoring scheme uses the link weights of the adjacency matrix to identify link failures because algebraic connectivity and the null space do not provide the information required. To demonstrate this claim, 25 networks were simulated to experience link failures on individual nodes. The inputs, n=15, c=3, p=0.5, and r=0.5, were used to create the 25 random adjacency matrices. Each node was then categorized according to its degree, and the attached links were reduced from one to zero. After each link reduction, algebraic connectivity was recalculated. The algebraic connectivity results were averaged and plotted according to the degree of the node to determine the effects of link failures on algebraic connectivity.

Figure 20:
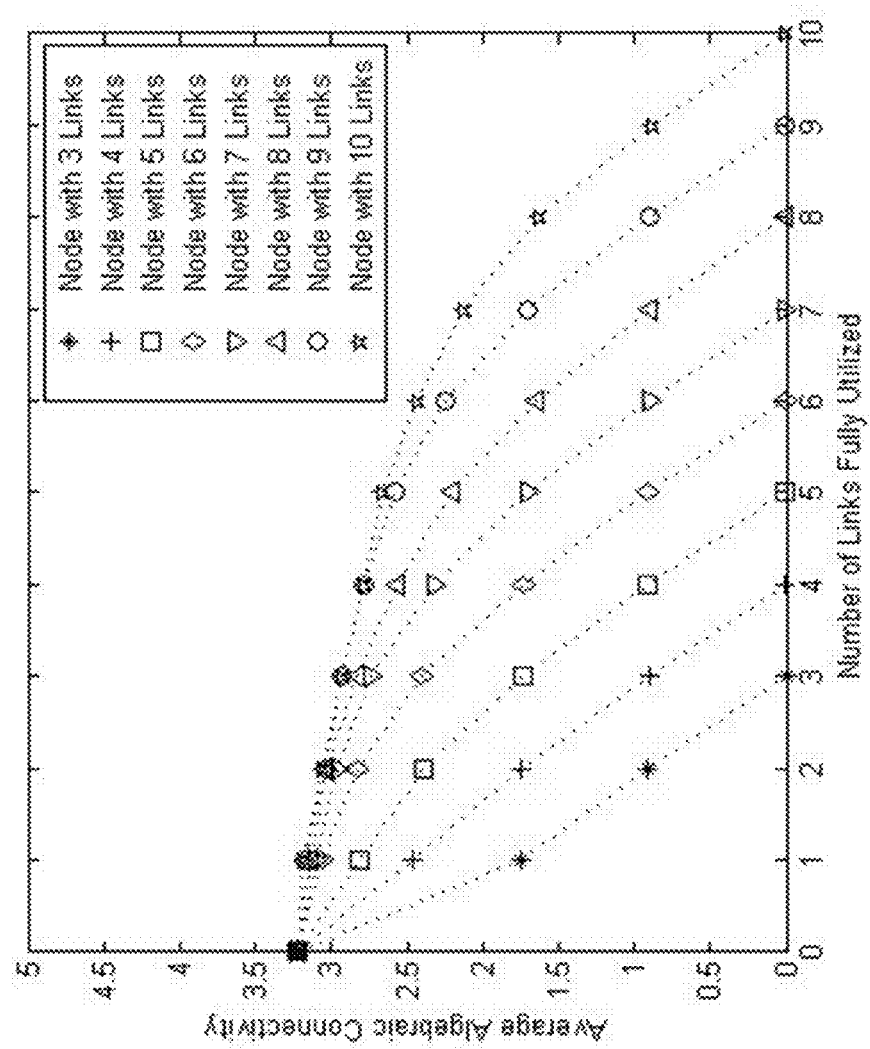
FIG. 20 is a graph illustrating simulation results, according to an exemplary embodiment herein.

FIG. 20 is a graph illustrating the averaged algebraic connectivity results from the simulations, according to an exemplary embodiment. Each plotted symbol on a given dotted line represents algebraic connectivity level when a link failed. For example, the dotted line with the "+" symbols represents nodes within the network that had four links. The average algebraic connectivity of the network is approximately 3.25 before any links on the four degree nodes were reduced, but drops to 2.5, then 1.75, then one, and lastly zero as each of the four links are individually dropped to zero.

Through analysis of the results, the null space and algebraic connectivity are not useful tools for identifying individual link failures. For each set of nodes with the same degree in FIG. 18, algebraic connectivity reaches zero when all of the links are fully utilized. This means a node does not enter the null space until all of its links have failed; a single link failure cannot be detected in the null space. The curves for each degree node also have a distinct bend when approximately 50 to 60 percent of a node's links fail for nodes that have a degree greater than four. This means algebraic connectivity is relatively unaffected by link failures until over 50 percent of its links have failed. For nodes that have a degree of four or less, algebraic connectivity is affected because it is the min degree node for the network. Since algebraic connectivity is bound by the minimum degree node, it should decrease as the number of links decrease. Additionally, FIG. 18 also shows that it is nearly impossible to determine nodal responsibility when a reduction in algebraic connectivity occurs. For example, the average algebraic connectivity is approximately 1.75 for a five degree node with three fully utilized links. It is also approximately 1.75 for a six degree node with four fully utilized links. This means a link failure on two different degree nodes could be responsible for the algebraic connectivity value, making it impossible to correctly identify a link failure.

Overall, algebraic connectivity and the null space cannot be used to identify link failures. Algebraic connectivity is minimally affected by approximately 50 percent of link failures on a node, and a change in the value of algebraic connectivity cannot be directly tied to a specific node. Additionally, a node only enters into the null space when all links have failed. Therefore, the proposed scheme must examine individual link weight values to determine individual link failures.

The disconnected node simulation showed that algebraic connectivity and the null space are useful to determine node connectivity, and the link failure simulation showed that these are not useful in determining link connectivity. Instead, the link weights of the adjacency matrix must be analyzed. The results from both link connectivity simulations validate the graph theory methods used to perform connectivity analysis in the proposed monitoring scheme; the scheme can identify node disconnections and link disconnections using graph theory analysis. The next section presents the results of the congestions simulations to show that the scheme can also identify congested and underutilized nodes.

Congestion Results

Simulation results are presented in this section to validate the congestion analysis method used in the proposed monitoring scheme. The scheme uses the dual basis to track a node's health. The health of the node is then determined by its location within dual basis relative to the phantom node. The equations for algebraic connectivity boundaries are used to determine the placement and variables of the phantom node to provide an appropriate congestion threshold level. This threshold is then used to identify congested, underutilized, and attacked nodes. This method is broken down into three concepts for the simulations. First, the node health tracking simulation shows that the dual basis can be used to track a node's health relative to other nodes in the network. Second, the node health identification simulation demonstrates that the phantom node establishes a threshold that identifies congested, underutilized, and attacked nodes. Lastly, the congestion estimation simulation verifies the accuracy of the algebraic connectivity boundary equations in producing a congestion threshold level. The results from these three simulations validate the graph theory analysis methods used in the proposed monitoring scheme to provide congestion analysis.

Node Health Tracking Simulation

Figure 21:
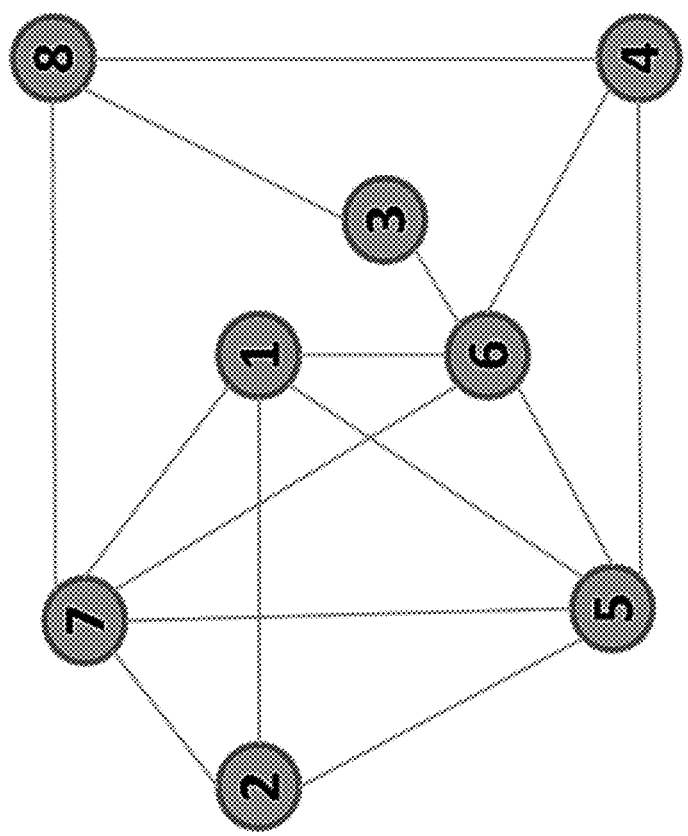
FIG. 21 is a schematic diagram illustrating a software defined network according to an exemplary embodiment herein.

The dual basis provides all the required information to track the changes in a node's health and connectedness over time. To illustrate this concept, a network was simulated to experience congestion on one node across two seconds. The simulation was conducted 30 times to ensure the accuracy of the results. Since all of the results were similar, the results of only one run are presented here. This run used $$A = \begin{bmatrix} 0 & 1 & 0 & 1 & 1 & 1 & 1 & 1 \\ 1 & 0 & 0 & 0 & 1 & 0 & 1 & 0 \\ 0 & 0 & 0 & 0 & 0 & 1 & 0 & 1 \\ 1 & 0 & 0 & 0 & 1 & 1 & 0 & 1 \\ 1 & 1 & 0 & 1 & 0 & 1 & 1 & 0 \\ 1 & 0 & 1 & 1 & 1 & 0 & 1 & 0 \\ 1 & 1 & 0 & 0 & 1 & 1 & 0 & 1 \\ 1 & 0 & 1 & 1 & 0 & 0 & 1 & 0 \end{bmatrix} \quad (41)$$

which was produced from the inputs n=8, c=2, p=0.45, and r=0.35. The resultant network topology formed by (40) is displayed in FIG. 21. FIG. 21 is a schematic diagram illustrating network topology of random modular network formed by the eight node adjacency matrix with two modules, 0.45 overall probability of attachment, and 0.3 proportion of links within modules, according to an exemplary embodiment. FIG. 21 shows that several nodes, including node one, are well connected. Node one was selected as the node to experience the congestion because it is one of the most connected nodes in the network and has primary influence of the larger eigenvalues. This was determined by plotting the eigencentrality basis and the eigenspectrum. The eigencentrality basis was plotted using open source code that requires three eigenvectors for the inputs.

Figure 22:
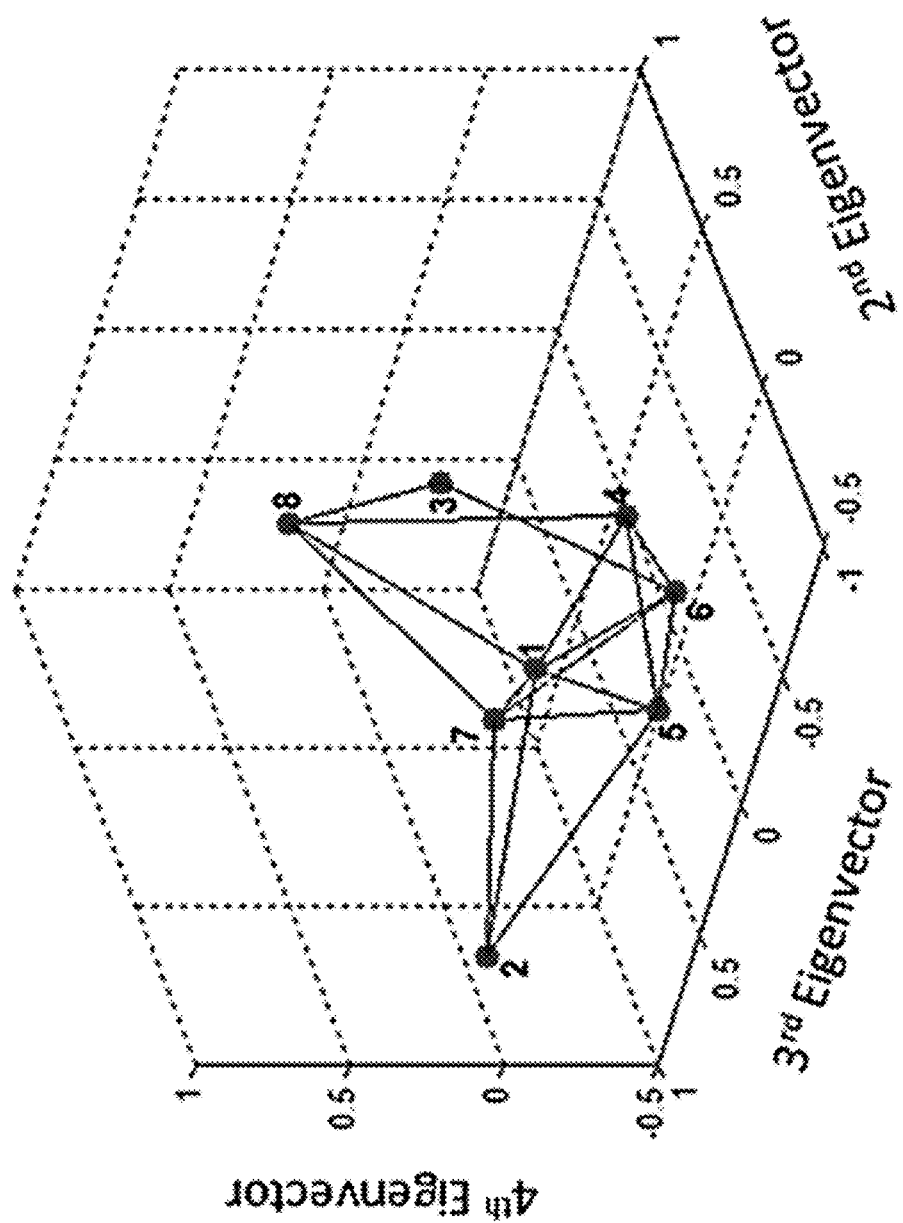
FIG. 22 is a graph illustrating simulation results, according to an exemplary embodiment herein.

FIG. 22 displays the eigencentrality basis graph using the second, third, and fourth eigenvectors. Node one is plotted near the center of the graph, which means it is one of the most connected nodes. Simulation results for the eigenspectrum shows that node one has a large eigencentrality metric for the seventh and eight eigenvalues. Then, all of node one's links were then decreased by 0.01 increments; in two seconds, all of the links were decreased from one to zero. After each incremental decrease, the eigenvector matrices were recalculated from the new adjacency matrix. The eigenvector results for each node were then compiled together to determine if the dual basis tracked changes in node health and connectivity.

Simulation results for node congestion across all eight eigencentrality vectors show that node one starts out having primary influence over the seventh and eighth eigenvectors, and node five has primary influence over the sixth eigenvector. At approximately 0.25 seconds, node one takes over as primary influencer of the sixth eigenvector and node five becomes the primary influencer of the seventh and eight eigenvector. This shift in eigenvector and eigenvalue influence means that the congestion on node one's links has made it weaker or less connected than node five. As congestion continues to be added, node one becomes weaker than nodes four and seven at approximately 0.7 seconds and takes over as primary influencer of the fifth eigenvector. At the same time, they nodes four and seven take over as the main influencers of the sixth eigenvector. This shift in influence continues all the way until node one takes over as primary influencer of the second eigenvector at approximately 1.6 seconds. At this point, node one is the weakest and least connected node in the network due to the congestion on its links. These results show that a node's health can be determined relative to other nodes in the network by determining the node's eigenvector magnitudes. Additionally, the magnitudes and shifts in influence can be tracked to determine changes in a nodes health relative to other nodes.

The results of the health tracking simulation show that the dual basis, specifically the eigencentrality basis and vectors, provides the information to track changes in a node's health and connectedness over time. This concept is applied in the next simulation to show that a phantom node establishes a congestion threshold by which a node's health can be compared to determine congestion, underutilization, or attack.

Node Health Identification Simulation

A phantom node establishes a congestion threshold that is used to determine if a node is congested, underutilized, or attacked. To illustrate this concept, congestion is added to three links across three seconds in a network that has a phantom node. Additionally, the simulation keeps the link weights of a node constant once the node fails to model an unresponsive or attacked node. The simulation was conducted on 50 random networks of various sizes to ensure the accuracy of the results. Since all of the results were similar, the results of only one run are presented here to demonstrate the concept. In this run, the simulation used (40) as the initial adjacency matrix. Then a phantom node is attached to node seven with a link weight of equal to one, which changed (40) to $$A = \begin{bmatrix} 0 & 1 & 0 & 1 & 1 & 1 & 1 & 1 & 0 \\ 1 & 0 & 0 & 0 & 1 & 0 & 1 & 0 & 0 \\ 0 & 0 & 0 & 0 & 0 & 1 & 0 & 1 & 0 \\ 1 & 0 & 0 & 0 & 1 & 1 & 0 & 1 & 0 \\ 1 & 1 & 0 & 1 & 0 & 1 & 1 & 0 & 0 \\ 1 & 0 & 1 & 1 & 1 & 0 & 1 & 0 & 0 \\ 1 & 1 & 0 & 0 & 1 & 1 & 0 & 1 & 1 \\ 1 & 0 & 1 & 1 & 0 & 0 & 1 & 0 & 0 \\ 0 & 0 & 0 & 0 & 0 & 0 & 1 & 0 & 0 \end{bmatrix} \quad (42)$$

Figure 23:
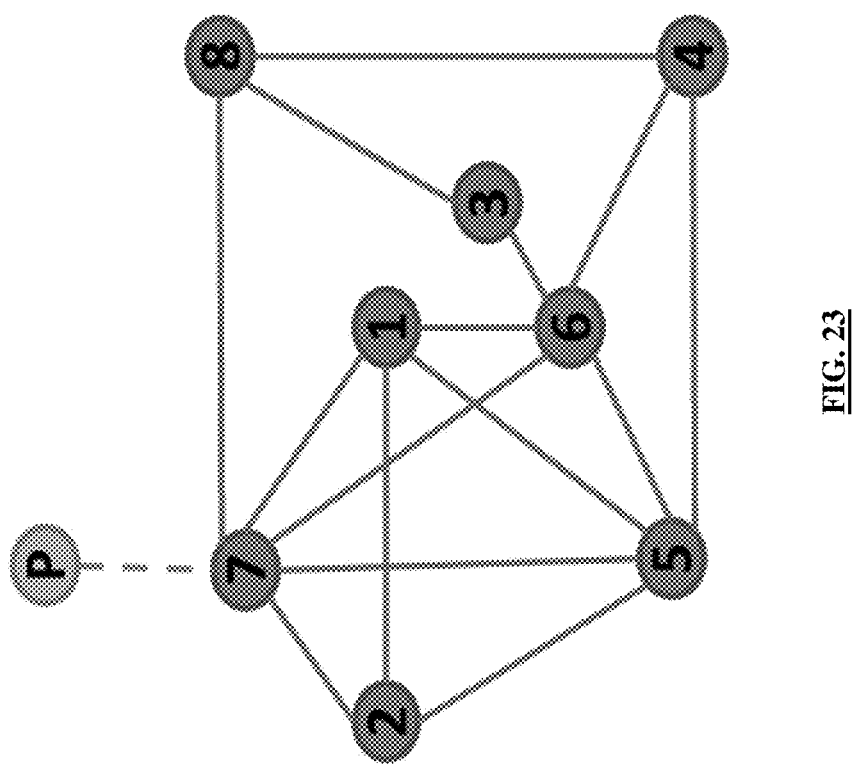
FIG. 23 is a schematic diagram illustrating a software defined network according to an exemplary embodiment herein.

Node seven was selected because it has $V_n^{j\ max}$. The phantom node is node nine in (41) and is connected only to node seven. The resultant network topology formed by (41) is displayed in FIG. 23. FIG. 23 is a schematic diagram illustrating network topology of an eight node network containing one phantom node, according to an exemplary embodiment. The phantom node is designated by the P node, and a dotted link is used to show that the phantom node does not exist in the physical topology, but does exist in the adjacency matrix. Next, three random links were then selected to experience congestion. Node one's links decreased from one to zero between zero and one second to simulate congestion and then remained zero from one to three seconds to simulate unresponsiveness to changes in flow rules. Node three's links decreased from one to zero between one and two seconds to simulate congestion and then remained zero from two to three seconds to simulate an unresponsive node. Lastly, node four's links decreased from two to three seconds to simulate congestion. All of the links decreased by 0.01 increments and the eigenvector matrices were recalculated after each incremental decrease from the new adjacency matrix. The eigenvector results were compiled together to produce eigenspectrum plots and eigencentrality vector plots in order to determine if the phantom node established a threshold that could be used to identify the health of the node.

Simulation results for four instants in time show that at zero seconds, the network is at 100 percent $C_A$ across all links. Simulation results show the eigenspectrum plot of the network at zero seconds. This plot shows that phantom node is primary influencer of $\lambda_2$, node one is primary influencer of $\lambda_9$, node three is primary influencer of $\lambda_3$, and node four one of the two primary influencers of $\lambda_4$ at the start of the simulation. The phantom node has established a congestion threshold by having primary influence of $\lambda_2$.

At one second, node one's links have been reduced from one to zero. Simulation results show the eigenspectrum plot of the network at one second. The plot shows that a shift in eigenvalue influence has occurred. The phantom node is now primary influencer of $\lambda_3$, node one is now primary influencer of $\lambda_2$, node three is now primary influencer of $\lambda_4$, and node four is now primary influencers of $\lambda_5$. The shift of phantom node eigenvalue influence indicates a threshold crossing. Node one has primary influence of a smaller eigenvalue than the eigenvalue being primarily influenced by the phantom node. This means node one has crossed the congestion threshold at some point during the first second of the simulation. Additionally, the plot shows that node one has a magnitude of one for $\lambda_2$ and a magnitude of zero for all other eigenvalues because it has entered the null space.

At two seconds, node three's links have been reduced to zero and node one's links remain zero. Simulation results show the eigenspectrum plot of the network at two seconds. The plot shows that another shift in eigenvalue influence has occurred. The phantom node is now primary influencer of $\lambda_4$, node one is now primary influencer of $\lambda_3$, node three is now primary influencer of $\lambda_2$, and node four is now primary influencers of $\lambda_7$. Both nodes one and three are primary influencers of smaller eigenvalues than the eigenvalue associated to the phantom node. This means node three crossed the congestion threshold at some point between one and two seconds. Additionally, node one remained above the congestion threshold, which indicates that it was unresponsive to changes in flow rules.

At three seconds, the simulation ends with node four's links reduced to zero. Additionally, node one's and node three's links remained zero. Simulation results show the eigenspectrum plot of the network at three seconds. The phantom node is now primary influencer of $\lambda_5$, node one remains primary influencer of $\lambda_3$, node three is now primary influencer of $\lambda_4$, and node four is now primary influencers of $\lambda_2$. Again, a shift in eigenvalue influence is observed. Node four crosses the congestion threshold at some point between two and three seconds, and both nodes one and three remain unresponsive at a congestion level above the congestion threshold.

To determine the exact instants in time that the three shifts in eigenvalue influence occurred, the eigenvector results were compiled to show the dynamic changes in each node's eigenvector magnitude over the three seconds. Simulation results for the second, third, fourth, and fifth eigenvectors are presented. These eigenvectors were selected because the phantom node shifts influence from $\lambda_2$ to $\lambda_5$ during the three seconds. In all of the plots, each line shows an individual node's magnitude changes in a particular eigenvector. The node that has the largest magnitude in the eigenvector is the primary influencer of the associated eigenvalue. The discontinuous jumps observed at one and two seconds in the second and third eigenvectors, respectively, is the result of the eigenvector being formatted into standard form when a node enters the null space.

Simulation results show the shift in eigenvalue influence when node one crosses the congestion threshold. At 0.88 seconds, node one's magnitude become larger than the phantom node's magnitude in the second eigenvector. This means node one took over as primary influencer of $\lambda_2$ at 0.88 seconds when it has approximately 12 percent $C_A$ across its links; node one crossed the congestion threshold when it reached approximately 88 percent congestion. Node one maintained the largest magnitude in the second eigenvector until the simulation reached two seconds. At two seconds, node three's link reach zero and node one's links remain zero. Since node three has a smaller degree of links than node one, it is considered less connected and takes over as primary influencer of the second eigenvector and eigenvalue. As a result, node one takes over as primary influencer of the third eigenvector and eigenvalue.

Simulation results show four shifts in eigenvalue influence in the third eigenvector across the three seconds. At 0.77 seconds, node one's magnitude becomes larger than node three's magnitude when its links are approximately 77 percent congested. This means that at 77 percent congestion, node one is weaker or less connected than node three. At 0.88 seconds, the phantom node's magnitude becomes larger than node one's magnitude as node one crosses the congestion threshold. At 1.64 seconds, node three's magnitude becomes larger than the phantom node's magnitude; node three crosses the congestion threshold at 1.64 seconds when its links are approximately 64 percent congested. Lastly, node one's magnitude becomes larger than node three's magnitude at two seconds when node three enters the null space.

Simulation results show even more shifts in eigenvector and eigenvalue influence. Of significance is the shift in influence that occurs at 2.84 seconds in both plots. Node four shifts influence from the fifth eigenvalue to the fourth eigenvalue while the phantom node shifts influence from the fourth eigenvalue to the fifth eigenvalue. At this point, node four has crossed the congestion threshold with approximately 84 percent congestion across its links.

Overall, the simulation results show that the phantom node congestion threshold can be used to identify congested, underutilized, and attacked nodes. As nodes one, three, and four became congested, they shifted their eigenvalue influence to smaller and smaller eigenvalues. At some point, the congestion made the nodes weaker than the phantom node, which resulted in a congestion threshold crossing. This means a node can be identified as congested if it has primary influence over a smaller eigenvalue than the one associated to the phantom node. Conversely, the results show that nodes five, six, and seven consistently maintain primary influence over the largest eigenvectors. These nodes are high degree nodes with zero congestion. This means a node can be identified as underutilized if it has primary influence over an eigenvalue much larger than the one associated to the phantom node. Lastly, the results show that a node can be identified as attacked if it remains primary influencer of a smaller eigenvalue than one associated to the phantom node even after measures have been taken to reduce the congestion.

The health identification simulation results show that the dual basis provides the information to identify congested, underutilized, and attacked nodes in a dynamic network. Additionally, the congested nodes can be determined before node failure. This concept is applied in the next set of simulations to show that the phantom node variables can be manipulated to produce different congestion threshold levels, and that a node's congestion can be accurately estimated when it crosses the threshold. The ability to accurately estimate the congestion threshold established by particular phantom node variables allows the network monitoring scheme to be customizable to specific network requirements.

Accuracy of Congestion Threshold

The algebraic connectivity boundary equations provide a tool to solve for and estimate the amount of capacity used on a node when it crosses a congestion threshold. In order to use the equations to estimate congestion, the algebraic boundaries produced by the equations must first be validated. Following validation, two congestion estimation simulations are presented to show that the equations can be used to accurately estimate a node's congestion when it crosses the congestion threshold. The first simulation shows the single phantom node case, and the second simulation shows the multiple phantom node case. The simulation results confirm the accuracy of the congestion estimation method for both the single congestion threshold case, and the multiple congestion threshold case. This means the network monitoring scheme can be tailored to meet the needs of individual networks.

Algebraic Connectivity Boundary Equations

The boundary equations for algebraic connectivity not only bound algebraic connectivity, but also provide an estimation of nodal capacity when it takes over as primary influencer of $\lambda_2$. To illustrate this, congestion was simulated across 30 random 15 node networks that each had a minimum degree node equal to three. Each node was categorized according to degree and then its links were incrementally decreased from one to zero. Algebraic connectivity was recalculated and recorded after each decrease in link weight. The results were compiled together according to the degree of the node to determine if the equations bound algebraic connectivity and if the intersection point identifies the level of congestion required for a node to have $V_2^{j\ max}$.

Figure 25:
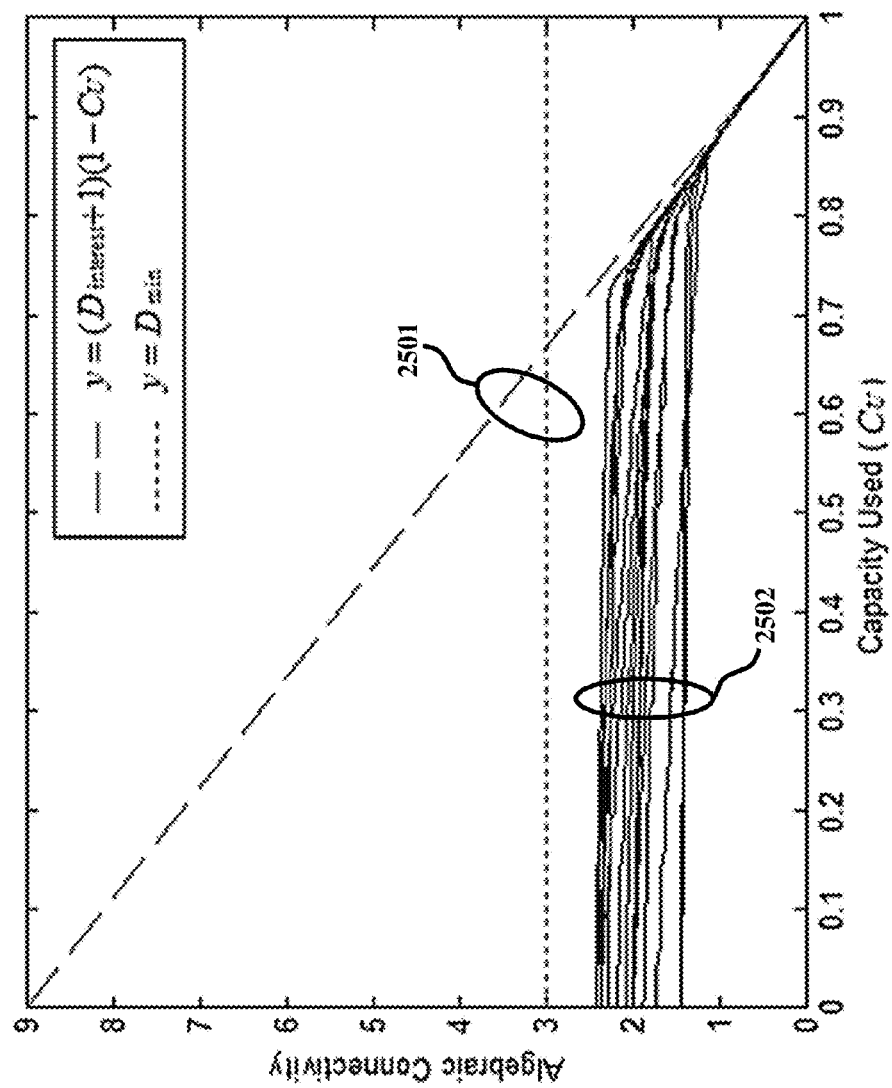
FIG. 25 is a graph illustrating simulation results, according to an exemplary embodiment herein.
Figure 26:
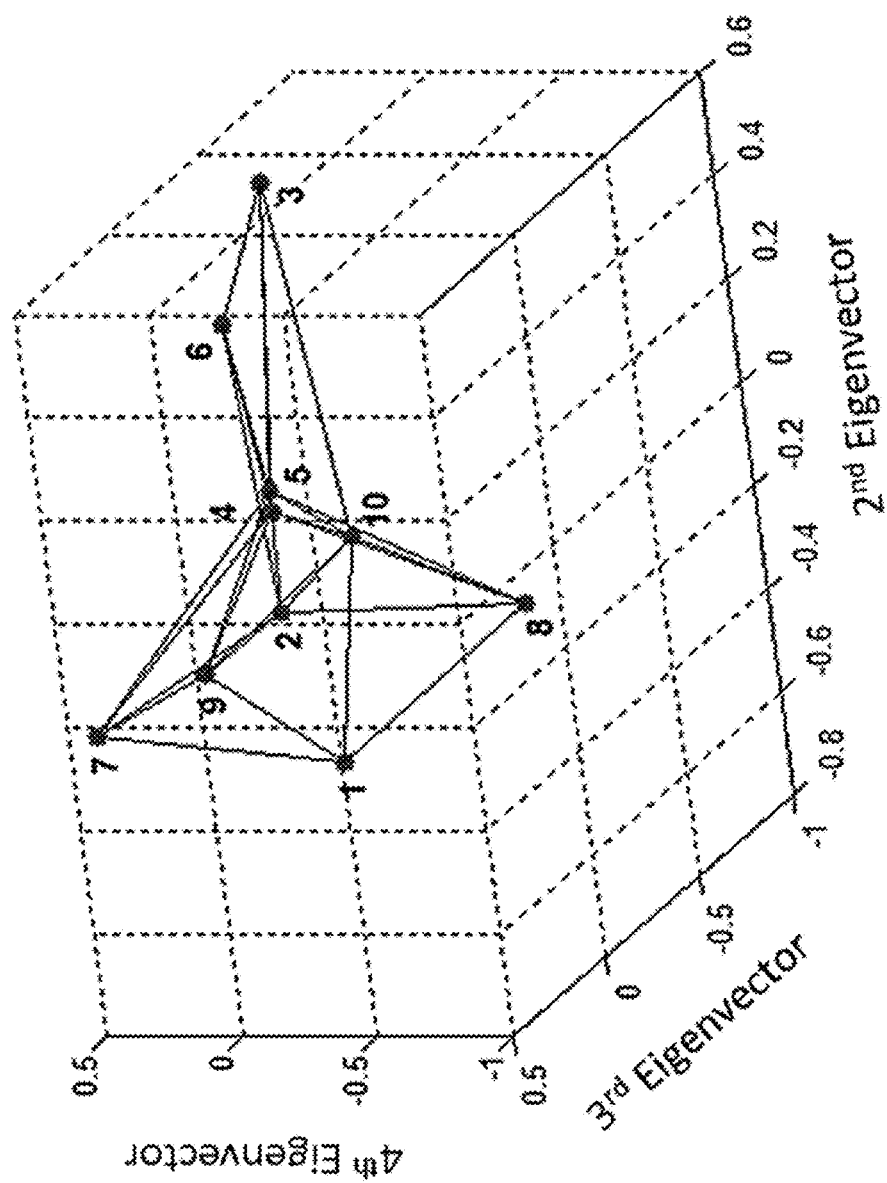
FIG. 26 is a graph illustrating simulation results, according to an exemplary embodiment herein.

The simulation was conducted 15 times and the results were similar regardless of the degree of the node of interest. Therefore, only the results of two different degree nodes from one simulation are displayed. FIGS. 25 and 26 are graphs illustrating plotted algebraic connectivity results for the five degree nodes and the eight degree nodes, according to an exemplary embodiment. The recorded changes in algebraic connectivity are shown by lines 2402 and 2502, and the algebraic connectivity boundary equations are plotted using dashed lines 2401, 2501. Both plots show that the network's algebraic connectivity always falls within the operating space bound by the equations. The equations accurately provide upper and right bounds for algebraic connectivity.

Figure 24:
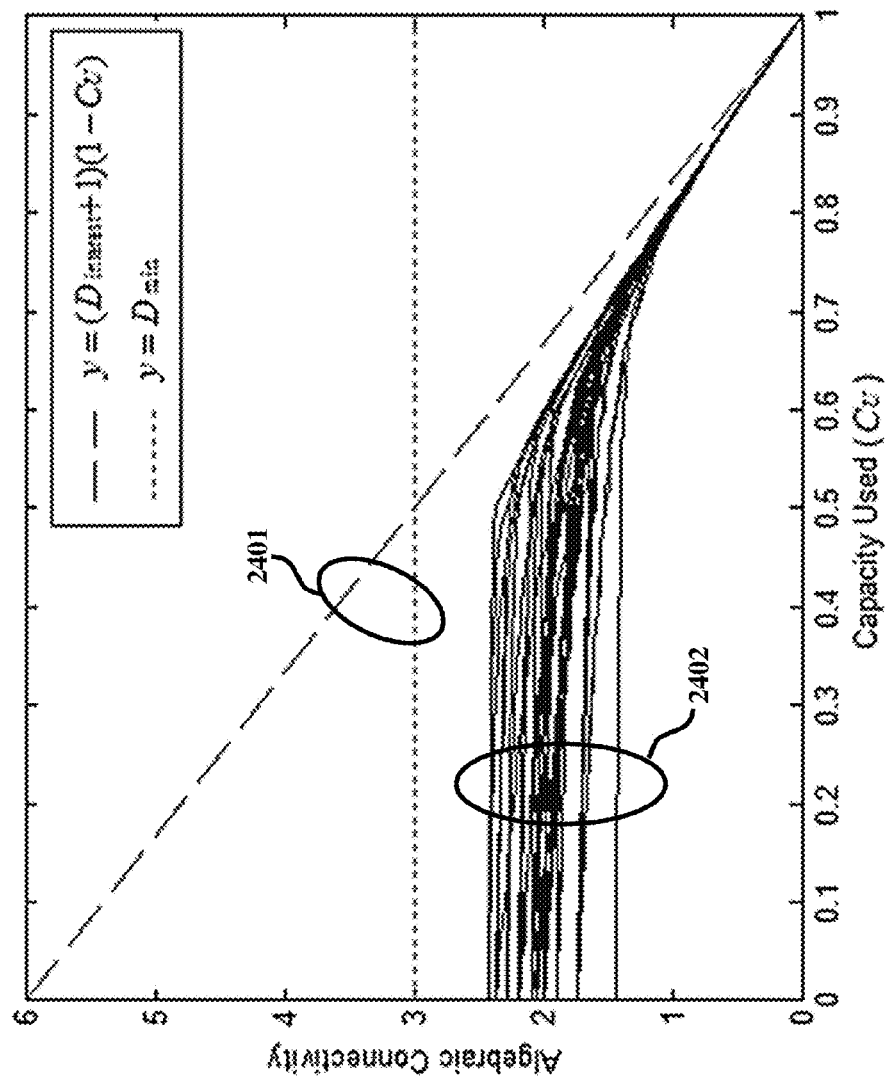
FIG. 24 is a graph illustrating simulation results, according to an exemplary embodiment herein.

Additionally, the plots in FIGS. 24 and 25 show that algebraic connectivity stays relatively unchanged until the node's capacity reaches the capacity at the intersection of the two boundary equations, according to an exemplary embodiment. At this point, algebraic connectivity starts to rapidly decrease. This outcome is consistent with the results from the tracking node health simulation; algebraic connectivity is not affected by congestion unless the node that is primary controller of $\lambda_2$ is experiencing congestion. This means the intersection of the two algebraic connectivity boundary equations provides an estimate for nodal capacity used when it takes over influence of the smallest eigenvalue.

The simulations results show that the boundary equations for algebraic connectivity can be used to predict a node's capacity when it takes over influence of X2. This concept is used in the remaining two simulations of this chapter to determine the accuracy of congestion estimation using the equations for algebraic connectivity.

Single Phantom Node Case

The congestion estimation method for the single phantom node case uses the intersection point of the upper and right algebraic connectivity boundary equations to estimate a node's congestion when it crosses a congestion threshold. To demonstrate the accuracy of this method, a network with a single phantom node was simulated to experience nodal congestion. This simulation was conducted 20 times to ensure accuracy of the results. Since all of the simulations produced similar results, the results of a single network are presented here. The inputs n=10, c=2, p=0.5, and r=0.5 were used to form $$A = \begin{bmatrix} 0 & 0 & 0 & 0 & 0 & 0 & 1 & 1 & 1 & 1 \\ 0 & 0 & 0 & 1 & 0 & 1 & 1 & 1 & 1 & 1 \\ 0 & 0 & 0 & 1 & 1 & 1 & 0 & 0 & 0 & 1 \\ 0 & 1 & 1 & 0 & 1 & 1 & 1 & 1 & 1 & 1 \\ 0 & 0 & 1 & 1 & 0 & 1 & 1 & 1 & 1 & 1 \\ 0 & 1 & 1 & 1 & 1 & 0 & 0 & 0 & 0 & 0 \\ 1 & 1 & 0 & 1 & 1 & 0 & 0 & 0 & 1 & 0 \\ 1 & 1 & 0 & 1 & 1 & 0 & 0 & 0 & 0 & 1 \\ 1 & 1 & 0 & 1 & 1 & 0 & 1 & 0 & 0 & 1 \\ 1 & 1 & 1 & 1 & 1 & 0 & 0 & 1 & 1 & 0 \end{bmatrix} \qquad (43)$$

Using (42), the eigencentrality basis was plotted using the second, third, and fourth eigenvectors and is shown in FIG. 25. FIG. 25 is a diagram illustrating Eigencentrality basis of random modular ten node network with two modules, 0.5 overall probability of attachment, and 0.5 proportion of links within each module, according to an exemplary embodiment. The eigencentrality basis provides a good physical description of the nodal connections. FIG. 25 shows that the network has node degrees ranging from four to eight, and nodes four, five, and ten are most connected. Since node four is both the maximum degree node and one of the most connected nodes, it was initially selected for phantom node attachment; a single phantom node with a link weight equal to one was connected to node four in the adjacency matrix. Then the link weights for each node were incrementally decreased from one to zero. After each decrease, the eigenvector matrices were recalculated from the new adjacency matrix. The results were then compiled to track each node's health and the point of congestion threshold crossing was determined. The capacity used was measured at the instant the node crossed the congestion threshold. Then, this process was repeated ten times, attaching the phantom node to a new node each time, to determine the effects of phantom node attachment on the estimation method. Lastly, $C_{U\,intersect}$ was determined at the intersection of the algebraic connectivity boundary equations by substituting the correct values for $D_{interest}$ and $D_{phantom}$ into (33). These estimated values were then compared to the measured values to determine the accuracy of the congestion estimation method.

Table 3 shows the measured and estimated capacity results for the network with the phantom node attached to node four. Excluding node four, the maximum difference is 3.25 percent between the actual measured percent $C_{U\,intersect}$ and the estimated percent $C_{U\,intersect}$ from the algebraic connectivity boundary equations; the minimum difference is 0.21 percent. The difference between measured and estimated $C_{U\,intersect}$ for node four was much higher, which indicates the congestion estimation method is not accurate for a node attached to a phantom node. Table 3 also shows the average difference, both including and excluding node four's results. Excluding the results of the node attached to the phantom node, the average difference between the measured percent $C_{U\,intersect}$ and estimated percent $C_{U\,intersect}$ was only 1.5 percent. The boundary equations are accurate in estimating a node's congestion at the instant it crosses the congestion threshold for all nodes except the node attached to the phantom node.

TABLE 3

Percent difference between estimated and measured capacity used for nodes of a random ten node network containing a phantom with link weight equal to one attached to node four.

| Node | Node Degree (including Phantom node link) | Phantom Node Degree | Estimated $C_{U\,intersect}$ (percent) | Measured $C_{U\,intersect}$ (percent) | Difference Between Estimated and Measured (percent) |
|---|---|---|---|---|---|
| 1 | 4 | 1 | 80 | 76.75 | 3.25 |
| 2 | 6 | 1 | 85.71 | 85.17 | 0.54 |
| 3 | 4 | 1 | 80 | 77 | 3.00 |
| 4 | 9 (Phantom d = 1) | 1 | 90 | 100 | 10.00 |
| 5 | 7 | 1 | 87.5 | 87.29 | 0.21 |
| 6 | 4 | 1 | 80 | 77 | 3.00 |
| 7 | 5 | 1 | 83.33 | 82 | 1.33 |
| 8 | 5 | 1 | 83.33 | 82 | 1.33 |
| 9 | 6 | 1 | 85.71 | 85.1 | 0.61 |
| 10 | 7 | 1 | 87.5 | 87.29 | 0.21 |
| Average Difference (percent) *Including Node Attached to Phantom Node | | | | | 2.348 |
| Average Difference (percent) *Excluding Node Attached to Phantom Node | | | | | 1.50 |

For nodes attached to the phantom node, the congestion estimation method is not as accurate. The results from when each node was attached to the phantom node are displayed in Table 4. The maximum difference is 18 percent and the minimum difference is 10 percent between the actual measured percent $C_{U\,intersect}$ and the estimated percent $C_{U\,intersect}$ from the intersection of the boundary equations. The average difference for all measurements is 14.14 percent. These differences are much higher than the measurements in Table 3, which confirms the inaccuracy of the congestion estimation method for nodes attached to a phantom node. This also validates the need for phantom node relocation within the network monitoring scheme.

TABLE 4

Percent difference between estimated and measured capacity used for nodes of a random ten node network when the node is attached to phantom node with link weight equal to one.

| Node | Total Node Degree (node degree plus phantom degree) | Phantom Node Degree | Estimated $C_{U\,intersect}$ (percent) | Measured $C_{U\,intersect}$ (percent) | Difference Between Estimated and Measured (percent) |
|---|---|---|---|---|---|
| 1 | 5 | 1 | 82 | 100 | 18 |
| 2 | 7 | 1 | 87.29 | 100 | 12.71 |
| 3 | 5 | 1 | 82 | 100 | 18 |
| 4 | 9 | 1 | 90 | 100 | 10 |
| 5 | 8 | 1 | 88.89 | 100 | 11.11 |
| 6 | 5 | 1 | 82 | 100 | 18 |
| 7 | 6 | 1 | 85.1 | 100 | 14.9 |
| 8 | 6 | 1 | 85.1 | 100 | 14.9 |
| 9 | 7 | 1 | 87.29 | 100 | 12.71 |
| 10 | 8 | 1 | 88.89 | 100 | 11.11 |
| Average Difference (percent) | | | | | 14.14 |

The simulation results show that the estimation method using the algebraic connectivity boundary equations is accurate in predicting or estimating nodal congestion when a threshold crossing occurs. This simulation, however, only used one phantom node with a link weight equal to one. The multiple phantom node simulation demonstrates that this method is still accurate even when there are multiple phantom nodes and the phantom node link weight is not equal to one.

Multiple Phantom Node Case

The method of estimating congestion using the intersection of the boundary equations is applied to networks containing multiple phantom nodes with varying link weight values to determine the congestion estimation accuracy. Networks with two and three phantom nodes were simulated to experience congestion for the purpose of comparing measured congestion to estimated congestion when a node crosses the multiple congestion thresholds. The simulation was conducted 15 times to ensure the accuracy of the results. Each simulation produced a network that was then simulated to have both two phantom nodes and three phantom nodes. The network with two phantom nodes produced two congestion thresholds and the network with three phantom nodes produced three congestion thresholds. The link weights for each node in both networks were incrementally decreased from one to zero. After each decrease, the eigenvector matrix was recalculated from the new adjacency matrix and the results were compiled to track the nodes' health. For the network with two phantom nodes, the two congestion threshold crossings were identified and $C_{U\,intersect}$ was measured at each instance. For the network with three phantom nodes, the three congestion threshold crossings were identified and $C_{U\,intersect}$ was measured at each instance. Then, the correct values for $D_{interest}$ and $D_{phantom}$ were substituted into (33) and $C_{U\ intersect}$ was calculated. Lastly, this estimated $C_{U\ intersect}$ value was compared to the measured $C_{U\ intersect}$ value to determine the accuracy of the estimation method in networks with multiple phantom nodes.

All of the results of the fifteen networks were similar so a single case is presented here. The initial network was produced using inputs n=10, c=2, p=0.5, and r=0.5, but this network was altered to gain a larger difference between the minimum degree node and maximum degree node. From the inputs, $$A = \begin{bmatrix} 0 & 1 & 1 & 1 & 0 & 0 & 0 & 0 & 1 & 0 \\ 1 & 0 & 1 & 1 & 0 & 1 & 0 & 1 & 1 & 1 \\ 1 & 1 & 0 & 1 & 1 & 1 & 0 & 1 & 1 & 0 \\ 1 & 1 & 1 & 0 & 1 & 0 & 1 & 1 & 1 & 0 \\ 0 & 0 & 1 & 1 & 0 & 0 & 0 & 1 & 0 & 1 \\ 0 & 1 & 1 & 0 & 0 & 0 & 1 & 1 & 0 & 1 \\ 0 & 0 & 0 & 1 & 0 & 1 & 0 & 1 & 1 & 0 \\ 0 & 1 & 1 & 1 & 1 & 1 & 1 & 0 & 1 & 1 \\ 1 & 1 & 1 & 1 & 0 & 0 & 1 & 1 & 0 & 1 \\ 0 & 1 & 0 & 0 & 1 & 1 & 0 & 1 & 1 & 0 \end{bmatrix} \quad (43)$$

was formed and then altered to $$A = \begin{bmatrix} 0 & 1 & 1 & 1 & 0 & 0 & 0 & 1 & 0 & 0 & 1 & 0 \\ 1 & 0 & 1 & 1 & 0 & 1 & 0 & 1 & 1 & 1 & 0 & 0 & 1 \\ 1 & 1 & 0 & 1 & 1 & 1 & 0 & 1 & 1 & 0 & 0 & 0 & 1 \\ 1 & 1 & 1 & 0 & 1 & 0 & 1 & 1 & 1 & 0 & 0 & 0 & 0 \\ 0 & 0 & 1 & 1 & 0 & 0 & 0 & 1 & 0 & 1 & 1 & 0 & 0 \\ 0 & 1 & 1 & 0 & 0 & 0 & 1 & 1 & 0 & 1 & 0 & 1 & 0 \\ 0 & 0 & 0 & 1 & 0 & 1 & 0 & 1 & 1 & 0 & 0 & 0 & 0 \\ 0 & 1 & 1 & 1 & 1 & 1 & 1 & 0 & 1 & 1 & 0 & 0 & 1 \\ 1 & 1 & 1 & 1 & 0 & 0 & 1 & 1 & 0 & 1 & 0 & 0 & 0 \\ 0 & 1 & 0 & 0 & 1 & 1 & 0 & 1 & 1 & 0 & 0 & 0 & 0 \\ 0 & 0 & 0 & 0 & 1 & 0 & 0 & 0 & 0 & 0 & 0 & 0 & 0 \\ 1 & 0 & 0 & 0 & 0 & 1 & 0 & 0 & 0 & 0 & 0 & 0 & 0 \\ 0 & 1 & 1 & 0 & 0 & 0 & 0 & 1 & 0 & 0 & 0 & 0 & 0 \end{bmatrix} \quad (44)$$

Three nodes were added to (43) to produce (44); node 11 was attached to node five, node 12 was attached to nodes one and six, and node 13 was attached to nodes two, three, and eight. The addition of these three nodes, altered the degree range of the network from [4 8] to [1 9]. With a larger degree range, (44) was the network used for the two phantom node simulation.

For the two phantom node case, a phantom node with a link weight equal to 0.5 was attached to node eight from the network formed by (44), and a phantom node with link weight equal to 1.5 was attached to node three. These phantom nodes changed (44) to $$A = \begin{bmatrix} 0 & 1 & 1 & 1 & 0 & 0 & 0 & 1 & 0 & 0 & 1 & 0 & 0 & 0 \\ 1 & 0 & 1 & 1 & 0 & 1 & 0 & 1 & 1 & 1 & 0 & 0 & 1 & 0 \\ 1 & 1 & 0 & 1 & 1 & 1 & 0 & 1 & 1 & 0 & 0 & 0 & 1 & 0 & 1.5 \\ 1 & 1 & 1 & 0 & 1 & 0 & 1 & 1 & 0 & 0 & 0 & 0 & 0 & 0 \\ 0 & 0 & 1 & 1 & 0 & 0 & 0 & 1 & 0 & 1 & 1 & 0 & 0 & 0 \\ 0 & 1 & 1 & 0 & 0 & 0 & 1 & 1 & 0 & 1 & 0 & 1 & 0 & 0 \\ 0 & 0 & 0 & 1 & 0 & 1 & 0 & 1 & 1 & 0 & 0 & 0 & 0 & 0 \\ 0 & 1 & 1 & 1 & 1 & 1 & 1 & 0 & 1 & 1 & 0 & 0 & 1 & 0.5 & 0 \\ 1 & 1 & 1 & 1 & 0 & 0 & 1 & 1 & 0 & 1 & 0 & 0 & 0 & 0 \\ 0 & 1 & 0 & 0 & 1 & 1 & 0 & 1 & 1 & 0 & 0 & 0 & 0 & 0 \\ 0 & 0 & 0 & 0 & 1 & 0 & 0 & 0 & 0 & 0 & 0 & 0 & 0 & 0 \\ 1 & 0 & 0 & 0 & 0 & 1 & 0 & 0 & 0 & 0 & 0 & 0 & 0 & 0 \\ 0 & 1 & 1 & 0 & 0 & 0 & 1 & 0 & 0 & 0 & 0 & 0 & 0 & 0 \\ 0 & 0 & 0 & 0 & 0 & 0 & 0 & 0.5 & 0 & 0 & 0 & 0 & 0 & 0 \\ 0 & 0 & 1.5 & 0 & 0 & 0 & 0 & 0 & 0 & 0 & 0 & 0 & 0 & 0 \end{bmatrix} \quad (46)$$

Figure 27:
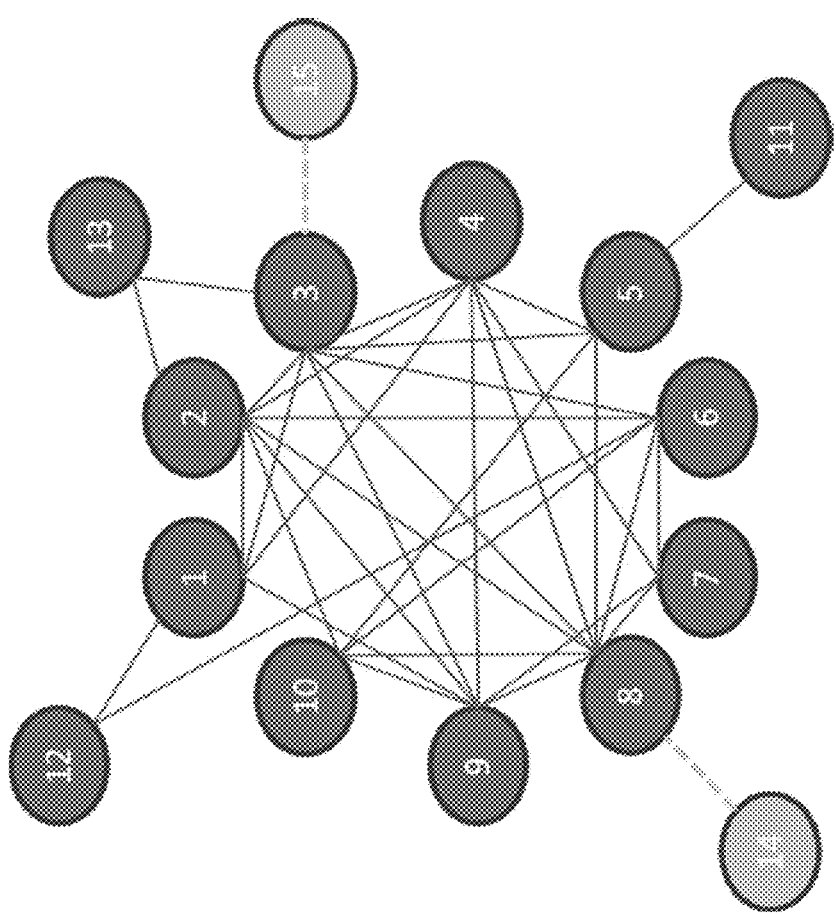
FIG. 27 is a schematic diagram illustrating a software defined network according to an exemplary embodiment herein.

FIG. 27 shows the resultant network topology formed by (45), according to an exemplary embodiment. The phantom nodes are connected by dashed lines that represent a link that exists in the adjacency matrix but not in the actual physical network. This network was used to estimate $C_{U\ intersect}$ for all nodes to determine the accuracy of the congestion estimation of threshold crossings.

The results of the simulation using (45) are displayed in Table 5. Table 5 shows that the maximum difference is 29.5 percent between the actual measured percent $C_{U\ intersect}$ and the estimated percent $C_{U\ intersect}$ from the algebraic connectivity boundary equations. This occurs on the node 11, which has a degree of one. Node 12 also has a large difference between estimated and measured $C_{U\ intersect}$. The difference results for nodes 11 and 12 are significantly larger than any of the other nodes that are also not attached to phantom nodes. This implies that in the two phantom node case, the estimation method is not as accurate for low degree nodes; however, it is important to note that the estimation method overestimated the percent $C_{U\ intersect}$, which means the node would be identified as congested well below failure in the monitoring scheme. Therefore, this large difference between measured and estimated is acceptable. Excluding nodes 11 and 12, and the nodes attached to phantom nodes, the largest difference between measured and estimated is 6.2 percent. Additionally, the average difference between the measured and estimated $C_{U\ intersect}$ is 5.6 percent when the results from nodes three and eight are excluded. Overall, the estimation method is accurate for the two phantom node case.

TABLE 5

Percent difference between estimated and measured capacity used for nodes of a random fifteen node network containing two phantom nodes, one with link weight equal to 0.5 attached to node eight and one with link weight equal to 1.5 attached to node three.

| Node | Total Node Degree (node degree + phantom degree) | Phantom Node Degree | Estimated $C_{U\ intersect}$ (percent) | Measured $C_{U\ intersect}$ (percent) | Difference Between Estimated and Measured (percent) |
|---|---|---|---|---|---|
| 1 | 5 | 0.5 | 91.67 | 90.2 | 1.47 |
|   |   | 1.5 | 75 | 79.4 | 4.4 |
| 2 | 8 | 0.5 | 94.44 | 94.1 | 0.34 |
|   |   | 1.5 | 83.33 | 84 | 0.67 |

TABLE 5-continued

Percent difference between estimated and measured capacity used for nodes of a random fifteen node network containing two phantom nodes, one with link weight equal to 0.5 attached to node eight and one with link weight equal to 1.5 attached to node three.

| Node | Total Node Degree (node degree + phantom degree) | Phantom Node Degree | Estimated $C_{U\,intersect}$ (percent) | Measured $C_{U\,intersect}$ (percent) | Difference Between Estimated and Measured (percent) |
|---|---|---|---|---|---|
| 3 | 9.5 | 0.5 | 95.23 | 77.1 | 18.13 |
|   | (Phantom d = 1.5) | 1.5 | 85.71 | 100 | 14.29 |
| 4 | 7 | 0.5 | 93.75 | 93.2 | 0.55 |
|   |   | 1.5 | 81.25 | 82.1 | 5.15 |
| 5 | 5 | 0.5 | 91.67 | 90.8 | 0.87 |
|   |   | 1.5 | 75 | 78 | 3.00 |
| 6 | 6 | 0.5 | 92.86 | 92 | 0.86 |
|   |   | 1.5 | 78.57 | 84 | 5.43 |
| 7 | 4 | 0.5 | 90 | 88 | 2.00 |
|   |   | 1.5 | 70 | 67.5 | 2.50 |
| 8 | 9.5 | 0.5 | 95.23 | 100 | 4.77 |
|   | (Phantom d = 0.5) | 1.5 | 85.71 | 83.6 | 2.11 |
| 9 | 7 | 0.5 | 93.75 | 93.2 | 0.55 |
|   |   | 1.5 | 81.25 | 82.3 | 1.05 |
| 10 | 5 | 0.5 | 91.67 | 90.5 | 1.17 |
|   |   | 1.5 | 75 | 73.8 | 1.2 |
| 11 | 1 | 0.5 | 75 | 45.5 | 29.5 |
|   |   | 1.5 | 25 | 0 | 25 |
| 12 | 2 | 0.5 | 83.33 | 75 | 8.33 |
|   |   | 1.5 | 50 | 30.5 | 19.5 |
| 13 | 3 | 0.5 | 87.5 | 84 | 3.5 |
|   |   | 1.5 | 62.5 | 56.3 | 6.2 |
| Average Difference (percent) *Including Nodes Attached to Phantom Node | | | | | 6.25 |
| Average Difference (percent) *Excluding Nodes Attached to Phantom Node | | | | | 5.60 |

For the three phantom node case, a phantom node with link weight equal to 0.5 was attached to node eight, a phantom node with link weight equal to 1.5 was attached to node three, and a phantom node with link weight equal to 2.5 was attached to node two. In other words, an additional phantom node was attached to (45) to create $$A = \begin{bmatrix} 0 & 1 & 1 & 1 & 0 & 0 & 0 & 0 & 1 & 0 & 0 & 1 & 0 & 0 & 0 & 0 \\ 1 & 0 & 1 & 1 & 0 & 1 & 0 & 1 & 1 & 1 & 0 & 0 & 1 & 0 & 0 & 2.5 \\ 1 & 1 & 0 & 1 & 1 & 1 & 0 & 1 & 1 & 0 & 0 & 0 & 1 & 0 & 1.5 & 0 \\ 1 & 1 & 1 & 0 & 1 & 0 & 1 & 1 & 1 & 0 & 0 & 0 & 0 & 0 & 0 & 0 \\ 0 & 0 & 1 & 1 & 0 & 0 & 0 & 1 & 0 & 1 & 1 & 0 & 0 & 0 & 0 & 0 \\ 0 & 1 & 1 & 0 & 0 & 0 & 1 & 1 & 0 & 1 & 0 & 1 & 0 & 0 & 0 & 0 \\ 0 & 0 & 0 & 1 & 0 & 1 & 0 & 1 & 1 & 0 & 0 & 0 & 0 & 0 & 0 & 0 \\ 0 & 1 & 1 & 1 & 1 & 1 & 1 & 0 & 1 & 1 & 0 & 0 & 1 & 0.5 & 0 & 0 \\ 1 & 1 & 1 & 1 & 0 & 0 & 1 & 1 & 0 & 1 & 0 & 0 & 0 & 0 & 0 & 0 \\ 0 & 1 & 0 & 0 & 1 & 1 & 0 & 1 & 1 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 1 & 0 & 0 & 0 & 0 & 1 & 0 & 0 & 0 & 0 & 0 & 0 & 0 & 0 & 0 & 0 \\ 0 & 1 & 1 & 0 & 0 & 0 & 0 & 1 & 0 & 0 & 0 & 0 & 0 & 0 & 0 & 0 \\ 0 & 0 & 0 & 0 & 0 & 0 & 0 & 0.5 & 0 & 0 & 0 & 0 & 0 & 0 & 0 & 0 \\ 0 & 0 & 1.5 & 0 & 0 & 0 & 0 & 0 & 0 & 0 & 0 & 0 & 0 & 0 & 0 & 0 \\ 0 & 2.5 & 0 & 0 & 0 & 0 & 0 & 0 & 0 & 0 & 0 & 0 & 0 & 0 & 0 & 0 \end{bmatrix} \quad (47)$$

The network topology formed by (46) is shown in FIG. 27. The network formed by (46) was used in the simulation to measure and estimate percent $C_{U\,intersect}$ for congestion threshold crossings.

Table 6 shows the measured and estimated $C_{U\,intersect}$ results for all nodes in the network for all three congestion threshold crossings. Excluding the nodes attached to phantom nodes, the largest difference between measured and estimated $C_{U\,intersect}$ occurs on nodes 11 and 12 again. This further supports the claim that the estimation method is not as accurate on low degree nodes. Still, the estimation method, again, overestimated the $C_U$ at the congestion threshold, which means the node would be identified in the monitoring scheme as congested well before failure. Therefore, the large difference is acceptable. Additionally, the average difference between measured and estimated $C_{U\,intersect}$ is 5.1 percent when the results of the nodes attached to phantom nodes are excluded. This means that on average a node will be identified by the monitoring scheme as congested within 5.1 percent of the estimated $C_{U\,intersect}$ value.

TABLE 6

Percent difference between estimated and measured capacity used for nodes of a random ten node network containing three phantom nodes, one with link weight equal to 0.5 attached to node eight, one with link weight equal to 1.5 attached to node three, and one with link weight equal to 2.5 attached to node two.

| Node | Total Node Degree (node + phantom degree) | Phantom Node Degree | Estimated $C_{U\,intersect}$ (percent) | Measured $C_{U\,intersect}$ (percent) | Difference Between Estimated and Measured (percent) |
|---|---|---|---|---|---|
| 1 | 5 | 0.5 | 91.67 | 90.2 | 1.47 |
|   |   | 1.5 | 75 | 75.8 | 0.8 |
|   |   | 2.5 | 58.33 | 60.4 | 2.07 |
| 2 | 10.5 | 0.5 | 95.65 | 79.3 | 16.35 |
|   | (Phantom d = 2.5) | 1.5 | 86.96 | 100 | 13.04 |
|   |   | 2.5 | 78.26 | 100 | 21.74 |
| 3 | 9.5 | 0.5 | 95.23 | 76.3 | 18.93 |
|   | (Phantom d = 1.5) | 1.5 | 85.71 | 100 | 14.29 |
|   |   | 2.5 | 76.19 | 77.4 | 1.21 |
| 4 | 7 | 0.5 | 93.75 | 93.2 | 0.55 |
|   |   | 1.5 | 81.25 | 82.1 | 0.85 |
|   |   | 2.5 | 68.75 | 69 | 0.25 |
| 5 | 5 | 0.5 | 91.67 | 90.8 | 0.87 |
|   |   | 1.5 | 75 | 75.4 | 0.40 |
|   |   | 2.5 | 58.33 | 57.2 | 1.13 |
| 6 | 6 | 0.5 | 92.86 | 92 | 0.86 |
|   |   | 1.5 | 78.57 | 78.8 | 0.23 |
|   |   | 2.5 | 64.29 | 67.7 | 3.41 |
| 7 | 4 | 0.5 | 90 | 88 | 2.00 |
|   |   | 1.5 | 70 | 67.5 | 2.50 |
|   |   | 2.5 | 50 | 38.5 | 11.5 |
| 8 | 9.5 | 0.5 | 95.23 | 100 | 4.77 |
|   | (Phantom d = 0.5) | 1.5 | 85.71 | 83.6 | 2.11 |
|   |   | 2.5 | 76.19 | 76.5 | 0.31 |
| 9 | 7 | 0.5 | 93.75 | 93.2 | 0.55 |
|   |   | 1.5 | 81.25 | 82.3 | 1.05 |
|   |   | 2.5 | 68.75 | 70 | 1.25 |
| 10 | 5 | 0.5 | 91.67 | 90.5 | 1.17 |
|   |   | 1.5 | 75 | 74.2 | 0.8 |
|   |   | 2.5 | 58.33 | 55.8 | 2.53 |
| 11 | 1 | 0.5 | 75 | 45.5 | 29.5 |
|   |   | 1.5 | 25 | 0 | 25 |
|   |   | 2.5 | 0 | 0 | 0 |
| 12 | 2 | 0.5 | 83.33 | 75 | 8.33 |
|   |   | 1.5 | 50 | 29 | 21 |
|   |   | 2.5 | 16.67 | 0 | 16.67 |
| 13 | 3 | 0.5 | 87.5 | 84 | 3.5 |
|   |   | 1.5 | 62.5 | 57 | 5.5 |
|   |   | 2.5 | 37.5 | 30.3 | 7.2 |
| Average Difference (percent) *Including Nodes Attached to Phantom Node | | | | | 6.3 |
| Average Difference (percent) *Excluding Nodes Attached to Phantom Node | | | | | 5.1 |

Since two different simulations produced inaccurate results for low degree nodes, the three phantom node simulation node was re-run to determine if low degree nodes were better estimated when a larger degree difference exists between the node of interest and the phantom node. The 0.5 degree phantom node in (46) was changed to 0.1 and the simulation was re-run to measure and estimate $C_{U\,intersect}$ for nodes 11, 12, and 13 with the 0.1 degree phantom node. The results are displayed in Table 7. Comparing the entries in Table 7 with the associated entries in Table 6, the difference between estimated and measured $C_{U\,intersect}$ decreased significantly by increasing the difference between the nodal degree and the phantom degree. This means the equation for estimating $C_{U\,intersect}$ is more accurate when there is a large difference between $D_{interest}$ and $D_{phantom}$.

TABLE 7

Percent difference between estimated and measured capacity used for three low degree nodes in a random 13 node network containing a phantom node with a degree of 0.1 attached to node eight.

| Node | Total Node Degree (node + phantom degree) | Phantom Node Degree | Estimated $C_{U\,intersect}$ (percent) | Measured $C_{U\,intersect}$ (percent) | Difference Between Estimated and Measured (percent) |
| --- | --- | --- | --- | --- | --- |
| 11 | 1 | 0.1 | 95 | 90 | 5 |
| 12 | 2 | 0.1 | 96.67 | 95 | 1.67 |
| 13 | 3 | 0.1 | 97.5 | 96.8 | 0.7 |

The simulation results show that the congestion estimation method accurately estimates the percent $C_U$ on a node at the instant it crosses a congestion threshold. The results also show that by adding additional phantom nodes into the network, multiple congestion thresholds are produced. This means nodes can be assigned to different congestion thresholds. For example, in the two phantom node case shown in Table 5, nodes one, two, and three can be assigned to the congestion threshold formed by the phantom node with link weight equal to 0.5, and the remaining nodes can be assigned to the congestion threshold formed by the other phantom node. This means nodes one, two, and three will be identified as congested in the range of 45 to 84 percent instead of 0 to 56 percent, and the remaining nodes will be identified as congested in the range of 67 to 84 percent instead of 88 to 94 percent. The ability to accurately implement additional phantom nodes allows the monitoring scheme to be tailored to specific network requirements.

The simulations presented herein validate the embodiments describing SDN monitoring scheme. The results showed that graph theory techniques and analysis allow the monitoring scheme to accurately identify disconnected, congested, underutilized, and attacked nodes through the use of phantom nodes. This means the monitoring scheme is capable of producing the required outputs needed to update flow rules and manage the network. Additionally, the results showed that the monitoring scheme can be customized for individual networks. At network initialization, the network administrator can use the congestion estimation method to determine the number of phantom nodes, the link weights of the phantom nodes, and which nodes are assigned to each phantom node to ensure all nodes are identified as congested at an acceptable congestion level. Overall, the simulations and results of this chapter demonstrate the functionality and accuracy of the monitoring scheme according to embodiments.

An embodiment describes spectral graph analysis to develop a network monitoring scheme to be implemented at the application layer of a SDN. The dual basis was identified as an analytical tool to track node health in a dynamic network. In an embodiment, the eigencentrality basis and nodal basis may provide information on the strength and connectivity of a node relative to other nodes in the network. A simulation of an embodiments show that the eigenspectrum of the nodal basis shift, and the eigencentrality metrics change, as a node experiences increases or decreases in capacity due to traffic on its links. Congestion, or higher traffic loads, are identified and managed by tracking these changes in the dual basis.

Using graph analysis tool, an embodiment implements the node health tracking concept by adding a phantom node, or nodes, into the adjacency matrix of the physical network. Each phantom node is given a specific link weight value to create the largest eigencentrality metric for a specific eigenvalue within the eigenspectrum. With this initial nodal basis, the phantom node is considered primary influencer of a specific eigenvalue and establishes a congestion threshold to compare and measure the health of all nodes within the network. Analysis of the dual basis showed that a node is identified as disconnected, congested, underutilized, or attacked based off of its eigenvalue influence relative to the phantom node's eigenvalue influence. This identification allows the controller to update flow rules and provide network management.

A network monitoring embodiment is also shown to be customizable by manipulating the variables associated with the phantom node. Changing a phantom node's link weight or changing the number of phantom nodes changes the congestion threshold level and the number of congestion thresholds in the network, respectively. This allows the monitoring scheme to be tailored to specific monitoring requirements for individual networks.

Node health tracking simulations demonstrate a predictable relationship between eigenvalues and eigenvectors. Simulations also show how a node's health can be tracked and analyzed in a dynamic network to distinguish weaker nodes from stronger nodes, or congested nodes from underutilized nodes. This ability is significant for SDN because it is a computationally inexpensive method to determine node and network states.

An embodiment describes the implementation of a phantom node in the adjacency matrix to create a congestion threshold within the dual basis. The creation of a congestion threshold allows the controller to easily identify disconnected, congested, underutilized, and attacked nodes through simple analysis of the eigenvalues and eigenvectors. This allows the SDN controller to easily identify changes that need to be made to flow rules to provide effective network management.

Figure 28:
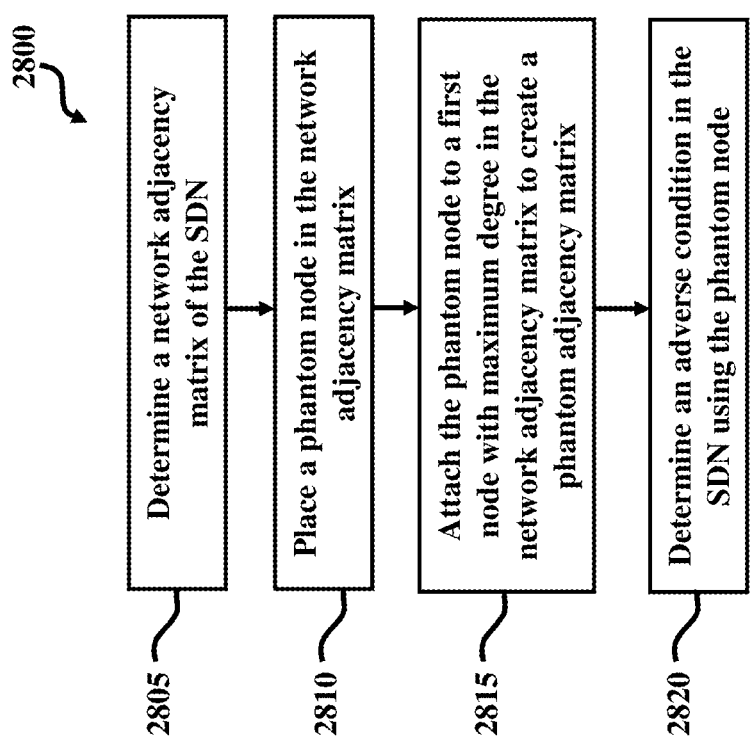
FIG. 28 is a flow diagram illustrating a method according to an embodiment herein.

An embodiment describes a method for estimating congestion when a node takes over primary influencer of $\lambda_2$. This method is significant because it allows a network administrator to customize the proposed network monitoring scheme so that it identifies nodal congestion at acceptable levels FIG. 28 is a flow diagram illustrating a method 2800 according to an embodiment herein. At step 2805, method 2800 determines a network adjacency matrix of the SDN. The network adjacency matrix represents a topology of the SDN. At step 2810, method 2800 places a phantom node in the network adjacency matrix. The phantom node does not physically exist within the topology of the SDN and the phantom node is attached, in step 2815, to a first node with maximum degree in the network adjacency matrix to create a phantom adjacency matrix. The first node corresponds to a first forwarding device in the SDN. At step 2820, method 2800 determines an adverse condition in the SDN using the phantom node.

Figure 29:
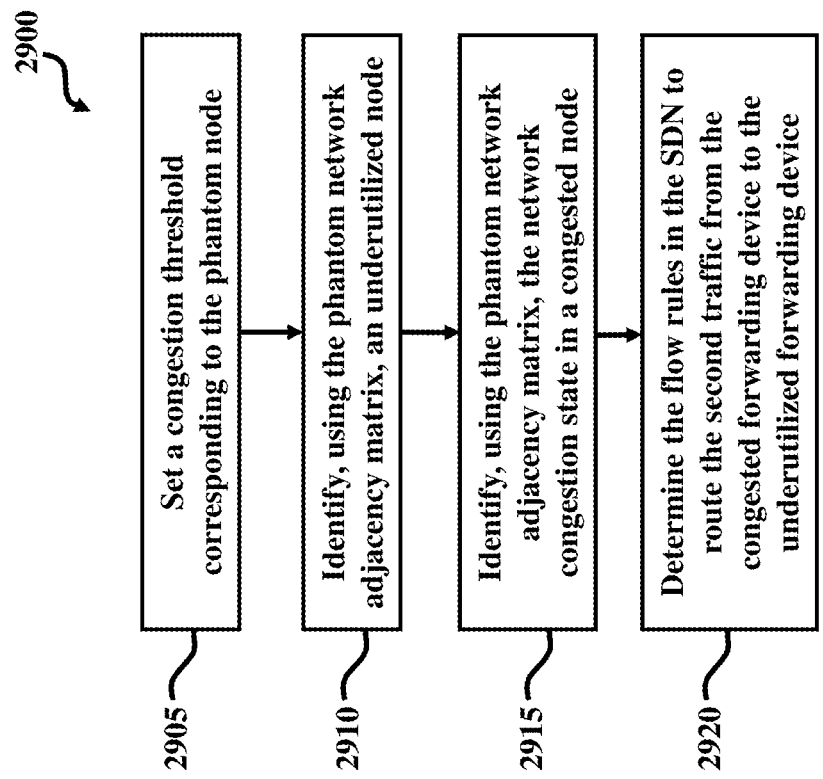
FIG. 29 is a flow diagram illustrating a method according to an embodiment herein.

FIG. 29, with reference to FIG. 28, is a flow diagram illustrating a method 2900 according to an embodiment herein. At step 2905, method 2900 sets a congestion threshold corresponding to the phantom node. At step 2910, method 2900 identifies, using the phantom network adjacency matrix, an underutilized node. The underutilized node corresponds to an underutilized forwarding device in the SDN. The first traffic utilization of the underutilized forwarding device is below the congestion threshold.

At step 2915, method 2900 identifies, using the phantom network adjacency matrix, the network congestion state in a congested node. The congested node corresponds to a congested forwarding device in the SDN. The second traffic utilization of the congested forwarding device is above the congestion threshold. At step 2920, method 2900 determines the flow rules in the SDN to route the second traffic from the congested forwarding device to the underutilized forwarding device, to mitigate the network congestion state.

Figure 30:
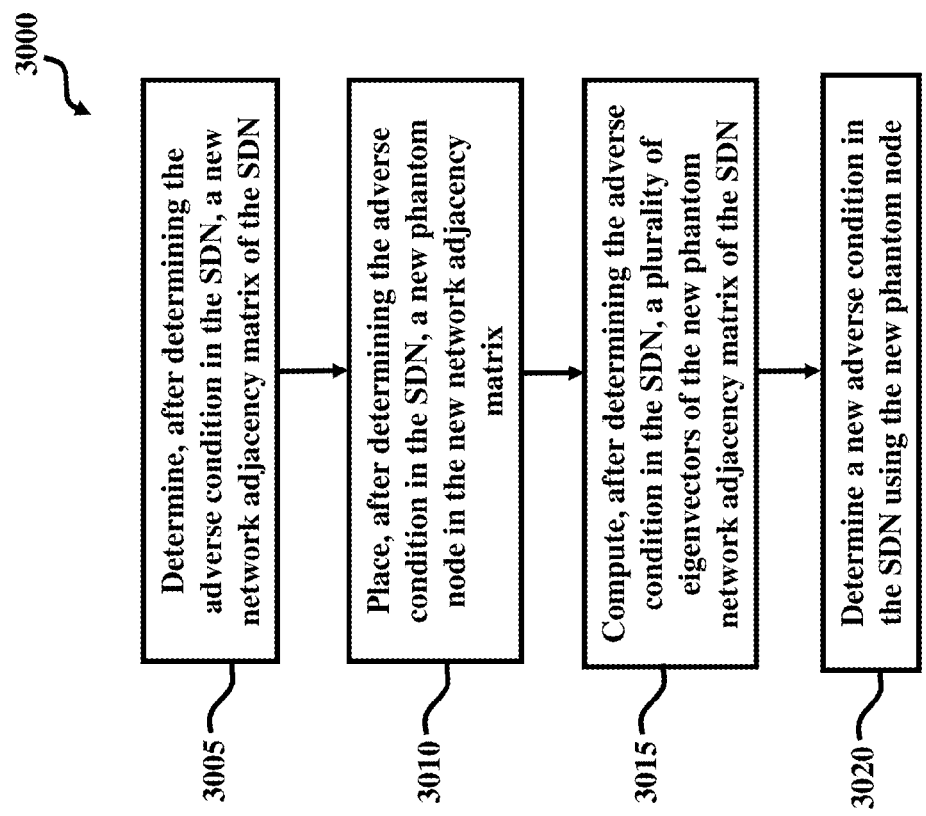
FIG. 30 is a flow diagram illustrating a method according to an embodiment herein.

FIG. 30, with reference to FIG. 28 and FIG. 29, is a flow diagram illustrating a method 3000 according to an embodiment herein. At step 3005, method 3000 determines, after determining the adverse condition in the SDN, a new network adjacency matrix of the SDN. At step 3010, method 3000, after determining the adverse condition in the SDN dynamically, places a new phantom node in the new network adjacency matrix. At step 3015, method 3000, after determining the adverse condition in the SDN dynamically, computes a plurality of eigenvectors of the new phantom network adjacency matrix of the SDN. At step 3020, method 3000 determines a new adverse condition in the SDN using the new phantom node.

Figure 31:
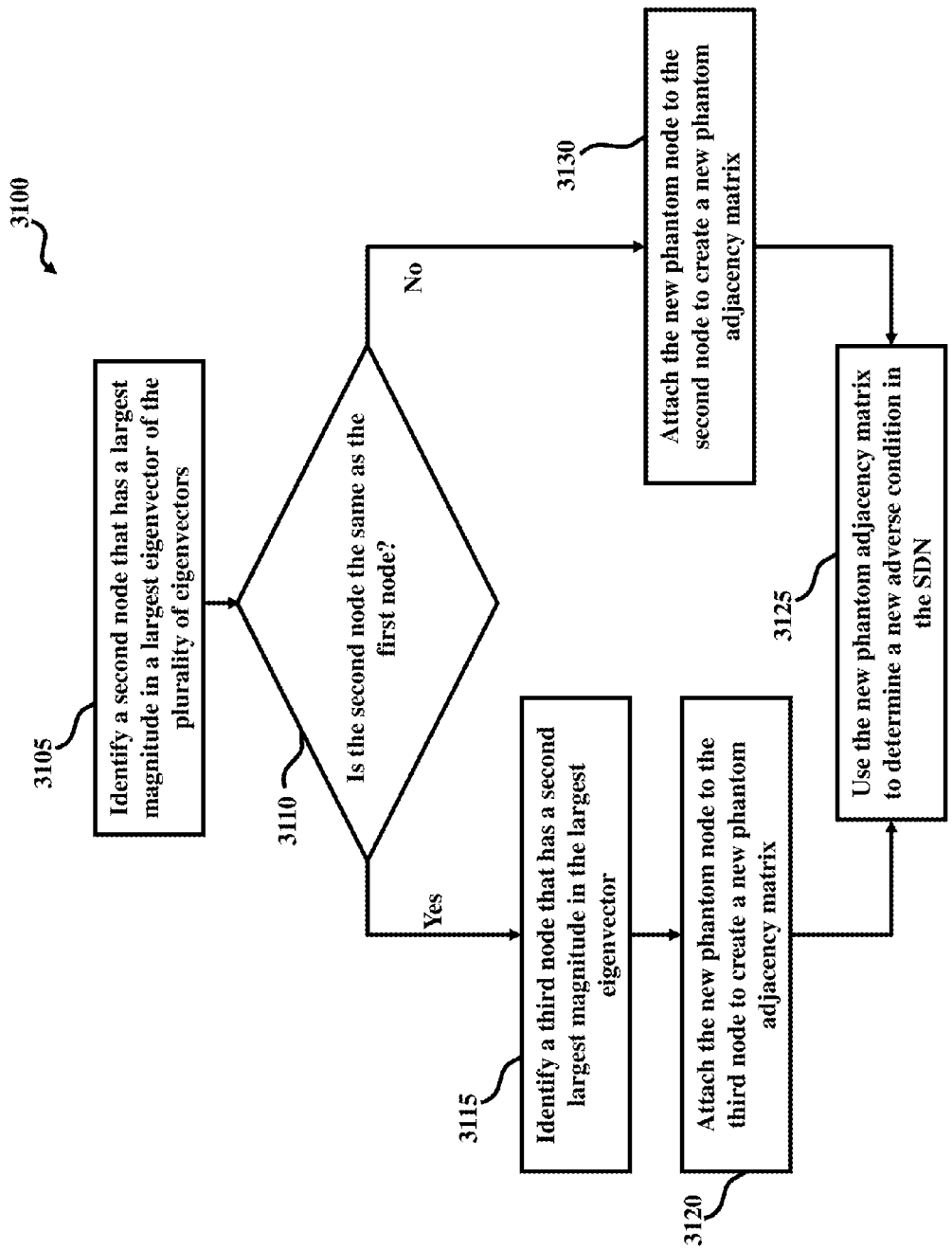
FIG. 31 is a flow diagram illustrating a method according to an embodiment herein.

FIG. 31, with reference to FIG. 28 through FIG. 30, is a flow diagram illustrating a method 3100 according to an embodiment herein. At step 3105, method 3100 identifies a second node that has a largest magnitude in a largest eigenvector of the plurality of eigenvectors. The second node corresponds to a second forwarding device in the SDN. At step 3110, method 3100 determines whether the second node is the same as the first node. When the second node is not the same with the first node, method 3100 at step 3130, attaches the new phantom node to the second node to create a new phantom adjacency matrix.

When the second node is the same as the first node, method 3100 at step 3115, identifies a third node that has a second largest magnitude in the largest eigenvector, and at step 3120, attaches the new phantom node to the third node to create a new phantom adjacency matrix. The third node corresponds to a third forwarding device in the SDN.

At step 3125, method 3100 uses the new phantom adjacency matrix to determine a new adverse condition in the SDN.

In an embodiment a controller device performs the steps of method 2800 in FIG. 28, method 2900 in FIG. 29, method 3000 in FIG. 30, and method 3100 in FIG. 31.

Some components of the embodiments herein can include a computer program product configured to include a pre-configured set of instructions stored in non-volatile memory, which when performed, can result in actions as stated in conjunction with the methods described above. In an embodiment, the controller device and the forwarding devices described herein may include a computer program. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer executable instructions or data structures stored thereon. Such non-transitory computer readable storage media can be any available media that can be accessed by a special purpose computer, including the functional design of any special purpose processor, module, or circuit as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, and may be configured, for example, as a kiosk.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 32:
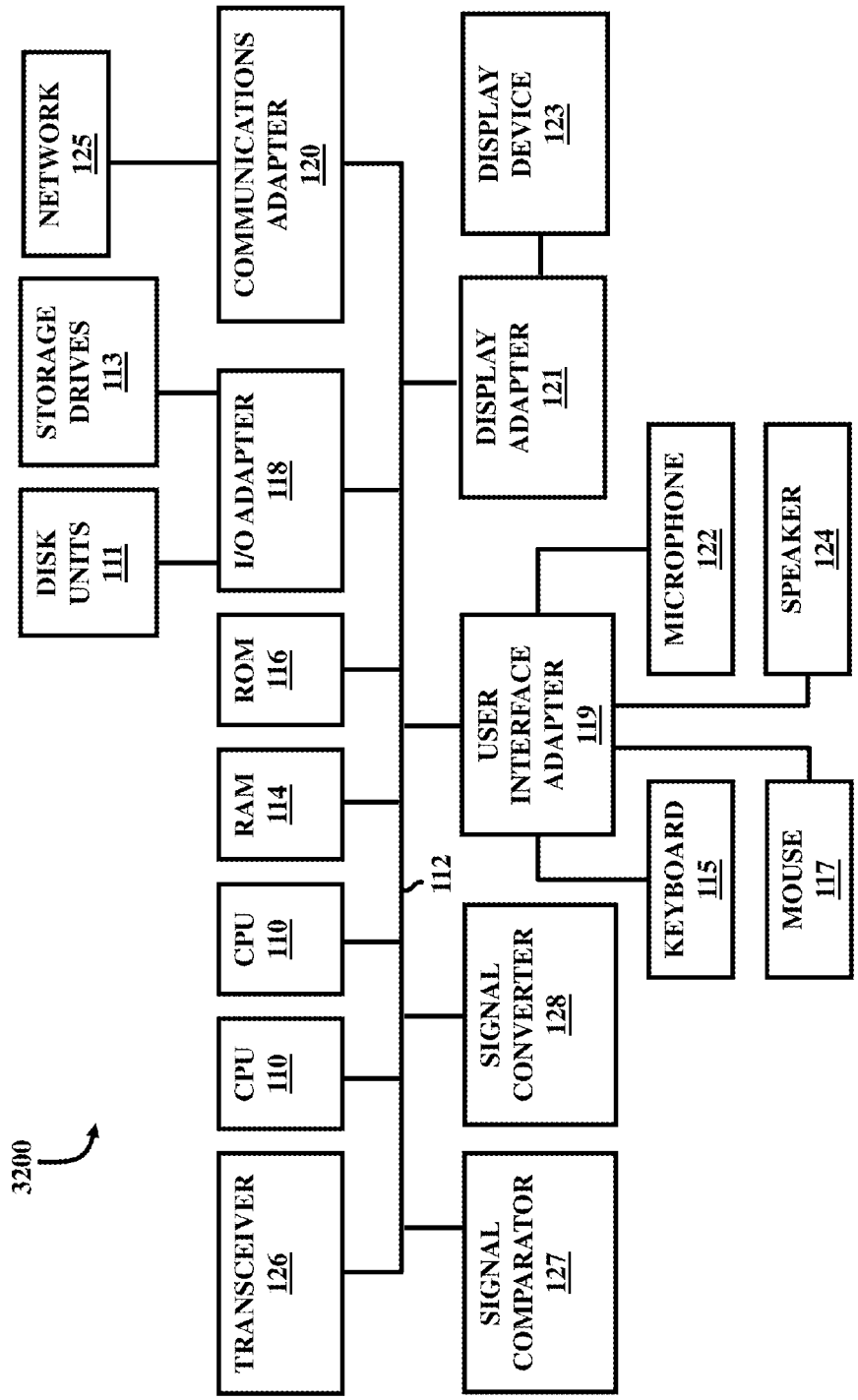
FIG. 32 is a schematic diagram illustrating an exemplary computer architecture used in accordance with the embodiments herein.

A representative hardware environment for practicing the embodiments herein is depicted in FIG. 32, with reference to FIGS. 1 through 31. This schematic drawing illustrates a hardware configuration of an information handling/computer system 3200 in accordance with an exemplary embodiment herein. The system 3200 comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and storage drives 113, or other program storage devices that are readable by the system. The system 3200 can read the inventive instructions on the program storage devices and follow these instructions to execute the methodology of the embodiments herein. The system 3200 further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example. Further, a transceiver 126, a signal comparator 127, and a signal converter 128 may be connected with the bus 112 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for determining node congestion in a dynamic network comprising:
   a nodal network, where the nodal network comprises a quantity of n nodes, where every node comprising the quantity of n nodes comprises a forwarding device, and where the every node has a communications link to at least one other node comprising the quantity of n nodes, where the communications link has a maximum bandwidth $X_{MAXIMUM}$;
   a programmable controller in data communication with each node comprising the quantity of n nodes, where the programmable controller is programmed to perform steps comprising:
      polling one or more nodes comprising the quantity of n nodes and determining a throughput $X_{MEASURED}$ for each communications link comprising the nodal network;
      defining a link weight for the each communications link using the $X_{MAXIMUM}$ for the each communications link and using the $X_{MEASURED}$ for the each communications link;
      creating one or more phantom nodes, where each phantom node does not physically exist within the nodal network, and where the one or more phantom nodes comprises a quantity of m phantom nodes, and where each phantom node is a representation of an additional node in the nodal network, by:
         devising a phantom link between the each phantom node and one of the nodes comprising the quantity of n nodes, thereby devising one or more phantom links; and
         assigning a phantom link weight for each phantom link in the one or more phantom links, thereby assigning one or more phantom link weights and creating the one or more phantom nodes;

developing a plurality of analysis nodes where the plurality of analysis nodes comprises the quantity of n nodes and the quantity of m phantom nodes and designating each separate node and each separate phantom node in the plurality of analysis nodes with a node designation, where the each separate node and the each separate phantom node has a unique node designation;

generating a Graph representing the plurality of analysis nodes, where the Graph comprises a representation for each individual node comprising the quantity of n nodes, each individual phantom node comprising the quantity of m phantom nodes, every link weight for every communications link in the nodal network, and every phantom link weight; and analyzing the Graph by performing steps comprising:
 determining a Laplacian matrix Q describing the Graph and using the node designations;
 finding an eigenvector matrix V using the Laplacian matrix Q, where the eigenvector matrix V is an (n+m) by (n+m) matrix comprising elements $v_i^l$, where i is an eigenindex and where l is one of the node designations; and
 determining node congestion by, identifying at least two nodal influencers by selecting at least a first eigenindex i(1) and a second eigenindex i(2), where i(1) is less than i(2), and performing steps comprising:
  finding a primary influencer of the first eigenindex i(1) by inspecting the eigenvector matrix V and finding for the first eigenindex i(1) a maximum $v_{i(1)}^{lmax(1)}$, where the maximum $v_{i(1)}^{lmax(1)}$ is an element $v_i^l$ of the eigenvector matrix V having a maximum magnitude among all elements $v_i^l$ of the eigenvector matrix V when the eigenindex i is equal to the first eigenindex i(1), and designating the node corresponding to the node designation lmax(1) of the maximum $v_{i(1)}^{lmax(1)}$ as the primary influencer of the first eigenindex i(1);
  ascertaining a primary influencer of the second eigenindex i(2) by inspecting the eigenvector matrix V and finding for the second eigenindex i(2) a maximum $v_{i(2)}^{lmax(2)}$, where the maximum $v_{i(2)}^{lmax(2)}$ is an element $v_i^l$ of the eigenvector matrix V having a maximum magnitude among all elements $v_i^l$ of the eigenvector matrix V when the eigen index i is equal to the second eigenindex i(2), and designating the node corresponding to the node designation lmax(2) of the maximum $v_{i(2)}^{lmax(2)}$ as the primary influencer of the second eigenindex i(2); and
  identifying, if the primary influencer of the first eigenindex i(1) is one of the quantity of n nodes comprising the nodal network and the primary influencer of the second eigenindex i(2) is one of the one or more phantom nodes, the primary influencer of the first eigenindex i(1) as a congested node, thereby determining node congestion in the dynamic network.

2. The system of claim 1 where the programmable controller is programmed to determine the Laplacian matrix Q describing the Graph and using the node designations by performing steps comprising:
 determining a phantom adjacency matrix A using the Graph and using the node designations;
 determining a degree matrix D using the Graph and using the node designations; and
 determining the Laplacian matrix Q by subtracting the degree matrix D from the phantom adjacency matrix A.

3. The system of claim 2 where the programmable controller is programmed to determine the phantom adjacency matrix A using the Graph and using the node designations by performing steps comprising:
 establishing a plurality of link weights $w_{ij}$ where each link weight $w_{ij}$ comprises either a link weight for the communication links comprising the nodal network or a phantom link weight phantom link weight for one of the phantom links in the one or more phantom links, and where each link weight $w_{ij}$ represents a link between an $i^{th}$ node and a $j^{th}$ node, where the $i^{th}$ node corresponds to a first node designation and the $j^{th}$ node corresponds to a second node designation; and
 determining the phantom adjacency matrix A using the plurality of link weights $w_{ij}$, where the phantom adjacency matrix A comprises elements A(i,j) where the elements A(i,j) comprise the plurality of link weights $w_{ij}$.

4. The system of claim 2 where the programmable controller is programmed to determine the phantom adjacency matrix A using the plurality of link weights $w_{ij}$ by performing steps comprising:
 establishing the phantom adjacency matrix A as an (n+m) by (n+m) matrix comprising elements A(i, j) where an element A(i, j) corresponds to the link between the $i^{th}$ node and the $j^{th}$ node; and
 defining each element A(i, j) where the each element A(i, j) comprises the link weight $w_{ij}$ corresponding to the link between the $i^{th}$ node and the $j^{th}$ node.

5. The system of claim 4 where the programmable controller is programmed to determine the degree matrix D by performing steps comprising:
 establishing the degree matrix D as another (n+m) by (n+m) matrix comprising elements D(i, j);
 determining a $w_{ij}$ summation for each specific $i^{th}$ node comprising the plurality of analysis nodes, where the $w_{ij}$ summation comprises a summation of the link weights $w_{ij}$ representing the link between the $i^{th}$ node and the $j^{th}$ node when the each specific $i^{th}$ node is the $i^{th}$ node; and
 defining each element D(i, j) where the each element D(i, j) comprises the $w_{ij}$ summation for an individual $i^{th}$ node comprising the plurality of analysis nodes when both i and j are equal to the node designation of the individual $i^{th}$ node, and where the each element D(i, j) is equal to zero when both i and j are not equal to the node designation of the individual $i^{th}$ node.

6. The system of claim 1 where the every node comprising the quantity of n nodes in the nodal network comprises a routing table, and where the programmable controller is further programmed to perform steps comprising communicating a flow level routing instruction to at least one node comprising the nodal network based on the node congestion.

7. The system of claim 6 where the programmable controller is further programmed to identify an attacked node by performing steps comprising:
 repeating, after the programmable controller communicates the flow level routing instruction to the at least one node comprising the nodal network, the polling one or more nodes step, the defining the link weight for the each communications link step, the generating the Graph representing the plurality of analysis nodes step, the analyzing the Graph step, the determining the Laplacian matrix Q step, and the finding the eigenvector matrix V step, the determining node congestion step, the finding the primary influencer of the first eigenindex i(1) step, and the ascertaining the primary influencer of the second eigenindex i(2) step; and identifying, if the primary influencer of the first eigenindex i(1) is the one of the quantity of n nodes comprising the nodal network and the primary influencer of the second eigenindex i(2) is the one of the one or more phantom nodes, the primary influencer of the first eigenindex i(1) as an attacked node.

8. The system of claim 6 where the programmable controller is further programmed to operate in a cyclic manner by performing steps comprising:

creating one or more new phantom nodes, where the one or more new phantom nodes comprises a quantity of m' new phantom nodes, and where each new phantom node is a representation of a new additional node in the nodal network, by:

devising a new phantom link between the each new phantom node and one of the nodes comprising the quantity of n nodes, thereby devising one or more new phantom links; and assigning a new phantom link weight for each new phantom link in the one or more new phantom links, thereby assigning one or more new phantom link weights and creating the one or more new phantom nodes; and repeating the polling one or more nodes step, the defining the link weight for the each communications link step, the developing the plurality of analysis nodes step, the generating the Graph representing the plurality of analysis nodes step, the analyzing the Graph step, the determining the Laplacian matrix Q step, the finding the eigenvector matrix V step, the determining node congestion step, the finding the primary influencer of the first eigenindex i(1) step, the ascertaining the primary influencer of the second eigenindex i(2) step, and the identifying, if the primary influencer of the first eigenindex i(1) is one of the quantity of n nodes comprising the nodal network and the primary influencer of the second eigenindex i(2) is one of the one or more phantom nodes, the primary influencer of the first eigenindex i(1) as the congested node step, by using the one or more new phantom nodes as the one or more phantom nodes, and using the quantity of m' new phantom nodes as the quantity of m phantom nodes, and using the one or more new phantom links as the one or more phantom links, and using the one or more new phantom link weights as the one or more phantom link weights.

9. A non-transitory program storage device readable by a programmable controller and tangibly embodying a program of instructions executable by the programmable controller to perform a method for determining node congestion in a software defined network (SDN) of a plurality of forwarding devices, the program of instructions directing the programmable controller to perform steps comprising:

polling one or more nodes comprising a nodal network, where the nodal network comprises a quantity of n nodes, where every node comprising the quantity of n nodes comprises a forwarding device, and where the every node has a communications link to at least one other node comprising the quantity of n nodes, where the communications link has a maximum bandwidth $X_{MAXIMUM}$, and defining a link weight for each communications link in the nodal network by:

determining a throughput $X_{MEASURED}$ for the each communications link comprising the nodal network; and defining a link weight for the each communications link using the $X_{MAXIMUM}$ for the each communications link and using the $X_{MEASURED}$ for the each communications link;

creating one or more phantom nodes, where each phantom node does not physically exist within the nodal network, and where the one or more phantom nodes comprises a quantity of m phantom nodes, and where each phantom node is a representation of an additional node in the nodal network, by:

devising a phantom link between the each phantom node and one of the nodes comprising the quantity of n nodes, thereby devising one or more phantom links; and assigning a phantom link weight for each phantom link in the one or more phantom links, thereby assigning one or more phantom link weights and creating the one or more phantom nodes;

developing a plurality of analysis nodes where the plurality of analysis nodes comprises the quantity of n nodes and the quantity of m phantom nodes and designating each separate node and each separate phantom node in the plurality of analysis nodes with a node designation, where the each separate node and the each separate phantom node has a unique node designation;

generating a Graph representing the plurality of analysis nodes, where the Graph comprises a representation for each individual node comprising the quantity of n nodes, each individual phantom node comprising the quantity of m phantom nodes, every link weight for every communications link in the nodal network, and every phantom link weight; and analyzing the Graph by performing steps comprising:

determining a Laplacian matrix Q describing the Graph and using the node designations;

finding an eigenvector matrix V using the Laplacian matrix Q, where the eigenvector matrix V is an (n+m) by (n+m) matrix comprising elements $v_i^l$, where i is an eigenindex and where l is one of the node designations; and determining, node congestion by identifying at least two nodal influencers by selecting at least a first eigenindex i(1) and a second eigenindex i(2), where i(1) is less than i(2), and performing steps comprising:

finding a primary influencer of the first eigenindex i(1) by inspecting the eigenvector matrix V and finding for the first eigenindex i(1) a maximum $v_{i(1)}^{lmax(1)}$, where the maximum $v_{i(1)}^{lmax(1)}$ is an element $v_i^l$ of the eigenvector matrix V having a maximum magnitude among all elements $v_i^l$ of the eigenvector matrix V when the eigen index i is equal to the first eigenindex i(1), and designating the node corresponding to the node designation lmax(1) of the maximum $v_{i(1)}^{lmax(1)}$ as the primary influencer of the firsteigenindex i(1);

ascertaining a primary influencer of the second eigenindex i(2) by inspecting the eigenvector matrix V and finding for the second eigenindex i(2) a maximum $v_{i(2)}^{lmax(2)}$, where the maximum $v_{i(2)}^{lmax(2)}$ is an element $v_i^l$ of the eigenvector matrix V having a maximum magnitude among all elements $v_i^l$ of the eigenvector matrix V when the eigen index i is equal to the second eigenindex i(2), and designating the node corresponding to the node designation lmax(2) of the maximum $v_{i(2)}^{lmax(2)}$ as the primary influencer of the second eigenindex i(2); and identifying, if the primary influencer of the first eigenindex i(1) is one of the quantity of n nodes comprising the nodal network and the primary influencer of the second eigenindex i(2) is one of the one or more phantom nodes, the primary influencer of the first eigenindex i(1) as a congested node, thereby determining node congestion.

10. The non-transitory program storage device of claim 9 where the program of instructions further directs the programmable controller to determine the Laplacian matrix Q describing the Graph and using the node designations by performing steps comprising:

determining a phantom adjacency matrix A using the Graph and using the node designations;

determining a degree matrix D using the Graph and using the node designations; and determining the Laplacian matrix Q by subtracting the degree matrix D from the phantom adjacency matrix A.

11. The non-transitory program storage device of claim 10 where the program of instructions further directs the programmable controller to determine the phantom adjacency matrix A using the Graph and using the node designations by performing steps comprising:

establishing a plurality of link weights $w_{ij}$ where each link weight $w_{ij}$ comprises either a link weight for the communication links comprising the nodal network or a phantom link weight phantom link weight for one of the phantom links in the one or more phantom links, and where each link weight $w_{ij}$ represents a link between an $i^{th}$ node and a $j^{th}$ node, where the $i^{th}$ node corresponds to a first node designation and the $j^{th}$ node corresponds to a second node designation; and determining the phantom adjacency matrix A using the plurality of link weights $w_{ij}$, where the phantom adjacency matrix A comprises elements A(i,j) where the elements A(i,j) comprise the plurality of link weights $w_{ij}$.

12. The non-transitory program storage device of claim 11 where the program of instructions further directs the programmable controller to determine the phantom adjacency matrix A using the plurality of link weights $w_{ij}$ by performing steps comprising:

establishing the phantom adjacency matrix A as an (n+m) by (n+m) matrix comprising elements A(i, j) where an element A(i, j) corresponds to the link between the $i^{th}$ node and the $j^{th}$ node; and defining each element A(i, j) where the each element A(i, j) comprises the link weight $w_{ij}$ corresponding to the link between the $i^{th}$ node and the $j^{th}$ node.

13. The non-transitory program storage device of claim 12 where the program of instructions further directs the programmable controller to determine the degree matrix D by performing steps comprising:

establishing the degree matrix D as another (n+m) by (n+m) matrix comprising elements D(i, j);

determining a $w_{ij}$ summation for each specific $i^{th}$ node comprising the plurality of analysis nodes, where the $w_{ij}$ summation comprises a summation of the link weights $w_{ij}$ representing the link between the $i^{th}$ node and the $j^{th}$ node when the each specific $i^{th}$ node is the $i^{th}$ node; and defining each element D(i, j) where the each element D(i, j) comprises the $w_{ij}$ summation for an individual $i^{th}$ node comprising the plurality of analysis nodes when both i and j are equal to the node designation of the individual $i^{th}$ node, and where the each element D(i, j) is equal to zero when both i and j are not equal to the node designation of the individual $i^{th}$ node.

14. The non-transitory program storage device of claim 9 where the program of instructions further directs the programmable controller to perform steps comprising communicating a flow level routing instruction to at least one node comprising the nodal network based on the node congestion.

15. The non-transitory program storage device of claim 14 where the program of instructions further directs the programmable controller to identify an attacked node by performing steps comprising:

repeating, after communicating the flow level routing instruction to the at least one node comprising the nodal network, the polling one or more nodes step, the defining the link weight for the each communications link step, the generating the Graph representing the plurality of analysis nodes step, the analyzing the Graph step, the determining the Laplacian matrix Q step, and the finding the eigenvector matrix V step, the determining node congestion step, the finding the primary influencer of the first eigenindex i(1) step, and the ascertaining the primary influencer of the second eigenindex i(2) step; and identifying, if the primary influencer of the first eigenindex i(1) is the one of the quantity of n nodes comprising the nodal network and the primary influencer of the second eigenindex i(2) is the one of the one or more phantom nodes, the primary influencer of the first eigenindex i(1) as an attacked node.

16. The non-transitory program storage device of claim 14 where the program of instructions further directs the programmable controller to operate in a cyclic manner by performing steps comprising:

creating one or more new phantom nodes, where the one or more new phantom nodes comprises a quantity of m' new phantom nodes, and where each new phantom node is a representation of a new additional node in the nodal network, by:

devising a new phantom link between the each new phantom node and one of the nodes comprising the quantity of n nodes, thereby devising one or more new phantom links; and assigning a new phantom link weight for each new phantom link in the one or more new phantom links, thereby assigning one or more new phantom link weights and creating the one or more new phantom nodes; and repeating the polling one or more nodes step, the defining the link weight for the each communications link step, the developing the plurality of analysis nodes step, the generating the Graph representing the plurality of analysis nodes step, the analyzing the Graph step, the determining the Laplacian matrix Q step, the finding the eigenvector matrix V step, the determining node congestion step, the finding the primary influencer of the first eigenindex i(1) step, the ascertaining the primary influencer of the second eigenindex i(2) step, and the identifying, if the primary influencer of the first eigenindex i(1) is one of the quantity of n nodes comprising the nodal network and the primary influencer of the second eigenindex i(2) is one of the one or more phantom nodes, the primary influencer of the first eigenindex i(1) as the congested node step, by using the one or more new phantom nodes as the one or more phantom nodes, and using the quantity of m' new phantom nodes as the quantity of m phantom nodes, and using the one or more new phantom links as the one or more phantom links, and using the one or more new phantom link weights as the one or more phantom link weights.

17. A system for determining flow rules in a communications network comprising:
a nodal network comprising a quantity of n nodes, where every node comprising the quantity of n nodes comprises a forwarding device, and where the every node comprising the quantity of n nodes in the nodal network comprises a routing table, and where the every node has a communications link to at least one other node comprising the quantity of n nodes, where the communications link has a maximum bandwidth $X_{MAXIMUM}$;
a programmable controller in data communication with each node comprising the quantity of n nodes, where the programmable controller is programmed to perform steps comprising:
  I) polling one or more nodes comprising the quantity of n nodes and determining a throughput $X_{MEASURED}$ for each communications link comprising the nodal network;
  II) defining a link weight for the each communications link using the $X_{MAXIMUM}$ for the each communications link and using the $X_{MEASURED}$ for the each communications link;
  III) creating one or more phantom nodes, where the one or more phantom nodes comprises a quantity of m phantom nodes, and where each phantom node is a representation of an additional node in the nodal network, by:
    III)A) devising a phantom link between the each phantom node and one of the nodes comprising the quantity of n nodes, thereby devising one or more phantom links; and
    III)B) assigning a phantom link weight for each phantom link in the one or more phantom links, thereby assigning one or more phantom link weights and creating the one or more phantom nodes;
  IV) developing a plurality of analysis nodes where the plurality of analysis nodes comprises the quantity of n nodes and the quantity of m phantom nodes and designating each separate node and each separate phantom node in the plurality of analysis nodes with a node designation, where the each separate node and the each separate phantom node has a unique node designation;
  V) generating a Graph representing the plurality of analysis nodes, where the Graph comprises a representation for each individual node comprising the quantity of n nodes, each individual phantom node comprising the quantity of m phantom nodes, every link weight for every communications link in the nodal network, and every phantom link weight; and
  VI) analyzing the Graph by performing steps comprising:
    VI)A) determining a phantom adjacency matrix A using the Graph and using the node designations;
    VI)B) determining a degree matrix D using the Graph and using the node designations; and
    VI)C) determining a Laplacian matrix Q by subtracting the degree matrix D from the phantom adjacency matrix A;
    VI)D) finding an eigenvector matrix V using the Laplacian matrix Q, where the eigenvector matrix V is an (n+m) by (n+m) matrix comprising elements $v_i^l$, where i is an eigenindex and where l is one of the node designations; and
    VI)E) determining node congestion by identifying at least two nodal influencers by selecting at least a first eigenindex i(1) and a second eigenindex i(2), where i(1) is less than i(2), and performing steps comprising:
      VI)E)1) finding a primary influencer of the first eigenindex i(1) by inspecting the eigenvector matrix V and finding for the first eigenindex i(1) a maximum $v_{i(1)}^{lmax(1)}$, where the maximum $v_{i(1)}^{lmax(1)}$ is an element $v_i^l$ of the eigenvector matrix V having a maximum magnitude among all elements $v_i^l$ of the eigenvector matrix V when the eigen index i is equal to the first eigenindex i(1), and designating the node corresponding to the node designation lmax(1) of $v_{i(1)}^{lmax(1)}$ as the primary influencer of the first eigenindex i(1);
      VI)E)2) ascertaining a primary influencer of the second eigenindex i(2) by inspecting the eigenvector matrix V and finding for the second eigenindex i(2) a maximum $v_{i(2)}^{lmax(2)}$, where the maximum $v_{i(2)}^{lmax(2)}$ is an element $v_i^l$ of the eigenvector matrix V having a maximum magnitude among all elements $v_i^l$ of the eigenvector matrix V when the eigen index i is equal to the second eigenindex i(2), and designating the node corresponding to the node designation lmax(2) of $v_{i(2)}^{lmax(2)}$ as the primary influencer of the second eigenindex i(2); and
      VI)E)3) identifying, if the primary influencer of the first eigenindex i(1) is one of the quantity of n nodes comprising the nodal network and the primary influencer of the second eigenindex i(2) is one of the one or more phantom nodes, the primary influencer of the first eigenindex i(1) as a congested node, thereby determining node congestion;
  VII) communicating a flow level routing instruction to at least one node comprising the nodal network based on the node congestion.

18. The system of claim 17 where the programmable controller is further programmed to operate in a cyclic manner by performing steps comprising:
creating one or more new phantom nodes, where the one or more new phantom nodes comprises a quantity of m' new phantom nodes, and where each new phantom node is a representation of a new additional node in the nodal network, by:
  devising a new phantom link between the each new phantom node and one of the nodes comprising the quantity of n nodes, thereby devising one or more new phantom links; and
  assigning a new phantom link weight for each new phantom link in the one or more new phantom links, thereby assigning one or more new phantom link weights and creating the one or more new phantom nodes; and
repeating step I), step II), step IV), step V), step VI), step VI)A), step VI)B), step VI)C), step VI)D), step VI)E), step VI)E)1), step, VI)E)2), and step VI)E)3) using the one or more new phantom nodes as the one or more phantom nodes, and using the quantity of m' new phantom nodes as the quantity of m phantom nodes, and using the one or more new phantom links as the one or more phantom links, and using the one or more new phantom link weights as the one or more phantom link weights.

19. The system of claim 18 where the programmable controller is programmed to determine the phantom adjacency matrix A using the Graph and using the node designations by performing steps comprising:

establishing a plurality of link weights $w_{ij}$ where each link weight $w_{ij}$ comprises either a link weight for the communication links comprising the nodal network or a phantom link weight for one of the phantom links in the one or more phantom links, and where each link weight $w_{ij}$ represents a link between an $i^{th}$ node and a $j^{th}$ node, where the $i^{th}$ node corresponds to a first node designation and the $j^{th}$ node corresponds to a second node designation;

establishing the phantom adjacency matrix A as an (n+m) by (n+m) matrix comprising elements A(i, j) where an element A(i, j) corresponds to the link between the $i^{th}$ node and the $j^{th}$ node; and defining each element A(i, j) where the each element A(i, j) comprises the link weight $w_{ij}$ corresponding to the link between the $i^{th}$ node and the $j^{th}$ node.

20. The system of claim 19 where the programmable controller is programmed to determine the degree matrix D by performing steps comprising:

establishing the degree matrix D as another (n+m) by (n+m) matrix comprising elements D(i, j);

determining a $w_{ij}$ summation for each specific $i^{th}$ node comprising the plurality of analysis nodes, where the $w_{ij}$ summation comprises a summation of the link weights $w_{ij}$ representing the link between the $i^{th}$ node and the $j^{th}$ node when the each specific $i^{th}$ node is the $i^{th}$ node; and defining each element D(i, j) where the each element D(i, j) comprises the $w_{ij}$ summation for an individual $i^{th}$ node comprising the plurality of analysis nodes when both i and j are equal to the node designation of the individual $i^{th}$ node, and where the each element D(i, j) is equal to zero when both i and j are not equal to the node designation of the individual $i^{th}$ node.

21. The system of claim 17 where the programmable controller is further programmed to identify an attacked node by performing steps comprising:

repeating, after step VII), step I), step II), step IV), step V), step VI), step VI)A), step VI)B), step VI)C), step VI)D), step VI)E), step VI)E)1), step, VI)E)2), and step VI)E)3); and identifying, if the primary influencer of the first eigenindex i(1) is the one of the quantity of n nodes comprising the nodal network and the primary influencer of the second eigenindex i(2) is the one of the one or more phantom nodes, the primary influencer of the first eigenindex i(1) as an attacked node.

\* \* \* \* \*